(12) United States Patent
Kenmoku et al.

(10) Patent No.: US 7,470,768 B2
(45) Date of Patent: Dec. 30, 2008

(54) POLYHYDROXYALKANOATE HAVING VINYL GROUP, ESTER GROUP, CARBOXYL GROUP, AND SULFONIC GROUP, AND METHOD OF PRODUCING THE SAME

(75) Inventors: Takashi Kenmoku, Fujisawa (JP); Tatsuki Fukui, Yokohama (JP); Chieko Mihara, Isehara (JP); Ako Kusakari, Tokyo (JP); Tetsuya Yano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 252 days.

(21) Appl. No.: 10/581,698

(22) PCT Filed: Jun. 9, 2005

(86) PCT No.: PCT/JP2005/010999

§ 371 (c)(1),
(2), (4) Date: Jun. 2, 2006

(87) PCT Pub. No.: WO2005/121207

PCT Pub. Date: Dec. 22, 2005

(65) Prior Publication Data

US 2007/0073006 A1    Mar. 29, 2007

(30) Foreign Application Priority Data

Jun. 11, 2004   (JP) .............................. 2004-174783

(51) Int. Cl.
*C08F 6/00* (2006.01)
*C08C 1/14* (2006.01)

(52) U.S. Cl. .............................. 528/487; 426/3; 426/6; 430/108.4; 435/134; 435/135

(58) Field of Classification Search .................... 426/3, 426/6; 430/108.4; 435/134, 135; 528/487
See application file for complete search history.

(56) References Cited

U.S. PATENT DOCUMENTS

| 4,265,247 | A | | 5/1981 | Lenz et al. | |
|---|---|---|---|---|---|
| 6,083,729 | A | * | 7/2000 | Martin et al. | ................ 435/135 |
| 2004/0081906 | A1 | | 4/2004 | Kenmoku et al. | ......... 430/108.4 |
| 2005/0260514 | A1 | | 11/2005 | Mihara et al. | ............. 430/108.4 |
| 2006/0247414 | A1 | | 11/2006 | Kenmoku et al. | |
| 2007/0117937 | A1 | | 5/2007 | Kenmoku et al. | |
| 2007/0155912 | A1 | | 7/2007 | Kenmoku et al. | |

FOREIGN PATENT DOCUMENTS

| EP | 1 336 635 A1 | 8/2003 |
|---|---|---|
| JP | 59-190945 A | 10/1984 |
| JP | 2-3415 A | 1/1990 |
| WO | WO 2004/038512 A1 | 5/2004 |
| WO | WO 2004/044213 A1 | 5/2004 |
| WO | WO 2004/061530 A1 | 7/2004 |
| WO | 2005/121204 A2 | 12/2005 |

OTHER PUBLICATIONS

Mikael Trollsâs et al., "Hydrophilic Aliphatic Polyesters: Design, Synthesis, and Ring-Opening Polymerization of Functional Cyclic Esters," 33 Macromol. 4619-27 (2000).
S. Ponsart et al., "A Novel Route to Poly(ε-caprolactone)-Based Copolymers via Anionic Derivatization," 1 Biomolecules 275-81 (2000).
Benjamin Saulnier et al., "Lactic Acid-Based Functionalized Polymers via Copolymerization and Chemical Modification," 4 Macromol. Biosci. 232-37 (2004).
Bryan Parrish et al., "Functional Polyesters by Ring-Opening Polymerization of α-allyl(δ-valerolactone)," 87 Polymer. Mater.: Sci. & Eng. 254-55 (2002).
C.P. Radano et al., "Synthesis of Novel Biodegradable Copolyesters Using Olefin Metathesis," 43(2) Polymer Reprints 727-28 (2002).
Tetsuji Yamaoka et al., "Synthesis and Properties of Malic Acid-Containing Functional Polymers," 25 Intl. J. Biol. Macromol. 265-71 (1999).
Lindsay H. Briggs et al., "Degradation of the Lanosterol Side-Chain," J.C.S. Perkin I, 806-09 (1973).
Organic Synthesis, vol. 4, pp. 698-699 (1963).
Harry R. Allcock et al., "Reactions of Steroid Salts with Hexachlorocyclotriphosphazene," 46 J. Org. Chem. 13-22 (1981).
J.K. Stille et al., "Tetracyclic Dienes. I. The Diels-Alder Adduct of Norbornadiene and Cyclopentadiene," 81 J. Am. Chem. Soc. 4273-75 (Aug. 1959).
Marie-Maud Bear et al., "Preparation of a Bacterial Polyester with Carboxy Groups in Side Chains," 4 Chemistry 289-93 (2001).
Gary A. Molander et al., "Sequenced Reactions with Samarium(II) Iodide. Tandem Intramolecular Nucleophilic Acyl Substitution/Intramolecular Barbier Cyclizations," 117 J. Am. Chem. Soc. 3705-16 (1995).

* cited by examiner

*Primary Examiner*—Terressa M Boykin
(74) *Attorney, Agent, or Firm*—Fitzpatrick, Cella, Harper & Scinto

(57) ABSTRACT

To provide a novel polyhydroxyalkanoate having a reactive functional group in a molecule and a method of producing the same; and a novel polyhydroxyalkanoate having a new function obtained by chemically modifying the polyhydroxyalkanoate having a reactive functional group and a method of producing the same. By utilizing a vinyl group of a polyhydroxyalkanoate containing a unit having the vinyl group at a side chain thereof, a polyhydroxyalkanoate containing units having a carboxyl group, an amide group, and a sulfonic group in a molecule is induced.

11 Claims, No Drawings

POLYHYDROXYALKANOATE HAVING VINYL GROUP, ESTER GROUP, CARBOXYL GROUP, AND SULFONIC GROUP, AND METHOD OF PRODUCING THE SAME

TECHNICAL FIELD

The present invention relates to a novel polyhydroxyalkanoate and a method of producing the same.

BACKGROUND ART

In recent years, biodegradable polymer materials have been finding a wide variety of applications including medical materials, drug delivery systems, and environmentally compatible materials. In recent years, in addition to those applications, the biodegradable polymer materials have been requested to provide new functions, and hence various studies have been made. In particular, the introduction of a chemically modifiable functional group into a molecule of a polyhydroxyalkanoate typified by polylactic acid has been examined. For example, there has been reported a compound into which a carboxyl group or a vinyl group is introduced. For example, polymalic acid has been known as a polyhydroxyalkanoate having a carboxyl group at a side chain thereof. An α-type represented by the chemical formula (12) and a β-type represented by the chemical formula (13) have been known as polymers of polymalic acid depending on the form of a polymer.

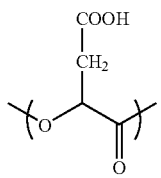

(12)

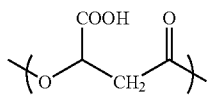

(13)

Of those, a polymer obtained by ring-opening polymerization of a benzyl ester of β-malolactone represented by the chemical formula (14) is disclosed in U.S. Pat. No. 4,265,247 (Patent Document 1) as β-type polymalic acid or a copolymer thereof.

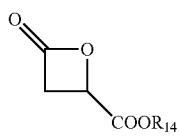

(14)

($R_{14}$: benzyl group.)

In addition, a polymer obtained by copolymerization of a six-membered ring diester monomer and a glicolide or lactide as a cyclic diester or a lactone as an intramolecular ring closure reaction ester of ω-hydroxycarboxylic acid represented by the chemical formula (15) is disclosed in Japanese Patent Application Laid-Open No. H02-003415 (Patent Document 2) as a copolymer containing any one of other hydroxyalkanoic acids typified by α-type polymalic acid-glycolic acid copolymer and glycolic acid.

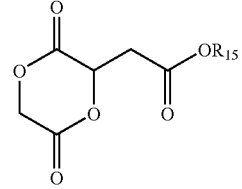

(15)

($R_{15}$ represents a lower alkyl group such as a methyl group, an ethyl group, an n-propyl group, an isopropyl group, or a t-butyl group, or a benzyl group.)

Macromolecules 2000, 33 (13), 4619-4627 (Non-Patent Document 1) discloses that 7-oxo-4-oxepanonecarboxylate is subjected to ring-opening polymerization to produce a polymer having an ester group at a side chain thereof, and the polymer is further subjected to hydrogenolysis to produce a polymer having a carboxylic acid at a side chain thereof as a polyhydroxyalkanoate having a carboxylic acid at a side chain thereof. Biomacromolecules 2000, 1, 275 (Non-Patent Document 2) discloses a polymer in which a benzyloxycarbonyl group is introduced into a methylene group at position α of a carbonyl group in the main chain of poly(ε-caprolactone), the polymer being obtained by: allowing lithium diisopropylamide to react with poly(ε-caprolactone); and allowing the resultant to react with benzyl chloroformate. Macromolecular Bioscience 2004, 4, 232 (Non-Patent Document 3) discloses a polymer in which a (benzyloxycarbonyl)methyl group is introduced into a methylene group at position a of a carbonyl group in the main chain of polylactic acid, the polymer being obtained by: allowing lithium diisopropylamide to react with polylactic acid; and allowing the resultant to react with benzyl bromoacetate.

Polymeric Materials Science & Engineering 2002, 87, 254 (Non-Patent Document 4) discloses, as a polyhydroxyalkanoate having a vinyl group at a side chain thereof, a polymer obtained by ring-opening polymerization of α-allyl(δ-valerolactone). Similarly, Polymer Preprints 2002, 43 (2), 727 (Non-Patent Document 5) discloses, as a polyhydroxyalkanoate having a vinyl group at a side chain thereof, a polymer obtained by ring-opening polymerization of 3,6-diallyl-1,4-dioxane-2,5-dione as a six-membered ring diester monomer.

There has been reported a polymer having a new function into which a structure providing functional properties for a polyhydroxyalkanoate into which a chemically modifiable functional group is introduced as described above is introduced. International Journal of Biological Macromolecules 25 (1999) 265 (Non-Patent Document 6) discloses the following. A copolymer of α-type malic acid and glycolic acid is obtained by ring-opening polymerization of a cyclic dimer of α-type malic acid and glycolic acid, and the resultant polymer is deprotected to obtain a polyester having a carboxyl group at a side chain thereof. Tripeptide is chemically modified to the carboxyl group at the side chain, and the resultant polymer is evaluated for cell adhesion. At this time, a good result is obtained.

[Patent Document 1] U.S. Pat. No. 4,265,247
[Patent Document 2] Japanese Patent Application Laid-Open No. H02-003415
[Non-Patent Document 1] Macromolecules 2000, 33 (13), 4619-4627

[Non-Patent Document 2] Biomacromolecules 2000, 1, 275

[Non-Patent Document 3] Macromolecular Bioscience 2004, 4, 232

[Non-Patent Document 4] Polymeric Materials Science & Engineering 2002, 87, 254

[Non-Patent Document 5) Polymer Preprints 2002, 43 (2), 727

[Non-Patent Document 6] International Journal of Biological Macromolecules 25 (1999) 265

DISCLOSURE OF THE INVENTION

It may be possible that new functional properties can be provided by introducing a unit having a carboxyl group or a vinyl group, which is a reactive functional group, in a molecule as described above; and chemically modifying the reactive functional group. However, there have been a small number of reports concerning it. In view of the above, the present invention provides: a novel polyhydroxyalkanoate having a reactive functional group in a molecule and a method of producing the same; and a novel polyhydroxyalkanoate having a new function obtained by chemically modifying the polyhydroxyalkanoate having a reactive functional group and a method of producing the same.

The inventors of the present invention have made extensive studies with a view to developing a novel polyhydroxyalkanoate having a reactive functional group in a molecule and a novel polyhydroxyalkanoate having a new function obtained by chemically modifying the polyhydroxyalkanoate having a reactive functional group, thereby completing the invention described below.

The polyhydroxyalkanoate according to the present invention includes the following.

(1) A polyhydroxyalkanoate containing one or more units each represented by the chemical formula (1) in a molecule.

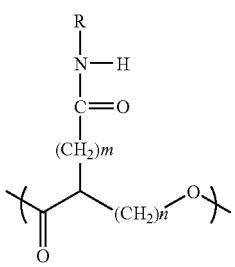

(1)

(In the formula, R represents $-A_1-SO_2R_1$. $R_1$ represents OH, a halogen atom, ONa, OK, or $OR_{1a}$. $R_{1a}$ and $A_1$ each independently represent a group having a substituted or unsubstituted aliphatic hydrocarbon structure, a substituted or unsubstituted aromatic ring structure, or a substituted or unsubstituted heterocyclic structure. In addition, n represents an integer selected from 1 to 4 and m represents an integer selected from 0 to 8. When multiple units exist, R, $R_1$, $R_{1a}$, $A_1$, m, and n each independently have the above meaning for each unit.)

(2) A polyhydroxyalkanoate containing one or more units each represented by the chemical formula (5).

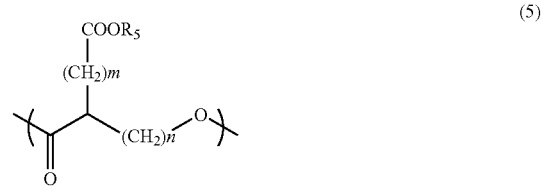

(5)

(In the formula, $R_5$ represents hydrogen, a group for forming a salt, or $R_{5a}$. $R_{5a}$ represents a linear or branched alkyl or aralkyl group having 1 to 12 carbon atoms, or a substituent having a saccharide. n represents an integer selected from 1 to 4 and m represents an integer selected from 0 to 8. When n 4, $R_5$ represents only a substituent having a saccharide for m=0. When multiple units exist, $R_5$, $R_{5a}$, m, and n each independently have the above meaning for each unit.)

(3) A polyhydroxyalkanoate containing one or more units each represented by the chemical formula (6).

(6)

(In the formula, n represents an integer selected from 1 to 4. When n represents an integer selected from 1, 2, and 4, m represents an integer selected from 0 to 8. When n=3, m represents an integer selected from 0 and 2 to 8. When multiple units exist, m and n each independently have the above meaning for each unit.)

Meanwhile, the method of producing a polyhydroxyalkanoate according to the present invention includes the following.

(A) A method of producing a polyhydroxyalkanoate represented by the chemical formula (6), characterized by including polymerizing a compound represented by the chemical formula (8) in the presence of a catalyst.

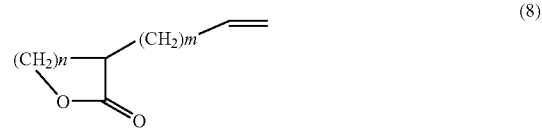

(8)

(In the formula, n represents an integer selected from 1 to 4. When n represents an integer selected from 1, 2, and 4, m represents an integer selected from 0 to 8. When n=3, m represents an integer selected from 0 and 2 to 8.)

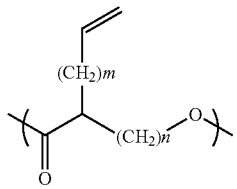

(6)

(In the formula, n represents an integer selected from 1 to 4. When n represents an integer selected from 1, 2, and 4, m represents an integer selected from 0 to 8. When n=3, m represents an integer selected from 0 and 2 to 8. When multiple units exist, m and n each independently have the above meaning for each unit.)

(B) A method of producing a polyhydroxyalkanoate containing a unit represented by the chemical formula (10), characterized by including subjecting a double bond portion of a polyhydroxyalkanoate containing a unit represented by the chemical formula (9) to an oxidation reaction.

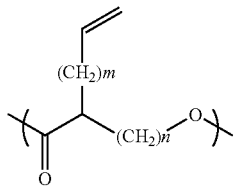

(9)

(In the formula, n represents an integer selected from 1 to 4 and m represents an integer selected from 0 to 8. When multiple units exist, m and n each independently have the above meaning for each unit.)

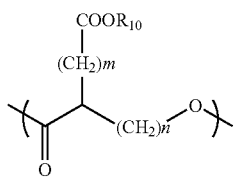

(10)

(In the formula, $R_{10}$ represents hydrogen or a group for forming a salt. n represents an integer selected from 1 to 4 and m represents an integer selected from 0 to 8. When multiple units exist, m, n, and $R_{10}$ each independently have the above meaning for each unit.)

(C) A method of producing a polyhydroxyalkanoate containing a unit represented by the chemical formula (1), characterized by including subjecting a polyhydroxyalkanoate containing a unit represented by the chemical formula (10) and at least one kind of amine compound represented by the chemical formula (11) to a condensation reaction.

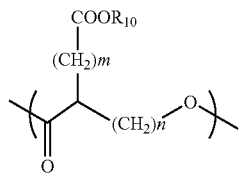

(10)

(In the formula, $R_{10}$ represents hydrogen or a group for forming a salt. n represents an integer selected from 1 to 4 and m represents an integer selected from 0 to 8. When multiple units exist, m, n, and $R_{10}$ each independently have the above meaning for each unit.)

$$H_2N-A_3-SO_2R_{11} \qquad (11)$$

(In the formula, $R_{11}$ represents OH, a halogen atom, ONa, OK, or $OR_{11a}$. $R_{11a}$ and $A_3$ are each independently selected from groups each having a substituted or unsubstituted aliphatic hydrocarbon structure, a substituted or unsubstituted aromatic ring structure, or a substituted or unsubstituted heterocyclic structure. When multiple units exist, $R_{11}$, $R_{11a}$, and $A_3$ each independently have the above meaning for each unit.)

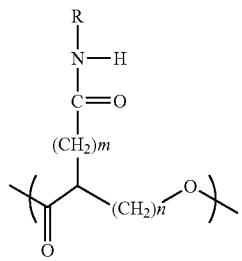

(1)

(In the formula, R represents $-A_1-SO_2R_1$. $R_1$ represents OH, a halogen atom, ONa, OK, or $OR_{1a}$. $R_{1a}$ and $A_1$ each independently represent a group having a substituted or unsubstituted aliphatic hydrocarbon structure, a substituted or unsubstituted aromatic ring structure, or a substituted or unsubstituted heterocyclic structure. n represents an integer selected from 1 to 3 and m represents an integer selected from 0 to 8. When multiple units exist, R, $R_1$, $R_{1a}$, $A_1$, m, and n each independently have the above meaning for each unit.)

(D) A method of producing a polyhydroxyalkanoate containing a unit represented by the chemical formula (101), characterized by including the steps of: allowing a polyhydroxyalkanoate containing a unit represented by the chemical formula (99) to react with a base; and allowing the compound obtained in the foregoing step to react with a compound represented by the chemical formula (100).

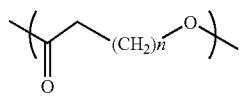

(99)

(In the formula, n represents an integer selected from 1 to 4. When multiple units exist, n's each independently have the above meaning for each unit.)

$$X(CH_2)_mCOOR_{100} \tag{100}$$

(In the formula, m represents an integer selected from 0 to 8. X represents a halogen atom. $R_{100}$ represents a linear or branched alkyl or aralkyl group having 1 to 12 carbon atoms. When n=4 in the chemical formula (99), m is not equal to 0.)

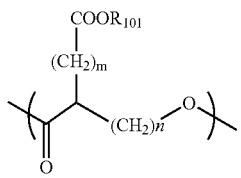
(101)

(In the formula, n represents an integer selected from 1 to 4. When n represents an integer selected from 1 to 3, m represents an integer selected from 0 to 8. When n=4, m represents an integer selected from 1 to 8. $R_{101}$ represents a linear or branched alkyl or aralkyl group having 1 to 12 carbon atoms. When multiple units exist, $R_{101}$, m, and n each independently have the above meaning for each unit.)

(E) A method of producing a polyhydroxyalkanoate containing a unit represented by the chemical formula (102), characterized by including the step of hydrolyzing a polyhydroxyalkanoate containing a unit represented by the chemical formula (101) in the presence of an acid or an alkali, or the step of subjecting the polyhydroxyalkanoate to hydrogenolysis including catalytic reduction.

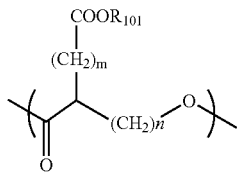
(101)

(In the formula, n represents an integer selected from 1 to 4. When n represents an integer selected from 1 to 3, m represents an integer selected from 0 to 8. When n=4, m represents an integer selected from 1 to 8. $R_{101}$ represents a linear or branched alkyl or aralkyl group having 1 to 12 carbon atoms. When multiple units exist, $R_{101}$, m, and n each independently have the above meaning for each unit.)

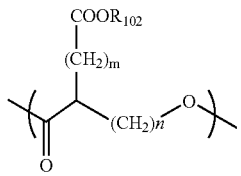
(102)

(In the formula, $R_{102}$ represents hydrogen or a group for forming a salt. n represents an integer selected from 1 to 4. When n represents an integer selected from 1 to 3, m represents an integer selected from 0 to 8. When n=4, m represents an integer selected from 1 to 8. When multiple units exist, $R_{102}$, m, and n each independently have the above meaning for each unit.)

(F) A method of producing a polyhydroxyalkanoate containing a unit represented by the chemical formula (104), characterized by including the steps of: allowing a polyhydroxyalkanoate containing a unit represented by the chemical formula (99) to react with a base; and allowing the compound obtained in the foregoing step to react with a compound represented by the chemical formula (103).

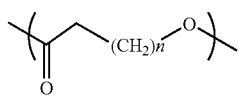
(99)

(In the formula, n represents an integer selected from 1 to 4. When multiple units exist, n's each independently have the above meaning for each unit.)

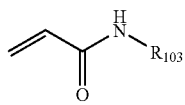
(103)

(In the formula, $R_{103}$ represents $—A_{103}—SO_2R_{103a}$. $R_{103a}$ represents OH, a halogen atom, ONa, OK, or $OR_{103b}$. $R_{103b}$ and $A_{103}$ are each independently selected from groups each having a substituted or unsubstituted aliphatic hydrocarbon structure, a substituted or unsubstituted aromatic ring structure, or a substituted or unsubstituted heterocyclic structure. When multiple units exist, $R_{103}$, $R_{103a}$, $R_{103b}$, and $A_{103}$ each independently have the above meaning for each unit.)

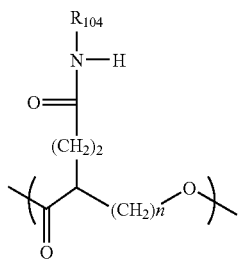
(104)

(In the formula, n represents an integer selected from 1 to 4. $R_{104}$ represents $—A_{104}—SO_2R_{104a}$. $R_{104a}$ represents OH, a halogen atom, ONa, OK, or $OR_{104b}$. $R_{104b}$ and $A_{104}$ each independently represent a group having a substituted or unsubstituted aliphatic hydrocarbon structure, a substituted or unsubstituted aromatic ring structure, or a substituted or unsubstituted heterocyclic structure. When multiple units exist, $R_{104}$, $R_{104a}$, $R_{104b}$, $A_{104}$, and n each independently have the above meaning for each unit.)

BEST MODE FOR CARRYING OUT THE INVENTION

Hereinafter, the contents of the present invention will be described. A polyhydroxyalkanoate containing a unit represented by the chemical formula (1) as a target in the present invention can be produced by a reaction between a polyhydroxyalkanoate containing a unit represented by the chemical formula (10) to be used as a starting material and at least one kind of aminosulfonic acid compound represented by the chemical formula (11).

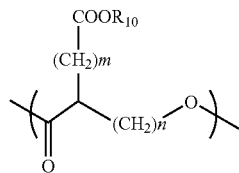

(In the formula, $R_{10}$ represents hydrogen or a group for forming a salt. n represents an integer selected from 1 to 4 and m represents an integer selected from 0 to 8. When multiple units exist, m, n, and $R_{10}$ each independently have the above meaning for each unit.)

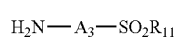

(In the formula, $R_{11}$ represents OH, a halogen atom, ONa, OK, or $OR_{11a}$. $R_{11a}$ and $A_3$ are each independently selected from a substituted or unsubstituted aliphatic hydrocarbon structure, a substituted or unsubstituted aromatic ring structure, and a substituted or unsubstituted heterocyclic structure ($R_{11a}$ represents a monovalent group having a structure selected from them, and $A_3$ represents a divalent group having a structure selected from them). When multiple units exist, $R_{11}$, $R_{11a}$, and $A_3$ each independently have the above meaning for each unit.)

More specifically, $R_{11}$ represents OH, a halogen atom, ONa, OK, or $OR_{11a}$. $R_{11a}$ represents a linear or branched alkyl group having 1 to 8 carbon atoms, or a substituted or unsubstituted phenyl group.

$A_3$ represents a liner or branched and substituted or unsubstituted alkylene group having 1 to 8 carbon atoms, a substituted or unsubstituted phenylene group, a substituted or unsubstituted naphthalene group, or a substituted or unsubstituted heterocyclic structure containing one or more of N, S, and O. When $A_3$ represents a ring structure, an unsubstituted ring may be further condensed. In addition, when multiple units exist, $R_{11}$, $R_{11a}$, and $A_3$ each independently have the above meaning for each unit.

When $A_3$ represents a linear and substituted or unsubstituted alkylene group, an aminosulfonic acid compound represented by the following chemical formula (16) is exemplified.

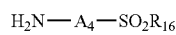

(In the formula, $R_{16}$ represents OH, a halogen atom, ONa, OK, or $OR_{16a}$. $R_{16a}$ represents a linear or branched alkyl group having 1 to 8 carbon atoms, or a substituted or unsubstituted phenyl group. $A_4$ represents a liner or branched and substituted or unsubstituted alkylene group having 1 to 8 carbon atoms, which may be substituted by an alkyl group having 1 to 20 carbon atoms, an alkoxy group having 1 to 20 carbon atoms, or the like as a substituent.)

Examples of the compound represented by the chemical formula (16) include 2-aminoethanesulfonic acid (taurine), 3-aminopropanesulfonic acid, 4-aminobutanesulfonic acid, 2-amino-2-methylpropanesulfonic acid, and alkali metal salts and esterified products thereof.

When $A_3$ represents a substituted or unsubstituted phenylene group, an aminosulfonic acid compound represented by the following chemical formula (17) is exemplified.

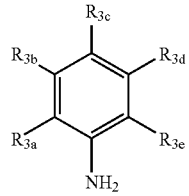

(In the formula, $R_{3a}$, $R_{3b}$, $R_{3c}$, $R_{3d}$, and $R_{3e}$ each independently represent $SO_2R_{3f}$ ($R_{3f}$ represents OH, a halogen atom, ONa, OK, or $OR_{3f1}$. ($R_{3f1}$ represents a linear or branched alkyl group having 1 to 8 carbon atoms, or a substituted or unsubstituted phenyl group.)), a hydrogen atom, a halogen atom, an alkyl group having 1 to 20 carbon atoms, an alkoxy group having 1 to 20 carbon atoms, an OH group, an $NH_2$ group, an $NO_2$ group, $COOR_{3g}$ ($R_{3g}$ represents an H atom, an Na atom, or a K atom.), an acetamide group, an OPh group, an NHPh group, a $CF_3$ group, a $C_2F_5$ group, or a $C_3F_7$ group (Ph represents a phenyl group.), and at least one of these groups represents $SO_2R_{3f}$. When multiple units exist, $R_{3a}$, $R_{3b}$, $R_{3c}$, $R_{3d}$, $R_{3e}$, $R_{3f}$, $R_{3f1}$, and $R_{3g}$ each independently have the above meaning for each unit.)

A polyhydroxyalkanoate having one or more units each represented by the chemical formula (3) can be obtained by using a compound represented by the chemical formula (17).

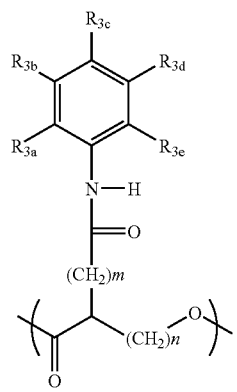

(In the formula, $R_{3a}$, $R_{3b}$, $R_{3c}$, $R_{3d}$, $R_{3e}$, n, and m each have the above meaning.) Examples of the compound represented by the chemical formula (17) include p-aminobenzenesulfonic acid (sulfanilic acid), m-aminobenzenesulfonic acid, o-aminobenzenesulfonic acid, m-toluidine-4-sulfonic acid, sodium o-toluidine-4-sulfonate, p-toluidine-2-sulfonic acid, 4-methoxyaniline-2-sulfonic acid, o-anisidine-5-sulfonic acid, p-anisidine-3-sulfonic acid, 3-nitroaniline-4-sulfonic acid, sodium 2-nitroaniline-4-sulfonate, sodium 4-nitroaniline-2-sulfonate, 1,5-dinitroaniline-4-sulfonic acid, 2-aminophenol-4-hydroxy-5-nitrobenzenesulfonic acid, sodium 2,4-dimethylaniline-5-sulfonate, 2,4-dimethylaniline-6-sulfonic acid, 3,4-dimethylaniline-5-sulfonic acid, 4-isopropylaniline-6-sulfonic acid, 4-trifluoromethylaniline-6-sulfonic acid, 3-carboxy-4-hydroxyaniline-5-sulfonic acid, 4-carboxyaniline-6-sulfonic acid, and alkali metal salts and esterified products thereof.

When $A_3$ represents a substituted or unsubstituted naphthalene group, an aminosulfonic acid compound represented by the following chemical formula (18A) or (18B) is exemplified.

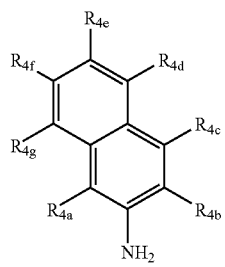

(18A)

(In the formula, $R_{4a}$, $R_{4b}$, $R_{4c}$, $R_{4d}$, $R_{4e}$, $R_{4f}$, and $R_{4g}$ each independently represent $SO_2R_{4o}$ ($R_{4o}$ represents OH, a halogen atom, ONa, OK, or $OR_{4o1}$. ($R_{4o1}$ represents a linear or branched alkyl group having 1 to 8 carbon atoms, or a substituted or unsubstituted phenyl group.)), a hydrogen atom, a halogen atom, an alkyl group having 1 to 20 carbon atoms, an alkoxy group having 1 to 20 carbon atoms, an OH group, an $NH_2$ group, an $NO_2$ group, $COOR_{4p}$ ($R_{4p}$ represents an H atom, an Na atom, or a K atom.), an acetamide group, an OPh group, an NHPh group, a $CF_3$ group, a $C_2F_5$ group, or a $C_3F_7$ group (Ph represents a phenyl group.), and at least one of these groups represents $SO_2R_{4o}$.)

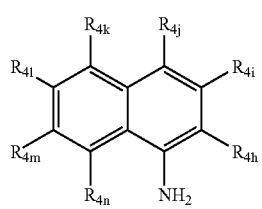

(18B)

(In the formula, $R_{4h}$, $R_{4i}$, $R_{4j}$, $R_{4k}$, $R_{4l}$, $R_{4m}$, and $R_{4n}$ each independently represent $SO_2R_{4o}$ ($R_{4o}$ represents OH, a halogen atom, ONa, OK, or $OR_{4o1}$. ($R_{4o1}$ represents a linear or branched alkyl group having 1 to 8 carbon atoms, or a substituted or unsubstituted phenyl group.)), a hydrogen atom, a halogen atom, an alkyl group having 1 to 20 carbon atoms, an alkoxy group having 1 to 20 carbon atoms, an OH group, an $NH_2$ group, an $NO_2$ group, $COOR_{4p}$ ($R_{4p}$ represents an H atom, an Na atom, or a K atom.), an acetamide group, an OPh group, an NHPh group, a $CF_3$ group, a $C_2F_5$ group, or a $C_3F_7$ group (Ph represents a phenyl group.), and at least one of these groups represents $SO_2R_{4o}$.)

A polyhydroxyalkanoate having one or more units each represented by the chemical formula (4A) or (4B) in a molecule can be obtained by using a compound represented by the chemical formula (18A) or (18B).

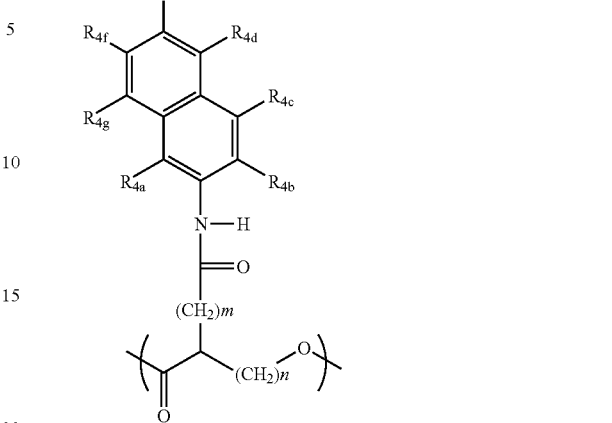

(4A)

(In the formula, $R_{4a}$, $R_{4b}$, $R_{4c}$, $R_{4d}$, $R_{4e}$, $R_{4f}$, $R_{4g}$, n, and m each have the above meaning.)

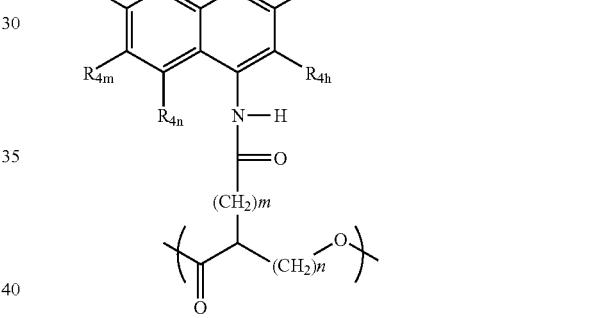

(4B)

(In the formula, $R_{4h}$, $R_{4i}$, $R_{4j}$, $R_{4k}$, $R_{4l}$, $R_{4m}$, $R_{4n}$, m, and n each have the above meaning.) Examples of the compound represented by the chemical formula (18A) or (18B) include: sulfonic acids such as 1-naphthylamine-5-sulfonic acid, 1-naphthylamine-4-sulfonic acid, 1-naphthylamine-8-sulfonic acid, 2-naphthylamine-5-sulfonic acid, 1-naphthylamine-6-sulfonic acid, 1-naphthylamine-7-sulfonic acid, 1-naphthylamine-2-ethoxy-6-sulfonic acid, 1-amino-2-naphthol-4-sulfonic acid, 6-amino-1-naphthol-3-sulfonic acid, sodium 1-amino-8-naphthol-2,4-sulfonate, sodium 1-amino-8-naphthol-3,6-sulfonate; and alkali metal salts and esterified products of the sulfonic acids.

When $A_3$ represents a substituted or unsubstituted heterocyclic structure containing one or more of N, S, and O, $A_3$ may represent any one of a pyridine ring, a piperazine ring, a furan ring, and a thiol ring as a heterocyclic ring. Examples of such a compound include: sulfonic acids such as 2-aminopyridine-6-sulfonic acid and 2-aminopiperazine-6-sulfonic acid; and alkali metal salts and esterified products of the sulfonic acids.

As described above, examples of a group forming an ester bond with a sulfonic acid in the case of a sulfonate include a substituted or unsubstituted aliphatic hydrocarbon structure, a substituted or unsubstituted aromatic ring structure, and a substituted or unsubstituted heterocyclic structure). Furthermore, a linear or branched alkyl group having 1 to 8 carbon atoms, a substituted or unsubstituted phenyl group, or the like is preferable. From the viewpoint of, for example, ease of esterification, one having a group such as $OCH_3$, $OC_2H_5$, $OC_6H_5$, $OC_3H_7$, $OC_4H_9$, $OCH(CH_3)_2$, $OCH_2C(CH_3)_3$, or $OC(CH_3)_3$ is more preferable.

(Method of producing polyhydroxyalkanoate having unit represented by chemical formula (1))

A reaction between a polyhydroxyalkanoate containing a unit represented by the chemical formula (10) and an aminosulfonic acid compound represented by the chemical formula (11) in the present invention will be described in detail.

The amount of the compound represented by the chemical formula (11) to be used in the present invention is in the range of 0.1 to 50.0 times mole, or preferably 1.0 to 20.0 times mole with respect to the unit represented by the chemical formula (10) to be used as a starting material. An example of a method of producing an amide bond from a carboxylic acid and an amine in the present invention includes a condensation reaction by virtue of heat dehydration. In particular, from the viewpoint of achieving a mild reaction condition under which an ester bond of a polymer main chain is not cleaved, a method is effective, which involves: activating a carboxylic acid portion with an activator to produce an active acyl intermediate; and allowing the intermediate to react with an amine. Examples of the active acyl intermediate include an acid halide, an acid anhydride, and an active ester. In particular, a method of forming an amide bond in an identical reaction field by using a condensing agent is preferable from the viewpoint of simplifying a production process.

If required, the active acyl intermediate may be isolated as an acid halide before being subjected to a condensation reaction with an amine.

A phosphoric acid-based condensing agent used for polycondensation of an aromatic polyamide, a carbodiimide-based condensing agent used for synthesizing a peptide, an acid chloride-based condensing agent, or the like can be appropriately selected as a condensing agent to be used depending on the combination of the chemical formulae (11) and (10).

Examples of the phosphoric acid-based condensing agent include a phosphite-based condensing agent, a phosphorus chloride-based condensing agent, a phosphoric anhydride-based condensing agent, a phosphate-based condensing agent, and a phosphoric amide-based condensing agent.

A phosphite-based condensing agent or the like can be used in the reaction of the present invention. Examples of a phosphite used at this time include triphenyl phosphite, diphenyl phosphite, tri-o-tolyl phosphite, di-o-tolyl phosphite, tri-m-tolyl phosphite, di-m-tolyl phosphite, tri-p-tolyl phosphite, di-p-tolyl phosphite, di-o-chlorophenyl phosphite, tri-p-chlorophenyl phosphite, di-p-chlorophenyl phosphite, trimethyl phosphite, and triethyl phosphite. Of those, triphenyl phosphite is preferably used. A metal salt such as lithium chloride or calcium chloride may be added for improving the solubility, reactivity, and the like of a polymer.

Examples of the carbodiimide-based condensing agent include dicyclohexyl carbodiimide (DCC), N-ethyl-N'-3-dimethylaminopropyl carbodiimide (EDC=WSCI), and diisopropyl carbodiimide (DIPC). DCC or WSCI may be used in combination with N-hydroxysuccineimide (HONSu), 1-hydroxybenzotriazole (HOBt), 3-hydroxy-4-oxo-3,4-dihydro-1,2,3-benzotriazine (HOObt), or the like.

The amount of the condensing agent to be used is in the range of 0.1 to 50 times mole, or preferably 1 to 20 times mole with respect to the compound represented by the chemical formula (10).

A solvent may be used as required in the reaction of the present invention. Examples of an available solvent include: hydrocarbons such as hexane, cyclohexane, and heptane; ketones such as acetone and methyl ethyl ketone; ethers such as dimethyl ether, diethyl ether, and tetrahydrofuran; halogenated hydrocarbons such as dichloromethane, chloroform, carbon tetrachloride, dichloroethane, and trichloroethane; aromatic hydrocarbons such as benzene and toluene; aprotic polar solvents such as N,N-dimethylformamide, dimethyl sulfoxide, dimethyl acetamide, and hexamethylphosphoramide; pyridine derivatives such as pyridine and picoline; and N-methylpyrrolidone. Pyridine, N-methylpyrrolidone, or the like is particularly preferably used. The amount of the solvent to be used can be appropriately determined in accordance with kinds of a starting material and a base, a reaction condition, and the like.

A reaction temperature is not particularly limited in the method of the present invention, but is generally in the range of $-20°$ C. to the boiling point of a solvent. However, it is preferable to perform the reaction at an optimum temperature suited for a condensing agent to be used.

In the method of the present invention, a reaction time is generally in the range of 1 to 48 hours. The reaction time is particularly preferably in the range of 1 to 10 hours.

A thus produced reaction solution containing a polyhydroxyalkanoate having a unit represented by the chemical formula (1) in the present invention can be collected and purified by, for example, distillation as an ordinary method. Alternatively, the reaction solution can be collected by: mixing a solvent (for example, water, an alcohol such as methanol or ethanol, or an ether such as dimethyl ether, diethyl ether, or tetrahydrofuran) evenly with the reaction solution; and repricipitating a target polyhydroxyalkanoate having a unit represented by the chemical formula (1). The resultant polyhydroxyalkanoate having a unit represented by the chemical formula (1) can be subjected to isolation purification as required. A method for the isolation purification is not particularly limited, and a method involving reprecipitation using a solvent insoluble in the polyhydroxyalkanoate represented by the chemical formula (1), a method according to column chromatography, dialysis, or the like can be used.

When an R portion in the chemical formula (1) is $—A_1—SO_3H$, a method can be adopted as another production method of the present invention, which involves methyl esterifying the R portion in the chemical formula (1) into $—A_1—SO_3CH_3$ using a methyl-esterifying agent after a condensation reaction with an amine. Examples of an available methyl-esterifying agent include those used for methyl esterification of an aliphatic acid in gas chromatography. Examples of a methyl esterification method include: acid catalyst methods such as a hydrochloric acid-methanol method, a boron trifluoride-methanol method, and a sulfuric acid-methanol method; and base catalyst methods such as a sodium methoxide method, a tetramethylguanidine method, and a trimethylsilyldiazomethane method. Of those, a trimethylsilyldiazomethane method is preferable because methylation can be performed under a moderate condition.

Examples of a solvent to be used in the reaction of the present invention include: hydrocarbons such as hexane, cyclohexane, and heptane; alcohols such as methanol and ethanol; halogenated hydrocarbons such as dichloromethane, chloroform, carbon tetrachloride, dichloroethane, and trichloroethane; and aromatic hydrocarbons such as benzene and toluene. Halogenated hydrocarbons and the like are particularly preferably used. The amount of the solvent to be used can be appropriately determined in accordance with a starting material, a reaction condition, and the like. A reaction temperature is not particularly limited in the method of the present invention, but is generally in the range of −20° C. to 30° C. However, it is preferable to perform the reaction at an optimum temperature suited for a condensing agent and a reagent to be used.

In addition, a polyhydroxyalkanoate having a unit represented by the chemical formula (104) included in the chemical formula (1) of the present invention can be produced through the steps of: allowing a polyhydroxyalkanoate having a unit represented by the chemical formula (99) as a starting material to react with a base; and allowing the compound obtained in the foregoing step to react with a compound represented by the chemical formula (103).

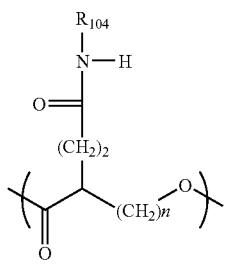

(104)

(In the formula, n represents an integer selected from 1 to 4. $R_{104}$ represents $-A_{104}-SO_2R_{104a}$. $R_{104a}$ represents OH, a halogen atom, ONa, OK, or $OR_{104b}$. $R_{104b}$ and $A_{104}$ each independently represent a substituted or unsubstituted aliphatic hydrocarbon structure, a substituted or unsubstituted aromatic ring structure, or a substituted or unsubstituted heterocyclic structure. When multiple units exist, $R_{104}$, $R_{104a}$, $R_{104b}$, $A_{104}$, and n each independently have the above meaning for each unit.)

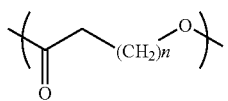

(99)

(In the formula, n represents an integer selected from 1 to 4. When multiple units exist, n's each independently have the above meaning for each unit.)

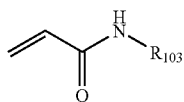

(103)

(In the formula, $R_{103}$ represents $-A_{103}-SO_2R_{103a}$. $R_{103a}$ represents OH, a halogen atom, ONa, OK, or $OR_{103b}$. $R_{103b}$ and $A_{103}$ are each independently selected from a substituted or unsubstituted aliphatic hydrocarbon structure, a substituted or unsubstituted aromatic ring structure, and a substituted or unsubstituted heterocyclic structure. When multiple units exist, $R_{103}$, $R_{103a}$, $R_{103b}$, and $A_{103}$ each independently have the above meaning for each unit.)

Examples of the compound represented by the chemical formula (103) include 2-acrylamide-2-methylpropane-sulfonic acid, and alkali metal salts and esterified products thereof.

A reaction between the polyhydroxyalkanoate containing a unit represented by the chemical formula (99) and the compound represented by the chemical formula (103) in the present invention will be described in detail.

The present invention can be achieved by subjecting an α-methylene group adjacent to a carbonyl group in a polymer main chain to a Michael addition reaction with the compound represented by the chemical formula (103). To be specific, the present invention can be achieved by: allowing the polyhydroxyalkanoate containing a unit represented by the chemical formula (99) to react with a base capable of forming into an action an α-methylene group which is adjacent to a carbonyl group in the polymer main chain of the polyhydroxyalkanoate containing a unit represented by the chemical formula (99) under a Michael addition reaction condition; and allowing the resultant to react with the compound represented by the chemical formula (103). In the present invention, the amount of the compound represented by the chemical formula (103) to be used is 0.001 to 100 times mole, or preferably 0.01 to 10 times mole with respect to the unit represented by the chemical formula (99).

A solvent to be used in the reaction of the present invention is not particularly limited as long as it is inactive to the reaction and dissolves the staring material to some extent. Examples of such a solvent include: aliphatic hydrocarbons such as hexane, cyclohexane, heptane, ligroin, and petroleum ether; aromatic hydrocarbons such as benzene, toluene, and xylene; ethers such as diethyl ether, diisopropyl ether, tetrahydrofuran, dioxane, dimethoxyethane, and diethyleneglycoldimethylether; and amides such as formamide, N,N-dimethylformamide, N,N-dimethylacetamide, N-methyl-2-pyrrolidone, N-methylpyrrolidinone, and hexamethylphosphortriamide. Of those, tetrahydrofuran is preferable.

The reaction is performed in the presence of a base. Examples of a base to be used include: lithium alkyls such as methyl lithium and butyl lithium; alkali metal disilazides such as lithium hexamethyl disilazide, sodium hexamethyl disilazide, and potassium hexamethyl disilazide; and lithium amides such as lithium diisopropylamide and lithium dicyclohexylamide. Of those, lithium diisopropylamide is preferable. In addition, the amount of the base to be used is 0.001 to 100 times mole, or preferably 0.01 to 10 times mole with respect to the unit represented by the chemical formula (99).

In the method of the present invention, a reaction temperature is generally in the range of −78° C. to 40° C., or preferably in the range of −78° C. to 30° C.

In the method of the present invention, a reaction time is generally in the range of 10 minutes to 24 hours. The reaction time is particularly preferably in the range of 10 minutes to 4 hours.

In the polyhydroxyalkanoate having a unit represented by the chemical formula (5) of the present invention, the polyhydroxyalkanoate having a unit represented by the chemical formula (10A) can be produced by oxidizing a side chain double bond portion of a polyhydroxyalkanoate having a unit represented by the chemical formula (9A) as a starting material.

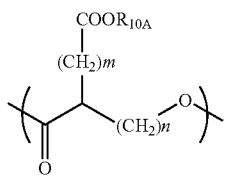

(10A)

(In the formula, $R_{10A}$ represents hydrogen or a group for forming a salt. n represents an integer selected from 1 to 4. When n represents an integer selected from 1 to 3, m represents an integer selected from 0 to 8. When n=4, m represents an integer selected from 1 to 8. When multiple units exist, m, n, and $R_{10A}$ each independently have the above meaning for each unit.)

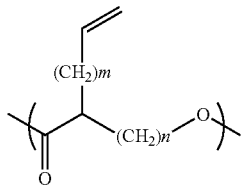

(9A)

(In the formula, n represents an integer selected from 1 to 4. When n represents an integer selected from 1 to 3, m represents an integer selected from 0 to 8. When n=4, m represents an integer selected from 1 to 8. When multiple units exist, m and n each independently have the above meaning for each unit.)

Known examples of a method of obtaining a carboxylic acid by subjecting such a carbon-carbon double bond as described above to oxidation cleavage by means of an oxidizing agent include a method involving the use of a permanganate (J. Chem. Soc., Perkin. Trans. 1, 806 (1973)), a method involving the use of a dichromate (Org. Synth., 4, 698 (1963)), a method involving the use of a periodate (J. Org. Chem., 46, 19 (1981)), a method involving the use of nitric acid (Japanese Patent Application Laid-open No. S59-190945), and a method involving the use of ozone (J. Am. Chem. Soc., 81, 4273 (1959)). In addition, Comptes Rendus de l'Academic des Sciences-Series IIC-Chemistry, 4, 289-293 (2001) has reported a method of obtaining a carboxylic acid involving subjecting a carbon-carbon double bond of a side chain terminal of a polyhydroxyalkanoate produced by using an organism to a reaction under acidic conditions using potassium permanganate as an oxidizing agent. A similar method can be used in the present invention.

Potassium permanganate is generally used as a permanganate to be used as an oxidizing agent. The amount of the permanganate to be used is generally 1 mole equivalent or more, or preferably 2 to 10 mole equivalents with respect to 1 mole of the unit represented by the chemical formula (9A) because an oxidation cleavage reaction is a stoichiometric reaction.

Various inorganic acids such as sulfuric acid, hydrochloric acid, acetic acid, and nitric acid, and organic acids are generally used to place a reaction system under an acid condition. However, the use of an acid such as sulfuric acid, nitric acid, or hydrochloric acid may cause a molecular weight to reduce because an ester bond of a main chain is cleaved. Therefore, acetic acid is preferably used. The amount of an acid to be used is generally in the range of 0.2 to 2,000 mole equivalents, or preferably in the range of 0.4 to 1,000 mole equivalents with respect to 1 mole of the unit represented by the chemical formula (9A). An amount of 0.2 mole equivalent or more is preferable because a high yield is achieved. An amount of 2,000 mole equivalents or less is preferable because the amount of a decomposed product due to the acid produced as a by-product can be reduced. Therefore, the amount of an acid is preferably used within the above-described range. In addition, a crown-ether can be used for the purpose of accelerating the reaction. In this case, the crown-ether and the permanganate form a complex, thereby providing an enhancing effect on reaction activity. Dibenzo-18-crown-6-ether, dicyclo-18-crown-6-ether, or 18-crown-6-ether is generally used as the crown-ether. The amount of the crown-ether to be used is generally in the range of 0.005 to 2.0 mole equivalents, or preferably in the range of 0.01 to 1.5 mole equivalents with respect to 1 mole of the permanganate.

A solvent to be used in an oxidation reaction is not particularly limited as long as it is inactive to the reaction. Examples of such a solvent include: water; acetone; ethers such tetrahydrofuran and dioxane; aromatic hydrocarbons such as benzene; aliphatic hydrocarbons such as hexane and heptane; and halogenated hydrocarbons such as methyl chloride, dichloromethane, and chloroform. Of those solvents, halogenated hydrocarbons such as methyl chloride, dichloromethane, and chloroform, and acetone are preferable in consideration of the solubility of the polyhydroxyalkanoate.

In the oxidation reaction of the present invention, the polyhydroxyalkanoate containing a unit represented by the chemical formula (9A), the permanganate, and the acid may be collectively charged together with a solvent at the first stage to carry out a reaction, or each of them may be continuously or intermittently added to a system to carry out a reaction. Alternatively, only the permanganate may be dissolved or suspended into the solvent in advance, and subsequently the polyhydroxyalkanoate and the acid may be continuously or intermittently added to the system to carry out a reaction. Alternatively, only the polyhydroxyalkanoate may be dissolved or suspended into the solvent in advance, and subsequently the permanganate and the acid may be continuously or intermittently added to the system to carry out a reaction. Furthermore, the polyhydroxyalkanoate and the acid may be charged in advance, and subsequently the permanganate may be continuously or intermittently added to the system to carry out a reaction. Alternatively, the permanganate and the acid may be charged in advance, and subsequently the polyhydroxyalkanoate may be continuously or intermittently added to the system to carry out a reaction. Alternatively, the polyhydroxyalkanoate and the permanganate may be charged in advance, and subsequently the acid may be continuously or intermittently added to the system to carry out a reaction.

A reaction temperature is generally in the range of −40° C. to 40° C., or preferably in the range of −10° C. to 30° C. A reaction time, which depends on the stoichiometric mixture ratio between the unit represented by the chemical formula (9A) and the permanganate and the reaction temperature, is generally in the range of 2 to 48 hours.

It should be noted that a polyhydroxyalkanoate containing a unit represented by the chemical formula (10B) shown in the present invention can be produced from a polyhydroxyalkanoate containing a unit represented by the chemical formula (9B) by means of a method similar to the oxidation reaction described above. This method is a novel production method.

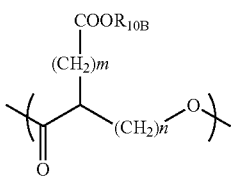

(10B)

(In the formula, $R_{10B}$ represents hydrogen or a group for forming a salt. n represents 4 and m represents 0.)

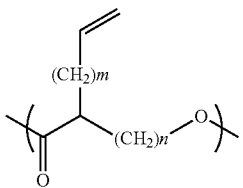

(9B)

(In the formula, n represents 4 and m represents 0.)

In addition, in the polyhydroxyalkanoate having a unit represented by the chemical formula (5), the polyhydroxyalkanoate having a unit represented by the chemical formula (102) can be produced by hydrolyzing a side chain ester portion of a polyhydroxyalkanoate having a unit represented by the chemical formula (101) as a starting material in the presence of an acid or an alkali, or by subjecting the polyhydroxyalkanoate to hydrogenolysis including catalytic reduction.

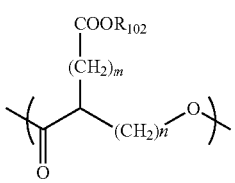

(102)

(In the formula, $R_{102}$ represents hydrogen or a group for forming a salt. n represents an integer selected from 1 to 4. When n represents an integer selected from 1 to 3, m represents an integer selected from 0 to 8. When n=4, m represents an integer selected from 1 to 8. When multiple units exist, $R_{102}$, m, and n each independently have the above meaning for each unit.)

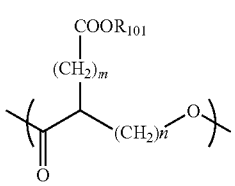

(101)

(In the formula, n represents an integer selected from 1 to 4. When n represents an integer selected from 1 to 3, m represents an integer selected from 0 to 8. When n=4, m represents an integer selected from 1 to 8. $R_{101}$ represents a linear or branched alkyl or aralkyl group having 1 to 12 carbon atoms. When multiple units exist, $R_{101}$, m, and n each independently have the above meaning for each unit.) In the case where hydrolysis in the presence of an acid or an alkali is employed, the hydrolysis can be performed by using, in an aqueous solution or a hydrophilic organic solvent such as methanol, ethanol, tetrahydrofuran, dioxane, dimethylformamide, or dimethyl sulfoxide as a solvent, an aqueous solution of an inorganic acid such as hydrochloric acid, sulfuric acid, nitric acid, or phosphoric acid, an organic acid such as trifluoroacetic acid, trichloroacetic acid, p-toluenesulfonic acid, or methanesulfonic acid, an aqueous caustic alkali such as sodium hydroxide or potassium hydroxide, an aqueous solution of an alkali carbonate such as sodium carbonate or potassium carbonate, or an alcohol solution of a metal alkoxide such as sodium methoxide or sodium ethoxide. A reaction temperature is generally in the range of 0° C. to 40° C., or preferably in the range of 0° C. to 30° C. A reaction time is generally in the range of 0.5 to 48 hours. When hydrolysis is performed in the presence of an acid or an alkali, in each case, an ester bond of a main chain is cleaved, and a reduction in molecular weight is observed in some cases.

A method of obtaining a carboxylic acid by way of hydrogenolysis including catalytic reduction is performed as follows. That is, in an appropriate solvent, in the temperature range of −20° C. to the boiling point of the solvent used, or preferably 0 to 50° C., in the presence of a reduction catalyst, hydrogen is allowed to act under normal or increased pressure to perform catalytic reduction. Examples of the solvent used include water, methanol, ethanol, propanol, hexafluoroisopropanol, ethyl acetate, diethyl ether, tetrahydrofuran, dioxane, benzene, toluene, dimethylformamide, pyridine, and N-methylpyrrolidone. A mixed solvent of the above solvents may also be used. A catalyst such as palladium, platinum, or rhodium which is used singly or used while being carried by a carrier, Raney nickel, or the like is used as the reduction catalyst. A reaction time is generally in the range of 0.5 to 72 hours. A thus produced reaction solution containing a polyhydroxyalkanoate having a unit represented by the chemical formula (102) is collected as a crude polymer by: removing the catalyst through filtration; and removing the solvent through distillation or the like. The resultant polyhydroxyalkanoate having a unit represented by the chemical formula (102) can be subjected to isolation purification as required. A method for the isolation purification is not particularly limited, and a method involving reprecipitation using a solvent insoluble in the polyhydroxyalkanoate having a unit represented by the chemical formula (102), a method according to column chromatography, dialysis, or the like can be used. Provided, however, that even in the case where catalytic reduction is employed, an ester bond of a main chain is cleaved, and a reduction in molecular weight is observed in some cases.

In addition, in the polyhydroxyalkanoate having a unit represented by the chemical formula (5) of the present invention, a polyhydroxyalkanoate having a unit represented by the chemical formula (19) can be produced by esterifying a polyhydroxyalkanoate represented by the chemical formula (10) as a staring material by means of an esterifying agent.

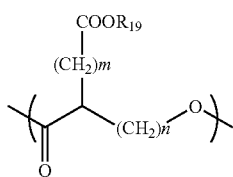

(19)

(In the formula, $R_{19}$ represents a linear or branched alkyl or aralkyl group having 1 to 12 carbon atoms, or a substituent having a saccharide. n represents an integer selected from 1 to 4 and m represents an integer selected from 0 to 8. When n=4, $R_{19}$ represents only a substituent having a saccharide for m=0. When multiple units exist, m, n, and $R_{19}$ each independently have the above meaning for each unit.)

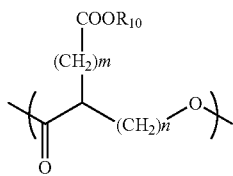

(10)

(In the formula, $R_{10}$ represents hydrogen or a group for forming a salt. n represents an integer selected from 1 to 4 and m represents an integer selected from 0 to 8. When multiple units exist, m, n, and $R_{10}$ each independently have the above meaning for each unit.)

Examples of the esterifying agent to be used include diazomethane and DMF dimethylacetals. For example, the polyhydroxyalkanoate having a unit represented by the chemical formula (10) easily reacts with timethylsilyldiazomethane, DMF dimethylacetal, DMF diethylacetal, DMF dipropylacetal, DMF diisopropylacetal, DMF-n-butylacetal, DMF-tert-butylacetal, DMF dineopentylacetal, or the like to produce a corresponding ester. Furthermore, the polyhydroxyalkanoate is allowed to react with any one of alcohols such as methanol, ethanol, propanol, isopropyl alcohol, butyl alcohol, sec-butyl alcohol, tert-butyl alcohol, pentyl alcohol, neopentyl alcohol, hexyl alcohol, heptyl alcohol, octyl alcohol, nonyl alcohol, decyl alcohol, and lauryl alcohol, or any one of saccharides for introducing a sugar structure such as D-glucose, D-fructose, and otherwise by using an acid catalyst or a condensing agent such as DCC to produce an esterified polyhydroxyalkanoate.

In addition, a polyhydroxyalkanoate having a unit represented by the chemical formula (101) included in the chemical formula (5) can be produced through the steps of: allowing a polyhydroxyalkanoate having a unit represented by the chemical formula (99) as a starting material to react with a base; and allowing the compound-obtained in the foregoing step to react with a compound represented by the chemical formula (100).

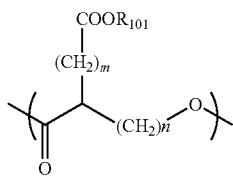

(101)

(In the formula, n represents an integer selected from 1 to 4. When n represents an integer selected from 1 to 3, m represents an integer selected from 0 to 8. When n=4, m represents an integer selected from 1 to 8. $R_{101}$ represents a linear or branched alkyl or aralkyl group having 1 to 12 carbon atoms. When multiple units exist, $R_{101}$, m, and n each independently have the above meaning for each unit.)

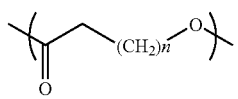

(99)

(In the formula, n represents an integer selected from 1 to 4. When multiple units exist, n's each independently have the above meaning for each unit.)

$$X(CH_2)mCOOR_{100}$$ (100)

(In the formula, m represents an integer selected from 0 to 8. X represents a halogen atom. $R_{100}$ represents a linear or branched alkyl or aralkyl group having 1 to 12 carbon atoms. When n=4 in the chemical formula (99), m is not equal to 0.)

Examples of the compound represented by the chemical formula (100) include methyl chloroformate, ethyl chloroformate, propyl chloroformate, isopropyl chloroformate, butyl chloroformate, cyclohexyl chloroformate, benzyl chloroformate, methyl bromoformate, ethyl bromoformate, propyl bromoformate, isopropyl bromoformate, butyl bromoformate, cyclohexyl bromoformate, benzyl bromoformate, methyl chloroacetate, ethyl chloroacetate, propyl chloroacetate, isopropyl chloroacetate, butyl chloroacetate, cyclohexyl chloroacetate, benzyl chloroacetate, methyl bromoacetate, ethyl bromoacetate, propyl bromoacetate, isopropyl bromoacetate, butyl bromoacetate, cyclohexyl bromoacetate, benzyl bromoacetate, methyl 3-chloropropionate, ethyl 3-chloropropionate, propyl 3-chloropropionate, isopropyl 3-chloropropionate, butyl 3-chloropropionate, cyclohexyl 3-chloropropionate, benzyl 3-chloropropionate, methyl 3-bromopropionate, ethyl 3-bromopropionate, propyl 3-bromopropionate, isopropyl 3-bromopropionate, butyl 3-bromopropionate, cyclohexyl 3-bromopropionate, benzyl 3-bromopropionate, methyl 4-chlorobutyrate, ethyl 4-chlorobutyrate, propyl 4-chlorobutyrate, isopropyl 4-chlorobutyrate, butyl 4-chlorobutyrate, cyclohexyl 4-chlorobutyrate, benzyl 4-chlorobutyrate, methyl 4-bromobutyrate, ethyl 4-bromobutyrate, propyl 4-bromobutyrate, isopropyl 4-bromobutyrate, butyl 4-bromobutyrate, cyclohexyl 4-bromobutyrate, benzyl 4-bromobutyrate, methyl 5-chlorovalerate, ethyl 5-chlorovalerate, propyl 5-chlorovalerate, isopropyl 5-chlorovalerate, butyl 5-chlorovalerate, cyclohexyl 5-chlorovalerate, benzyl 5-chlorovalerate, methyl 5-bromovalerate, ethyl 5-bromovalerate, propyl 5-bromovalerate, isopropyl 5-bromovalerate, butyl 5-bromovalerate, cyclohexyl 5-bromovalerate, benzyl 5-bromovalerate, methyl 6-chlorohexanoate, ethyl 6-chlorohexanoate, propyl 6-chlorohexanoate, isopropyl 6-chlorohexanoate, butyl 6-chlorohexanoate, cyclohexyl 6-chlorohexanoate, benzyl 6-chlorohexanoate, methyl 6-bromohexanoate, ethyl 6-bromohexanoate, propyl 6-bromohexanoate, isopropyl 6-bromohexanoate, butyl 6-bromohexanoate, cyclohexyl 6-bromohexanoate, benzyl 6-bromohexanoate, methyl 7-chloroheptanoate, ethyl 7-chloroheptanoate, propyl 7-chloroheptanoate, isopropyl 7-chloroheptanoate, butyl 7-chloroheptanoate, cyclohexyl 7-chloroheptanoate, benzyl 7-chloroheptanoate, methyl 7-bromoheptanoate, ethyl 7-bromoheptanoate, propyl 7-bromoheptanoate, isopropyl 7-bromoheptanoate, butyl 7-bromoheptanoate, cyclohexyl 7-bromoheptanoate, benzyl 7-bromooctanoate, methyl 8-chlorooctanoate, ethyl 8-chlorooctanoate, propyl 8-chlorooctanoate, isopropyl 8-chlorooctanoate, butyl 8-chlorooctanotate, cyclohexyl 8-chlorooctanoate, benzyl 8-chlorooctanoate, methyl 8-bromooctanoate, ethyl 8-bromooctanoate, propyl 8-bromooctanoate, isopropyl 8-bromooctanoate, butyl 8-bromooctanoate, cyclohexyl 8-bromooctanoate, benzyl 8-bromooctanoate, methyl 9-chlorononanoate, ethyl 9-chlorononanoate, propyl 9-chlorononanoate, isopropyl 9-chlorononanoate, butyl 9-bromononanoate, cyclohexyl 9-chlorononanoate, benzyl 9-chlorononanoate, methyl 9-bromononanoate, ethyl 9-bromononanoate, propyl 9-bromononanoate, isopropyl 9-bromononanoate, butyl 9-bromononanoate, cyclohexyl 9-bromononanoate, and benzyl 9-bromononanoate.

A reaction between the polyhydroxyalkanoate containing a unit represented by the chemical formula (99) and the compound represented by the chemical formula (100) in the present invention will be described in detail.

The present invention can be achieved by subjecting an α-methylene group adjacent to a carbonyl group in a polymer main chain to an addition reaction with the compound represented by the chemical formula (100). To be specific, the present invention can be achieved by: allowing the polyhydroxyalkanoate containing a unit represented by the chemical formula (99) to react with a base capable of forming into an action an α-methylene group which is adjacent to a carbonyl group in the polymer main chain of the polyhydroxyalkanoate containing a unit represented by the chemical formula (99) under an addition reaction condition; and allowing the resultant to react with the compound represented by the chemical formula (100). In the present invention, the amount of the compound represented by the chemical formula (100) to be used is 0.001 to 100 times mole, or preferably 0.01 to 10 times mole with respect to the unit represented by the chemical formula (99).

A solvent to be used in the reaction of the present invention is not particularly limited as long as it is inactive to the reaction and dissolves the staring material to some extent. Examples of such a solvent include: aliphatic hydrocarbons such as hexane, cyclohexane, heptane, ligroin, and petroleum ether; aromatic hydrocarbons such as benzene, toluene, and xylene; ethers such as diethyl ether, diisopropyl ether, tetrahydrofuran, dioxane, dimethoxyethane, and diethyleneglycoldimethylether; and amides such as formamide, N,N-dimethylformamide, N,N-dimethylacetamide, N-methyl-2-pyrrolidone, N-methylpyrrolidinone, and hexamethylphosphoramide. Of those, tetrahydrofuran is preferable.

The reaction is performed in the presence of a base. Examples of a base to be used include: lithium alkyls such as methyl lithium and butyl lithium; alkali metal disilazides such as lithium hexamethyl disilazide, sodium hexamethyl disilazide, and potassium hexamethyl disilazide; and lithium amides such as lithium diisopropylamide and lithium dicyclohexylamide. Of those, lithium diisopropylamide is preferable. In addition, the amount of the base to be used in the present invention is 0.001 to 100 times mole, or preferably 0.01 to 10 times mole with respect to the unit represented by the chemical formula (99).

In the method of the present invention, a reaction temperature is generally in the range of −78° C. to 40° C., or preferably in the range of −78° C. to 30° C.

In the method of the present invention, a reaction time is generally in the range of 10 minutes to 24 hours. The reaction time is particularly preferably in the range of 10 minutes to 4 hours.

The polyhydroxyalkanoate having a unit represented by the chemical formula (101) included in the chemical formula (5) can be produced according to the above production method.

(Method of producing polyhydroxyalkanoate having unit represented by chemical formula (6) from intramolecular ring-closed compound of ω-hydroxycarboxylic acid)

A polyhydroxyalkanoate having a unit represented by the chemical formula (6) of the present invention can be produced by, polymerizing an intramolecular ring-closed compound of ω-hydroxycarboxylic acid represented by the chemical formula (8) in the presence of a catalyst.

(6)

(In the formula, n represents an integer selected from 1 to 4. When n represents an integer selected from 1, 2, and 4, m represents an integer selected from 0 to 8. When n=3, m represents an integer selected from 0 and 2 to 8. When multiple units exist, m and n each independently have the above meaning for each unit.)

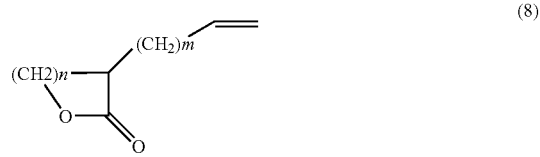

(8)

(In the formula, n represents an integer selected from 1 to 4. When n represents an integer selected from 1, 2, and 4, m represents an integer selected from 0 to 8. When n=3, m represents an integer selected from 0 and 2 to 8.)

In the production of a polyester containing a unit represented by the chemical formula (6) using an intramolecular ring-closed compound of ω-hydroxycarboxylic acid represented by the chemical formula (8) of the present invention, a polymerization method is not particularly limited, and solution polymerization, slurry polymerization, mass polymerization, or the like can be adopted. In the case where solution polymerization is adopted, a solvent to be used is not particularly limited, and an inert solvent such as an aliphatic hydrocarbon or cyclic hydrocarbon having 5 to 18 carbon atoms or an aromatic hydrocarbon having 6 to 20 carbon atoms, tetrahydrofuran, chloroform, o-dichlorobenzene, dioxane, or the like can be used. Any one of conventionally known ring-opening polymerization catalysts can be used as a catalyst to be used for polymerization. Examples thereof include stannous chloride, stannic chloride, stannous fluoride, stannous acetate, stannous stearate, stannous octanoate, stannous oxide, stannic oxide, and other tin salts. The examples further include triethoxyaluminum, tri-n-propoxy-aluminum, triiso-propoxyaluminum, tri-n-butoxyaluminum, tri-iso-butoxyaluminum, aluminum chloride, di-iso-propylzinc, dimethylzinc, diethylzinc, zinc chloride, tetra-n-propoxytitanium, tetra-n-butoxytitanium, tetra-n-butoxytitanium, tetra-t-butoxytitanium, antimony trifluoride, lead oxide, lead stearate, titanium tetrachloride, boron trifluoride, a boron trifluoride ether complex, triethylamine, and tributylamine.

The amount of any one of those catalysts to be used is in the range of 0.0001 to 10 weight %, or preferably 0.001 to 5 weight % with respect to the total amount of a monomer compound.

In the present invention, at the time of ring-opening polymerization, any one of conventionally known polymerization initiators can be used as a polymerization initiator. To be specific, an aliphatic alcohol is used, which may be a monoalcohol, a dialcohol, or a polyalcohol, and may be saturated or unsaturated. Specific examples thereof include: monoalcohols such as methanol, ethanol, propanol, butanol, pentanol, hexanol, heptanol, nonanol, decanol, lauryl alcohol, 1-tetradecanol, cetyl alcohol, stearyl alcohol, and p-tert-butylbenzyl alcohol; dialcohols such as ethylene glycol, butanediol, hexanediol, nonanediol, and tetramethylene glycol; polyalcohols such as glycerol, sorbitol, xylitol, ribitol, and erythritol; methyl lactate; and ethyl lactate. Any one of those aliphatic alcohols is generally used in an amount of 0.01 to 10 weight % with respect to the total amount of a monomer, although the amount slightly varies depending on conditions such as the kind of an alcohol to be used. In the present invention, a ring-opening polymerization reaction temperature is in the range of 25 to 200° C., preferably 50 to 200° C., or more preferably 100 to 180° C.

In the present invention, a ring-opening polymerization reaction may be performed under an inert gas (such as nitrogen or argon) atmosphere, or may be performed under reduced or increased pressure. At that time, a catalyst and an alcohol may be added sequentially.

The polyhydroxyalkanoate according to the present invention, which is mainly constituted by a unit represented by the chemical formula (1), (5), or (6) already shown, may be a copolymer obtained by copolymerization with a second component or the like in order to change physical properties such as mechanical properties and decomposition properties in a wide range. For example, a unit represented by the chemical formula (7) may be further incorporated into a molecule.

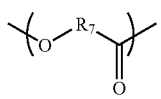

(7)

(In the formula, $R_7$ represents a linear or branched alkylene group having 1 to 11 carbon atoms, an alkyleneoxyalkylene group (alkylene groups each independently have 1 or 2 carbon atoms), or an alkylidene group having 1 to 5 carbon atoms which may be substituted by aryl. When multiple units exist, $R_7$'s each independently have the above meaning for each unit.)

Specific examples of a second component to be copolymerized include a cyclic diester of α-hydroxycarboxylic acid, or a lactone as an intramolecular ring-closed compound of ω-hydroxycarboxylic acid. Furthermore, specific examples of the cyclic diester of α-hydroxycarboxylic acid include intramolecular cyclic diesters of glicolic acid, lactic acid, α-hydroxybutyric acid, α-hydroxyisobutyric acid, α-hydroxyvaleric acid, α-hydroxyisovaleric acid, α-hydroxy-α-methylbutyric acid, α-hydroxycaproic acid, α-hydroxyisocaproic acid, α-hydroxy-β-methylvaleric acid, α-hydroxyheptanoic acid, mandelic acid, β-phenyllactic acid, and the like. One having asymmetric carbon may be of any one of an L compound, a D compound, a racemic compound, and a meso compound. In addition, no problem arises even when the cyclic diester is formed of different α-hydroxy acids. Specific examples thereof include cyclic diesters of glycolic acid and lactic acid such as 3-methyl-2,5-diketo-1,4-dioxane. Examples of the lactone as an intramolecular ring-closed compound of ω-hydroxycarboxylic acid include, but not limited to, intramolecular closed-circular compounds of β-propiolactone, β-butyrolactone, β-isovalerolactone, β-caprolactone, β-isocaprolactone, β-methyl-β-valerolactone, γ-butyrolactone, γ-valerolactone, δ-valerolactone, ε-caprolactone, lactone 11-oxydecanoate, p-dioxanone, 1,5-dioxepane-2-one, and the like.

The number average molecular weight of a polyhydroxyalkanoate to be produced by polymerization can vary widely by changing conditions including the kind and amount of the polymerization catalyst, the polymerization temperature, and the polymerization time. However, the number average molecular weight is preferably in the range of 1,000 to 1,000,000.

The molecular weight of the polyhydroxyalkanoate of the present invention can be measured as a relative molecular weight or an absolute molecular weight. The molecular weight can be simply measured by means of, for example, gel permeation chromatography (GPC). A specific measurement method by means of GPC is as follows. The polyhydroxyalkanoate is dissolved in advance into a solvent into which the polyhydroxyalkanoate is soluble, and the molecular weight is measured in a mobile phase of the same solvent. A differential refractometer (RI) or an ultraviolet (UV) detector can be used as a detector depending on the polyhydroxyalkanoate to be measured. The molecular weight is determined as a result of relative comparison with a standard sample (such as polystyrene or polymethyl methacrylate). The solvent can be selected from solvents into each of which a polymer is soluble such as dimethylformamide (DMF), dimethyl sulfoxide (DMSO), chloroform, tetrahydrofuran (THF), toluene, and hexafluoroisopropanol (HFIP). In the case of a polar solvent, the molecular weight can be measured through the addition of a salt.

In addition, out of the above polyhydroxyalkanoates, a polyhydroxyalkanoate having a ratio (Mw/Mn) between a weight average molecular weight (Mw) and a number average molecular weight (Mn) measured as described above in the range of 1 to 10 is preferably used in the present invention.

A reaction solvent, a reaction temperature, a reaction time, a purification method, and the like in a chemical reaction of the present invention are not limited to those described above.

EXAMPLES

Hereinafter, the present invention will be described in more detail by way of examples. However, the present invention is not limited to these examples.

First, Preparation Examples collectively describe the materials used in the following examples.

Preparation Example

The raw materials used in the examples can be prepared according to the following methods.

Preparation Example 1

Method of producing 3-(2-propenyl)-2-oxetanone represented by chemical formula (20) described in Example 1

3-(2-propenyl)-2-oxetanone represented by the chemical formula (20) described in Example 1 can be synthesized by using β-propiolactone instead of γ-butyrolactone in the synthesis of dihydro-3-(2-propenyl)furan-2(3H)-one described in Journal of American Chemical Society 1995, 117, 3705-3716 (the compound (6a) in the non-patent document).

To be specific, 7.20 g (100.0 mmol) of β-propiolactone were placed in a round-bottomed flask, and 55 ml of THF were added to dissolve this. The flask was placed under a nitrogen atmosphere, and the solution was stirred at −78° C. Next, 55 ml of a solution of 2 M of lithium diisopropylamide in THF were gradually added to the flask, and the whole was stirred at −78° C. for 20 minutes. Next, 14.52 g (110.0 mmol) of allyl bromide dissolved into 38 ml of hexamethylphosphoramide (HMPA) were added to the flask, and the whole was stirred at −30° C. for 3 hours. After the completion of the reaction, the reaction solution was poured into an aqueous solution of ammonium chloride, and dichloromethane was added to extract the organic layer. The extracted organic layer was washed with water 3 times. After that, the organic layer was collected and dried with anhydrous sodium sulfate. After sodium sulfate had been removed, the solution was distilled off to collect crude 3-(2-propenyl)-2-oxetanone. Next, the crude product was purified by means of silica gel column chromatography, and the purified product was distilled under reduced pressure to prepare 9.42 g of 3-(2-propenyl)-2-oxetanone of interest. NMR analysis was performed under the following conditions to determine the structure of the resultant compound.

<Measuring equipment> FT-NMR: Bruker DPX 400

Resonance frequency: $^1H$=400 MHz

<Measurement conditions> Measured nuclear species: $^1H$

Solvent used: $CDCl_3$

Measurement temperature: room temperature

The analysis confirmed that the resultant compound was 3-(2-propenyl)-2-oxetanone of interest.

Preparation Example 2

Method of producing 3-(3-butenyl)-2-oxetanone represented by chemical formula (25) described in Example 5

9.46 g of 3-(3-butenyl)-2-oxetanone of interest was prepared in the same manner as in Example 1 except that 4-bromo-1-butene was used instead of allyl bromide described in Preparation Example 1.

Preparation Example 3

Method of producing 3-(5-hexenyl)-2-oxetanone represented by chemical formula (27) described in Example 6

10.79 g of 3-(5-hexenyl)-2-oxetanone of interest was prepared in the same manner as in Example 1 except that 19.57 g (110.0 mmol) of 6-bromo-1-hexene was used instead of allyl bromide described in Preparation Example 1.

Preparation Example 4

Method of producing 3-(9-decenyl)-2-oxetanone represented by chemical formula (29) described in Example 7

15.14 g of 3-(9-decenyl)-2-oxetanone of interest was prepared in the same manner as in Example 1 except that 26.30 g (110.0 mmol) of 10-bromo-1-decene was used instead of allyl bromide described in Preparation Example 1.

Preparation Example 5

Method of producing 3-(2-propenyl)dihydro-2(3H)-furanone represented by chemical formula (31) described in each of Examples 8 and 9

10.72 g of 3-(2-propenyl)dihydro-2(3H)-furanone of interest was prepared in the same manner as in Example 1 except that 8.61 g (100.0 mmol) of γ-butyrolactone was used instead of β-propiolactone described in Preparation Example 1.

Preparation Example 6

Method of producing 3-(3-butenyl)dihydro-2(3H)-furanone represented by chemical formula (34) described in Example 10

11.21 g of 3-(3-butenyl)dihydro-2(3H)-furanone of interest was prepared in the same manner as in Example 1 except that 8.61 g (100.0 mmol) of γ-butyrolactone and 16.20 g (110.0 mmol) of 4-bromo-1-butene were used instead of β-propiolactone and allyl bromide described in Preparation Example 1.

Preparation Example 7

Method of producing 3-(5-hexenyl)dihydro-2(3H)-furanone represented by chemical formula (36) described in Example 11

12.62 g of 3-(5-hexenyl)dihydro-2(3H)-furanone of interest were prepared in the same manner as in Example 1 except that 8.61 g (100.0 mmol) of γ-butyrolactone and 19.57 g (110.0 mmol) of 6-bromo-1-hexene were used instead of β-propiolactone and allyl bromide described in Preparation Example 1.

Preparation Example 8

Method of producing tetrahydro-3-(2-propenyl)-2H-pyrane-2-one represented by chemical formula (37) described in each of Examples 12 to 15

9.81 g of tetrahydro-3-(2-propenyl)-2H-pyrane-2-one of interest was prepared in the same manner as in Example 1 except that 10.01 g (100.0 mmol) of δ-valerolactone was used instead of β-propiolactone described in Preparation Example 1.

Preparation Example 9

Method of producing tetrahydro-4-(3-butenyl)-2H-pyrane-2-one represented by chemical formula (42) described in each of Examples 16 and 17

10.02 g of tetrahydro-3-(2-propenyl)-2H-pyrane-2-one of interest was prepared in the same manner as in Example 1 except that 10.01 g (100.0 mmol) of δ-valerolactone and 16.20 g (110.0 mmol) of 4-bromo-1-butene were used instead of β-propiolactone and allyl amide described in Preparation Example 1.

Preparation Example 10

Method of producing tetrahydro-4-(3-butenyl)-2H-pyrane-2-one represented by chemical formula (45) described in Example 18

10.09 g of tetrahydro-4-(3-butenyl)-2H-pyrane-2-one of interest was prepared in the same manner as in Example 1 except that 10.01 g (100.0 mmol) of δ-valerolactone and 17.88 g (110.0 mmol) of 5-bromo-1-pentene were used instead of β-propiolactone and allyl amide described in Preparation Example 1.

Preparation Example 11

Method of producing tetrahydro-3-(7-octenyl)-2H-pyrane-2-one represented by chemical formula (47) described in Example 19

13.25 g of tetrahydro-3-(7-octenyl)-2H-pyrane-2-one of interest was prepared in the same manner as in Example 1 except that 10.01 g (100.0 mmol) of δ-valerolactone and 22.93 g (110.0 mmol) of 8-bromo-1-octene were used instead of β-propiolactone and allyl amide described in Preparation Example 1.

Preparation Example 12

Method of producing tetrahydro-3-(9-decenyl)-2H-pyrane-2-one represented by chemical formula (49) described in Example 20

14.30 g of tetrahydro-3-(9-decenyl)-2H-pyrane-2-one of interest was prepared in the same manner as in Example 1 except that 10.01 g (100.0 mmol) of δ-valerolactone and 26.30 g (110.0 mmol) of 10-bromo-1-decene were used instead of β-propiolactone and allyl amide described in Preparation Example 1.

Preparation Example 13

Method of producing 3-(2-propenyl)-2-oxepanone represented by chemical formula (51) described in Example 21

10.02 g of 3-(2-propenyl)-2-oxepanone of interest was prepared in the same manner as in Example 1 except that 11.41 g (100.0 mmol) of ε-caprolactone was used instead of β-propiolactone described in Preparation Example 1.

Preparation Example 14

Method of producing 3-(3-butenyl)-2-oxepanone represented by chemical formula (53) described in Example 22

10.09 g of 3-(3-butenyl)-2-oxepanone of interest were prepared in the same manner as in Example 1 except that 11.41 g (100.0 mmol) of ε-caprolactone and 16.20 g (110.0 mmol) of 4-bromo-1-butene were used instead of β-propiolactone and allyl amide described in Preparation Example 1.

Hereinafter, specific examples will be shown.

Example 1

Synthesis of Polyester Using 3-(2-propenyl)-2-oxetanone Represented by Chemical Formula (20)

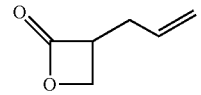

1.12 g (10.0 mmol) of 3-(2-propenyl)-2-oxetanone represented by the chemical formula (20), 4.0 ml of a solution of 0.01 M of tin octylate(tin 2-ethylhexanoate) in toluene, and 4.0 ml of a solution of 0.01 M of p-tert-butylbenzyl alcohol in toluene were placed in a polymerization ampule, and the whole was dried under reduced pressure for 1 hour and replaced with nitrogen. After that, the ampule was heat-sealed under reduced pressure and heated to 150° C. to perform ring-opening polymerization. 12 hours after that, the reaction was terminated, and the ampule was cooled. The resultant polymer was dissolved into chloroform, and reprecipitated in methanol in an amount 10 times that of chloroform necessary for the dissolution. The precipitate was collected and dried under reduced pressure to prepare 0.35 g of a polymer.

NMR analysis was performed under the following conditions to determine the structure of the resultant polymer.

<Measuring equipment> FT-NMR: Bruker DPX 400

Resonance frequency: $^1H$=400 MHz

<Measurement conditions> Measured nuclear species: $^1H$

Solvent used: TMS/CDCl$_3$

Measurement temperature: room temperature

The analysis confirmed that the resultant polymer was a polyhydroxyalkanoate composed of a unit represented by the following chemical formula (21).

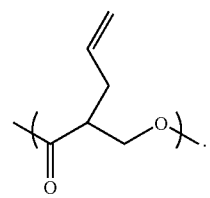

The resultant polyhydroxyalkanoate was evaluated for average molecular weight by means of gel permeation chromatography (GPC; HLC-8220 manufactured by Tosoh Corporation, column; TSK-GEL Super HM-H manufactured by Tosoh Corporation, solvent; chloroform, polystyrene conversion). As a result, the resultant polyhydroxyalkanoate was found to have a number average molecular weight Mn of 5,800 and a weight average molecular weight Mw of 7,100.

Example 2

Synthesis of Polyester Using 3-(2-propenyl)-2-oxetanone and L-lactide]

0.22 g (2.0 mmol) of 3-(2-propenyl)-2-oxetanone represented by the chemical formula (20), 1.44 g (10.0 mmol) of L-lactide, 4.8 ml of a solution of 0.01 M of tin octylate(tin 2-ethylhexanoate) in toluene, and 4.8 ml of a solution of 0.01 M of p-tert-butylbenzyl alcohol in toluene were placed in a polymerization ampule. After that, 1.20 g of a polymer were prepared in the same manner as in Example 1. NMR analysis was performed under the same conditions as those of Example 1 to determine the structure of the resultant polymer. The analysis confirmed that the polymer was a polyhydroxyalkanoate copolymer containing a unit represented by the following chemical formula (22) as a monomer unit. The analysis also confirmed that an A unit accounted for 9 mol % of the monomer unit and a B unit accounted for 91 mol % thereof.

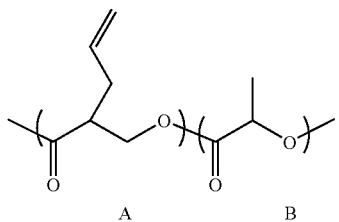

(22)

The resultant polyhydroxyalkanoate was evaluated for average molecular weight in the same manner as in Example 1. As a result, the resultant polyhydroxyalkanoate was found to have a number average molecular weight Mn of 28,500 and a weight average molecular weight Mw of 38,500.

Example 3

Synthesis of Polyester Using 3-(2-propenyl)-2-oxetanone and mandelide(3,6-diphenyl-1,4-dioxane-2,5-dione)

0.22 g (2.0 mmol) of 3-(2-propenyl)-2-oxetanone represented by the chemical formula (20), 2.68 g (10.0 mmol) of mandelide, 4.8 ml of a solution of 0.01 M of tin octylate(tin 2-ethylhexanoate) in toluene, and 4.8 ml of a solution of 0.01 M of p-tert-butylbenzyl alcohol in toluene were placed in a polymerization ampule. After that, 1.88 g of a polymer were prepared in the same manner as in Example 1. NMR analysis was performed under the same conditions as those of Example 1 to determine the structure of the resultant polymer. The analysis confirmed that the polymer was a polyhydroxyalkanoate copolymer containing a unit represented by the following chemical formula (23) as a monomer unit. The analysis also confirmed that an A unit accounted for 10 mol % of the monomer unit and a B unit accounted for 90 mol % thereof.

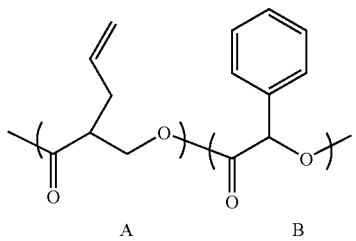

(23)

The resultant polyhydroxyalkanoate was evaluated for average molecular weight in the same manner as in Example 1. As a result, the resultant polyhydroxyalkanoate was found to have a number average molecular weight Mn of 23,500 and a weight average molecular weight Mw of 35,000.

Example 4

Synthesis of Polyester Using 3-(2-propenyl)-2-oxetanone and δ-valerolactone 0.22 g (2.0 mmol) of 3-(2-propenyl)-2-oxetanone represented by the chemical formula (20), 1.00 g (10.0 mmol) of δ-valerolactone, 4.8 ml of a solution of 0.01 M of tin octylate (tin 2-ethylhexanoate) in toluene, and 4.8 ml of a solution of 0.01 M of p-tert-butylbenzyl alcohol in toluene were placed in a polymerization ampule. After that, 0.80 g of a polymer was prepared in the same manner as in Example 1. NMR analysis was performed under the same conditions as those of Example 1 to determine the structure of the resultant polymer. The analysis confirmed that the polymer was a polyhydroxyalkanoate copolymer containing a unit represented by the following chemical formula (24) as a monomer unit. The analysis also confirmed that an A unit accounted for 16 mol % of the monomer unit and a B unit accounted for 84 mol % thereof.

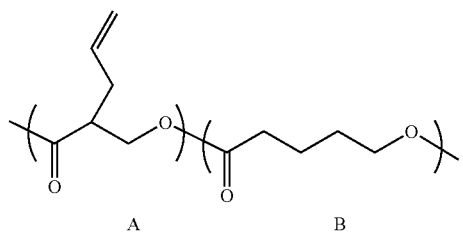

(24)

The resultant polyhydroxyalkanoate was evaluated for average molecular weight in the same manner as in Example 1. As a result, the resultant polyhydroxyalkanoate was found to have a number average molecular weight Mn of 19,800 and a weight average molecular weight Mw of 28,900.

Example 5

Synthesis of Polyester Using 3-(3-butenyl)-2-oxetanone Represented by Chemical Formula (25) and L-lactide

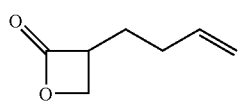

(25)

0.25 g (2.0 mmol) of 3-(3-butenyl)-2-oxetanone represented by the chemical formula (25), 1.44 g (10.0 mmol) of L-lactide, 4.8 ml of a solution of 0.01 M of tin octylate(2-tin ethylhexanoate) in toluene, and 4.8 ml of a solution of 0.01 M of p-tert-butylbenzyl alcohol in toluene were placed in a polymerization ampule. After that, 0.94 g of a polymer was prepared in the same manner as in Example 1. NMR analysis was performed under the same conditions as those of Example 1 to determine the structure of the resultant polymer. The analysis confirmed that the polymer was a polyhydroxyalkanoate copolymer containing a unit represented by the following chemical formula (26) as a monomer unit. The analysis also confirmed that an A unit accounted for 8 mol % of the monomer unit and a B unit accounted for 92 mol % thereof.

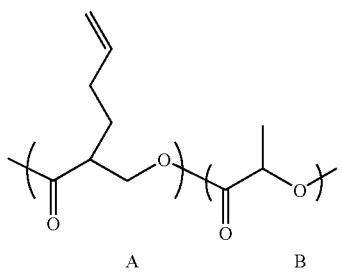
(26)

The resultant polyhydroxyalkanoate was evaluated for average molecular weight in the same manner as in Example 1. As a result, the resultant polyhydroxyalkanoate was found to have a number average molecular weight Mn of 24,300 and a weight average molecular weight Mw of 36,700.

Example 6

Synthesis of Polyester Using 3-(5-hexenyl)-2-oxetanone Represented by Chemical Formula (27) and L-lactide

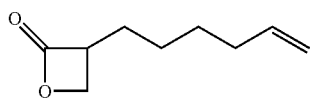
(27)

0.31 g (2.0 mmol) of 3-(5-hexenyl)-2-oxetanone represented by the chemical formula (27), 1.44 g (10.0 mmol) of L-lactide, 4.8 ml of a solution of 0.01 M of tin octylate(tin 2-ethylhexanoate) in toluene, and 4.8 ml of a solution of 0.01 M of p-tert-butylbenzyl alcohol in toluene were placed in a polymerization ampule. After that, 0.83 g of a polymer was prepared in the same manner as in Example 1. NMR analysis was performed under the same conditions as those of Example 1 to determine the structure of the resultant polymer. The analysis confirmed that the polymer was a polyhydroxyalkanoate copolymer containing a unit represented by the following chemical formula (28) as a monomer unit. The analysis also confirmed that an A unit accounted for 7 mol % of the monomer unit and a B unit accounted for 93 mol % thereof.

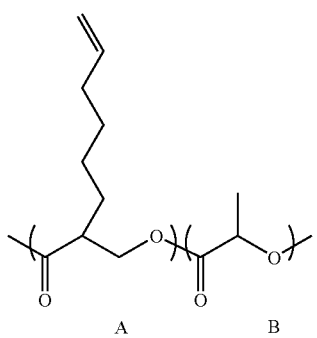
(28)

The resultant polyhydroxyalkanoate was evaluated for average molecular weight in the same manner as in Example 1. As a result, the resultant polyhydroxyalkanoate was found to have a number average molecular weight Mn of 16,500 and a weight average molecular weight Mw of 24,400.

Example 7

Synthesis of Polyester Using 3-(9-decenyl)-2-oxetanone Represented by Chemical Formula (29) and L-lactide

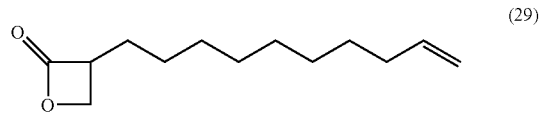
(29)

0.36 g (2.0 mmol) of 3-(9-decenyl)-2-oxetanone represented by the chemical formula (29), 1.44 g (10.0 mmol) of L-lactide, 4.8 ml of a solution of 0.01 M of tin octylate(tin 2-ethylhexanoate) in toluene, and 4.8 ml of a solution of 0.01 M of p-tert-butylbenzyl alcohol in toluene were placed in a polymerization ampule. After that, 0.75 g of a polymer was prepared in the same manner as in Example 1. NMR analysis was performed under the same conditions as those of Example 1 to determine the structure of the resultant polymer. The analysis confirmed that the polymer was a polyhydroxyalkanoate copolymer containing a unit represented by the following chemical formula (30) as a monomer unit. The analysis also confirmed that an A unit accounted for 4 mol % of the monomer unit and a B unit accounted for 96 mol % thereof.

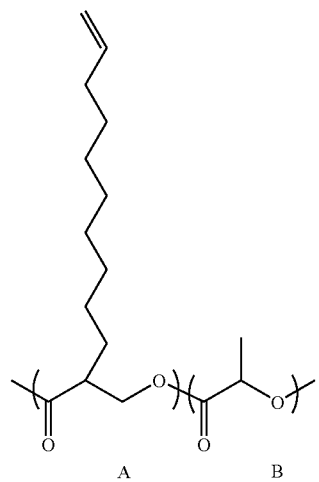
(30)

The resultant polyhydroxyalkanoate was evaluated for average molecular weight in the same manner as in Example 1. As a result, the resultant polyhydroxyalkanoate was found to have a number average molecular weight Mn of 16,700 and a weight average molecular weight Mw of 23,700.

Example 8

Synthesis of Polyester Using 3-(2-propenyl)dihydro-2(3H)-furanone Represented by Chemical Formula (31) and L-lactide

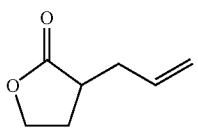

(31)

0.25 g (2.0 mmol) of 3-(2-propenyl)dihydro-2(3H)-furanone represented by the chemical formula (31), 1.44 g (10.0 mmol) of L-lactide, 24 μl of a solution of 2 M of diethylzinc in toluene, and 9.6 ml of a solution of 0.01 M of p-tert-butylbenzyl alcohol in toluene were placed in a polymerization ampule. After that, 0.91 g of a polymer was prepared in the same manner as in Example 1. NMR analysis was performed under the same conditions as those of Example 1 to determine the structure of the resultant polymer. The analysis confirmed that the polymer was a polyhydroxyalkanoate copolymer containing a unit represented by the following chemical formula (32) as a monomer unit. The analysis also confirmed that an A unit accounted for 5 mol % of the monomer unit and a B unit accounted for 95 mol % thereof.

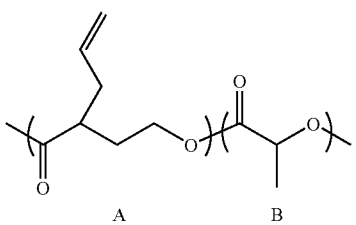

(32)

The resultant polyhydroxyalkanoate was evaluated for average molecular weight in the same manner as in Example 1. As a result, the resultant polyhydroxyalkanoate was found to have a number average molecular weight Mn of 8,200 and a weight average molecular weight Mw of 12,400.

Example 9

Synthesis of Polyester Using 3-(2-propenyl)dihydro-2(3H)-furanone and mandelide 0.25 g (2.0 mmol) of 3-(2-propenyl)dihydro-2(3H)-furanone represented by the chemical formula (31), 2.68 g (10.0 mmol) of mandelide, 24 μl of a solution of 2 M of diethylzinc in toluene, and 9.6 ml of a solution of 0.01 M of p-tert-butylbenzyl alcohol in toluene were placed in a polymerization ampule. After that, 1.59 g of a polymer were prepared in the same manner as in Example 1. NMR analysis was performed under the same conditions as those of Example 1 to determine the structure of the resultant polymer. The analysis confirmed that the polymer was a polyhydroxyalkanoate copolymer containing a unit represented by the following chemical formula (33) as a monomer unit. The analysis also confirmed that an A unit accounted for 6 mol % of the monomer unit and a B unit accounted for 94 mol % thereof.

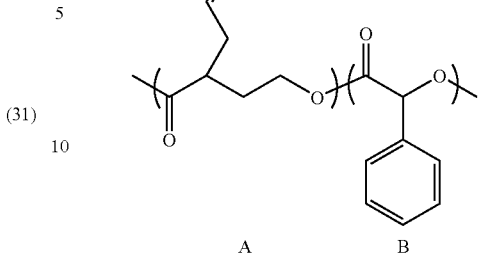

(33)

The resultant polyhydroxyalkanoate was evaluated for average molecular weight in the same manner as in Example 1. As a result, the resultant polyhydroxyalkanoate was found to have a number average molecular weight Mn of 7,500 and a weight average molecular weight Mw of 11,000.

Example 10

Synthesis of Polyester Using 3-(3-butenyl)dihydro-2(3H)-furanone Represented by Chemical Formula (34) and L-lactide

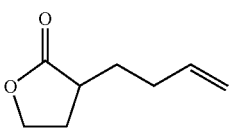

(34)

0.28 g (2.0 mmol) of 3-(3-butenyl)dihydro-2(3H)-furanone represented by the chemical formula (34), 1.44 g (10.0 mmol) of L-lactide, 24 μl of a solution of 2 M of diethylzinc in toluene, and 9.6 ml of a solution of 0.01 M of p-tert-butylbenzyl alcohol in toluene were placed in a polymerization ampule. After that, 0.83 g of a polymer was prepared in the same manner as in Example 1. NMR analysis was performed under the same conditions as those of Example 1 to determine the structure of the resultant polymer. The analysis confirmed that the polymer was a polyhydroxyalkanoate copolymer containing a unit represented by the following chemical formula (35) as a monomer unit. The analysis also confirmed that an A unit accounted for 4 mol % of the monomer unit and a B unit accounted for 96 mol % thereof.

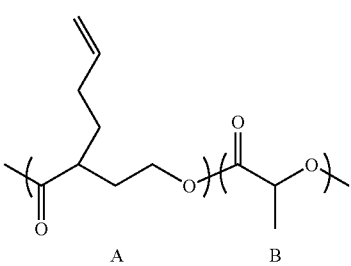

(35)

The resultant polyhydroxyalkanoate was evaluated for average molecular weight in the same manner as in Example 1. As a result, the resultant polyhydroxyalkanoate was found to have a number average molecular weight Mn of 6,100 and a weight average molecular weight Mw of 9,800.

Example 11

Synthesis of Polyester Using 3-(5-hexenyl)dihydro-2 (3H)-furanone Represented by Chemical Formula (36) and L-lactide

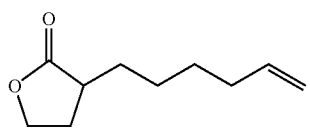

(36)

0.42 g (2.0 mmol) of 3-(5-hexenyl)dihydro-(3H)-furanone represented by the chemical formula (36), 1.44 g (10.0 mmol) of L-lactide, 24 μl of a solution of 2 M of diethylzinc in toluene, and 9.6 ml of a solution of 0.01 M of p-tert-butyl-benzyl alcohol in toluene were placed in a polymerization ampule. After that, 0.72 g of a polymer was prepared in the same manner as in Example 1. NMR analysis was performed under the same conditions as those of Example 1 to determine the structure of the resultant polymer. The analysis confirmed that the polymer was a polyhydroxyalkanoate copolymer containing a unit represented by the following chemical formula (36A) as a monomer unit. The analysis also confirmed that an A unit accounted for 4 mol % of the monomer unit and a B unit accounted for 96 mol % thereof.

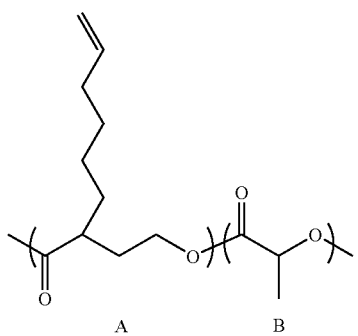

(36A)

The resultant polyhydroxyalkanoate was evaluated for average molecular weight in the same manner as in Example 1. As a result, the resultant polyhydroxyalkanoate was found to have a number average molecular weight Mn of 6,200 and a weight average molecular weight Mw of 9,000.

Example 12

Synthesis of Polyester Using tetrahydro-3-(2-propenyl)-2H-pyrane-2-one Represented by Chemical Formula (37)

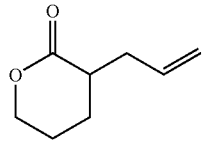

(37)

1.40 g (2.0 mmol) of tetrahydro-3-(2-propenyl)-2H-pyrane-2-one represented by the chemical formula (37), 4.0 ml of a solution of 0.01 M of tin octylate(tin 2-ethylhexanoate) in toluene, and 4.0 ml of a solution of 0.01 M of p-tert-butylbenzyl alcohol in toluene were placed in a polymerization ampule. After that, 0.52 g of a polymer was prepared in the same manner as in Example 1. NMR analysis was performed under the same conditions as those of Example 1 to determine the structure of the resultant polymer. The analysis confirmed that the polymer was a polyhydroxyalkanoate copolymer containing a unit represented by the following chemical formula (38) as a monomer unit.

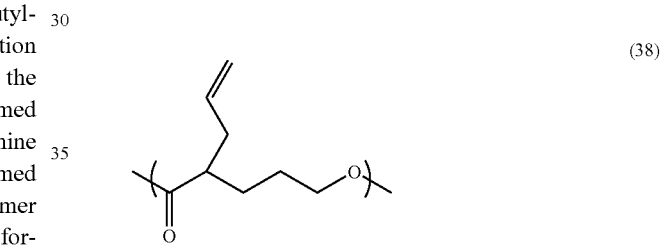

(38)

The resultant polyhydroxyalkanoate was evaluated for average molecular weight in the same manner as in Example 1. As a result, the resultant polyhydroxyalkanoate was found to have a number average molecular weight Mn of 6,200 and a weight average molecular weight Mw of 7,400.

Example 13

Synthesis of Polyester Using tetrahydro-3-(2-propenyl)-2H-pyrane-2-one and L-lactide 0.28 g (2.0 mmol) of tetrahydro-3-(2-propenyl)-2H-pyrane-2-one represented by the chemical formula (37), 1.44 g (10.0 mmol) of L-lactide, 4.8 ml of a solution of 0.01 M of tin octylate(tin 2-ethylhexanoate) in toluene, and 4.8 ml of a solution of 0.01 M of p-tert-butylbenzyl alcohol in toluene were placed in a polymerization ampule. After that, 1.24 g of a polymer was prepared in the same manner as in Example 1. NMR analysis was performed under the same conditions as those of Example 1 to determine the structure of the resultant polymer. The analysis confirmed that the polymer was a polyhydroxyalkanoate copolymer containing a unit represented by the following chemical formula (39) as a monomer unit. The analysis also confirmed that an A unit accounted for 10 mol % of the monomer unit and a B unit accounted for 90 mol % thereof.

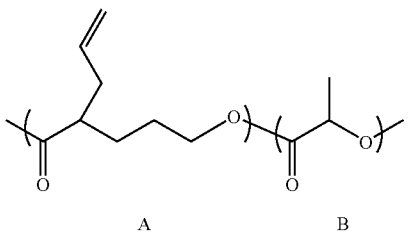

(39)

A   B

The resultant polyhydroxyalkanoate was evaluated for average molecular weight in the same manner as in Example 1. As a result, the resultant polyhydroxyalkanoate was found to have a number average molecular weight Mn of 148,000 and a weight average molecular weight Mw of 247,200.

Example 14

Synthesis of Polyester Using tetrahydro-3-(2-propenyl)-2H-pyrane-2-one and L-lactide 2.80 g (20.0 mmol) of tetrahydro-3-(2-propenyl)-2H-pyrane-2-one represented by the chemical formula (37), 14.41 g (100.0 mmol) of L-lactide, 4.8 ml of a solution of 0.1 M of tin octylate(tin 2-ethylhexanoate) in toluene, and 4.8 ml of a solution of 0.1 M of p-tert-butylbenzyl alcohol in toluene were placed in a polymerization ampule. After that, 12.93 g of a polymer was prepared in the same manner as in Example 1. NMR analysis was performed under the same conditions as those of Example 1 to determine the structure of the resultant polymer. The analysis confirmed that the polymer was a polyhydroxyalkanoate copolymer containing a unit represented by the following chemical formula (40) as a monomer unit. The analysis also confirmed that an A unit accounted for 11 mol % of the monomer unit and a B unit accounted for 89 mol % thereof.

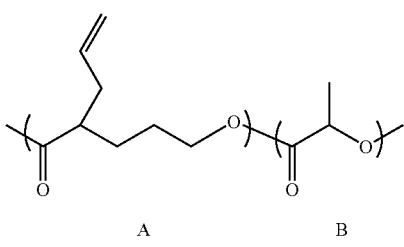

(40)

A   B

The resultant polyhydroxyalkanoate was evaluated for average molecular weight in the same manner as in Example 1. As a result, the resultant polyhydroxyalkanoate was found to have a number average molecular weight Mn of 152,000 and a weight average molecular weight Mw of 252,300.

Example 15

Synthesis of Polyester Using tetrahydro-3-(2-propenyl)-2H-pyrane-2-one and mandelide 0.28 g (2.0 mmol) of tetrahydro-3-(2-propenyl)-2H-pyrane-2-one represented by the chemical formula (37), 2.68 g (10.0 mmol) of mandelide, 4.8 ml of a solution of 0.01 M of tin octylate(tin 2-ethylhexanoate) in toluene, and 4.8 ml of a solution of 0.01 M of p-tert-butylbenzyl alcohol in toluene were placed in a polymerization ampule. After that, 2.06 g of a polymer were prepared in the same manner as in Example 1. NMR analysis was performed under the same conditions as those of Example 1 to determine the structure of the resultant polymer. The analysis confirmed that the polymer was a polyhydroxyalkanoate copolymer containing a unit represented by the following chemical formula (41) as a monomer unit. The analysis also confirmed that an A unit accounted for 12 mol % of the monomer unit and a B unit accounted for 88 mol % thereof.

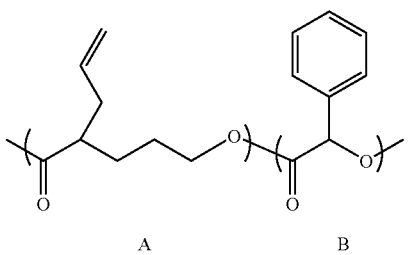

(41)

A   B

The resultant polyhydroxyalkanoate was evaluated for average molecular weight in the same manner as in Example 1. As a result, the resultant polyhydroxyalkanoate was found to have a number average molecular weight Mn of 48,000 and a weight average molecular weight Mw of 97,200.

Example 16

Synthesis of Polyester Using tetrahydro-4-(3-butenyl)-2H-pyrane-2-one Represented by Chemical Formula (42) and δ-valerolactone

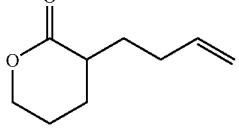

(42)

0.31 g (2.0 mmol) of tetrahydro-4-(3-butenyl)-2H-pyrane-2-one represented by the chemical formula (42), 1.00 g (10.0 mmol) of δ-valerolactone, 4.8 ml of a solution of 0.01 M of tin octylate(tin 2-ethylhexanoate) in toluene, and 4.8 ml of a solution of 0.01 M of p-tert-butylbenzyl alcohol in toluene were placed in a polymerization ampule. After that, 0.73 g of a polymer was prepared in the same manner as in Example 1. NMR analysis was performed under the same conditions as those of Example 1 to determine the structure of the resultant polymer. The analysis confirmed that the polymer was a polyhydroxyalkanoate copolymer containing a unit represented by the following chemical formula (43) as a monomer unit. The analysis also confirmed that an A unit accounted for 18 mol % of the monomer unit and a B unit accounted for 82 mol % thereof.

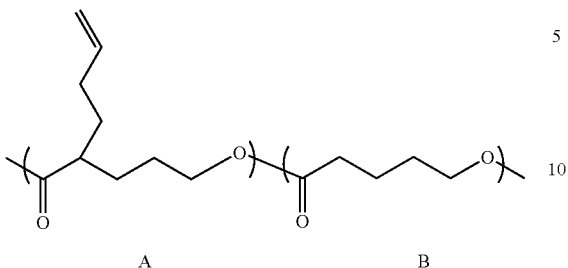

(43)

The resultant polyhydroxyalkanoate was evaluated for average molecular weight in the same manner as in Example 1. As a result, the resultant polyhydroxyalkanoate was found to have a number average molecular weight Mn of 37,000 and a weight average molecular weight Mw of 62,200.

Example 17

Synthesis of Polyester Using tetrahydro-4-(3-butenyl)-2H-pyrane-2-one and L-lactide 0.31 g (2.0 mmol) of tetrahydro-4-(3-butenyl)-2H-pyrane-2-one represented by the chemical formula (42), 1.44 g (10.0 mmol) of L-lactide, 4.8 ml of a solution of 0.01 M of tin octylate(tin 2-ethylhexanoate) in toluene, and 4.8 ml of a solution of 0.01 M of p-tert-butylbenzyl alcohol in toluene were placed in a polymerization ampule. After that, 1.18 g of a polymer was prepared in the same manner as in Example 1. NMR analysis was performed under the same conditions as those of Example 1 to determine the structure of the resultant polymer. The analysis confirmed that the polymer was a polyhydroxyalkanoate copolymer containing a unit represented by the following chemical formula (44) as a monomer unit. The analysis also confirmed that an A unit accounted for 9 mol % of the monomer unit and a B unit accounted for 91 mol % thereof.

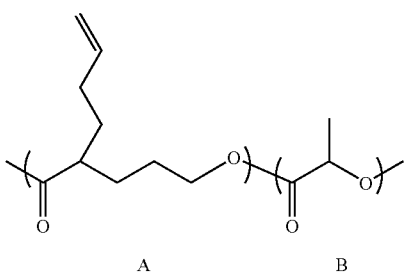

(44)

The resultant polyhydroxyalkanoate was evaluated for average molecular weight in the same manner as in Example 1. As a result, the resultant polyhydroxyalkanoate was found to have a number average molecular weight Mn of 78,800 and a weight average molecular weight Mw of 137,900.

Example 18

Synthesis of Polyester Using tetrahydro-3-(4-pentenyl)-2H-pyrane-2-one Represented by Chemical Formula (45) and glycolide(1,4-dioxane-2,5-dione)

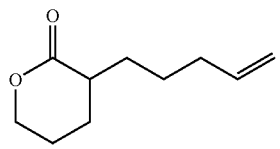

(45)

0.34 g (2.0 mmol) of tetrahydro-3-(4-pentenyl)-2H-pyrane-2-one represented by the chemical formula (45), 1.16 g (10.0 mmol) of glycolide, 4.8 ml of a solution of 0.01 M of tin octylate(tin 2-ethylhexanoate) in toluene, and 4.8 ml of a solution of 0.01 M of p-tert-butylbenzyl alcohol in toluene were placed in a polymerization ampule. After that, 0.96 g of a polymer was prepared in the same manner as in Example 1. NMR analysis was performed under the same conditions as those of Example 1 to determine the structure of the resultant polymer. The analysis confirmed that the polymer was a polyhydroxyalkanoate copolymer containing a unit represented by the following chemical formula (46) as a monomer unit. The analysis also confirmed that an A unit accounted for 7 mol % of the monomer unit and a B unit accounted for 93 mol % thereof.

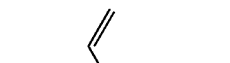

(46)

The resultant polyhydroxyalkanoate was evaluated for average molecular weight in the same manner as in Example 1. As a result, the resultant polyhydroxyalkanoate was found to have a number average molecular weight Mn of 65,400 and a weight average molecular weight. Mw of 107,200.

Example 19

Synthesis of Polyester Using tetrahydro-3-(7-octenyl)-2H-pyrane-2-one Represented by Chemical Formula (47) and L-lactide

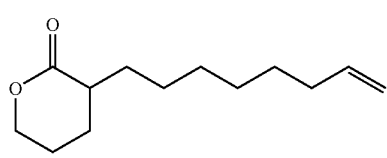

(47)

0.39 g (2.0 mmol) of tetrahydro-3-(7-octenyl)-2H-pyrane-2-one represented by the chemical formula (47), 1.44 g (10.0 mmol) of L-lactide, 4.8 ml of a solution of 0.01 M of tin octylate(tin 2-ethylhexanoate) in toluene, and 4.8 ml of a solution of 0.01 M of p-tert-butylbenzyl alcohol in toluene were placed in a polymerization ampule. After that, 1.11 g of a polymer was prepared in the same manner as in Example 1. NMR analysis was performed under the same conditions as those of Example 1 to determine the structure of the resultant polymer. The analysis confirmed that the polymer was a polyhydroxyalkanoate copolymer containing a unit represented by the following chemical formula (48) as a monomer unit. The analysis also confirmed that an A unit accounted for 6 mol % of the monomer unit and a B unit accounted for 94 mol % thereof.

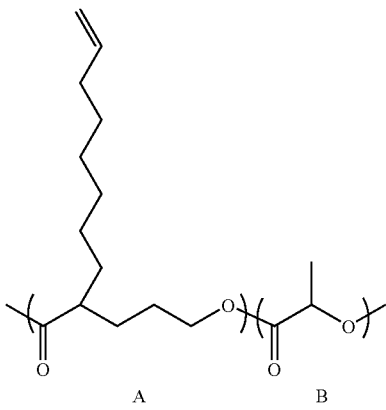

(48)

The resultant polyhydroxyalkanoate was evaluated for average molecular weight in the same manner as in Example 1. As a result, the resultant polyhydroxyalkanoate was found to have a number average molecular weight Mn of 81,400 and a weight average molecular weight Mw of 140,800.

Example 20

Synthesis of Polyester Using tetrahydro-3-(9-decenyl)-2H-pyrane-2-one Represented by Chemical Formula (49) and L-lactide (49)

0.48 g (2.0 mmol) of tetrahydro-3-(9-decenyl)-2H-pyrane-2-one represented by the chemical formula (49), 1.44 g (10.0 mmol) of L-lactide, 4.8 ml of a solution of 0.01 M of tin octylate(tin 2-ethylhexanoate) in toluene, and 4.8 ml of a solution of 0.01 M of p-tert-butylbenzyl alcohol in toluene were placed in a polymerization ampule. After that, 1.03 g of a polymer was prepared in the same manner as in Example 1. NMR analysis was performed under the same conditions as those of Example 1 to determine the structure of the resultant polymer. The analysis confirmed that the polymer was a polyhydroxyalkanoate copolymer containing a unit represented by the following chemical formula (50) as a monomer unit. The analysis also confirmed that an A unit accounted for 4 mol % of the monomer unit and a B unit accounted for 96 mol % thereof.

(50)

The resultant polyhydroxyalkanoate was evaluated for average molecular weight in the same manner as in Example 1. As a result, the resultant polyhydroxyalkanoate was found to have a number average molecular weight Mn of 55,000 and a weight average molecular weight Mw of 90,800.

Example 21

Synthesis of Polyester Using 3-(2-propenyl)-2-oxepanone Represented by Chemical Formula (51) and L-lactide (51)

0.31 g (2.0 mmol) of 3-(2-propenyl)-2-oxepanone represented by the chemical formula (51), 1.44 g (10.0 mmol) of L-lactide, 4.8 ml of a solution of 0.01 M of tin octylate(tin 2-ethylhexanoate) in toluene, and 4.8 ml of a solution of 0.01 M of p-tert-butylbenzyl alcohol in toluene were placed in a polymerization ampule. After that, 1.32 g of a polymer was prepared in the same manner as in Example 1. NMR analysis was performed under the same conditions as those of Example 1 to determine the structure of the resultant polymer. The analysis confirmed that the polymer was a polyhydroxyalkanoate copolymer containing a unit represented by the following chemical formula (52) as a monomer unit. The analysis also confirmed that an A unit accounted for 10 mol % of the monomer unit and a B unit accounted for 90 mol % thereof.

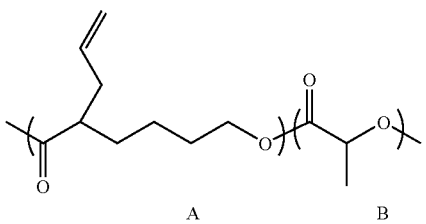

(52)

The resultant polyhydroxyalkanoate was evaluated for average molecular weight in the same manner as in Example 1. As a result, the resultant polyhydroxyalkanoate was found to have a number average molecular weight Mn of 132,000 and a weight average molecular weight Mw of 220,400.

Example 22

Synthesis of Polyester Using 3-(3-butenyl)-2-oxepanone Represented by Chemical Formula (53) and glycolide

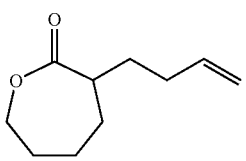

(53)

0.34 g (2.0 mmol) of 3-(3-butenyl)-2-oxepanone represented by the chemical formula (53), 1.16 g (10.0 mmol) of glycolide, 4.8 ml of a solution of 0.01 M of tin octylate(tin 2-ethylhexanoate) in toluene, and 4.8 ml of a solution of 0.01 M of p-tert-butylbenzyl alcohol in toluene were placed in a polymerization ampule. After that, 1.04 g of a polymer was prepared in the same manner as in Example 1. NMR analysis was performed under the same conditions as those of Example 1 to determine the structure of the resultant polymer. The analysis confirmed that the polymer was a polyhydroxyalkanoate copolymer containing a unit represented by the following chemical formula (54) as a monomer unit. The analysis also confirmed that an A unit accounted for 8 mol % of the monomer unit and a B unit accounted for 92 mol % thereof.

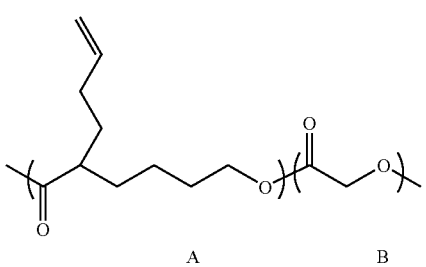

(54)

The resultant polyhydroxyalkanoate was evaluated for average molecular weight in the same manner as in Example 1. As a result, the resultant polyhydroxyalkanoate was found to have a number average molecular weight Mn of 128,000 and a weight average molecular weight Mw of 208,600.

Example 23

Oxidation Reaction of Polyhydroxyalkanoate Composed of Unit Represented by Chemical Formula (21) Synthesized in Example 1

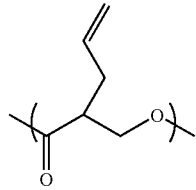

(21)

0.50 g of the polyhydroxyalkanoate composed of the unit represented by the chemical formula (21) synthesized in Example 1 was placed in a round-bottomed flask, and 30 ml of acetone were added to dissolve this. The flask was placed in an ice bath, 5 ml of acetic acid and 3.54 g of 18-crown-6-ether were added, and the whole was stirred. Next, 2.82 g of potassium permanganate were gradually added to the flask in the ice bath, and the whole was stirred in the ice bath for 2 hours and stirred at room temperature for an additional 18 hours. After the completion of the reaction, 60 ml of ethyl acetate was added, and 45 ml of water was further added. Next, sodium hydrogen sulfite was added until peracid was removed. After that, liquid property was adjusted with 1.0N hydrochloric acid to have a pH of 1. The organic layer was extracted and washed with 1.0N hydrochloric acid 3 times. After the organic layer had been collected, the solvent was distilled off to collect a crude polymer. Next, the polymer was washed with 50 ml of water and 50 ml of methanol, and was further washed with 50 ml of water 3 times, followed by collection of a polymer. Next, the polymer was dissolved into 3 ml of THF, and reprecipitated in methanol in an amount 50 times that of THF necessary for the dissolution. The precipitate was collected and dried under reduced pressure to prepare 0.44 g of a polymer. NMR analysis was performed under the same conditions as those of Example 1 to determine the structure of the resultant polymer. The analysis confirmed that the polymer was a polyhydroxyalkanoate containing a unit represented by the following chemical formula (55) as a monomer unit.

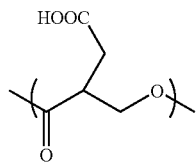

(55)

The resultant polyhydroxyalkanoate was evaluated for average molecular weight in the same manner as in Example 1. As a result, the resultant polyhydroxyalkanoate was found

Example 24

Oxidation Reaction of Polyhydroxyalkanoate Composed of Unit Represented by Chemical Formula (22) Synthesized in Example 2

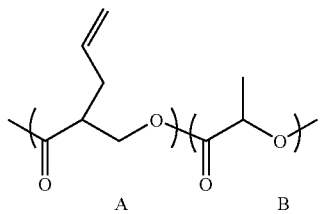
(22)

0.50 g of the polyhydroxyalkanoate copolymer composed of the unit represented by the chemical formula (22) synthesized in Example 2 (A: 9 mol %, B: 91 mol %) was placed in a round-bottomed flask, and 30 ml of acetone were added to dissolve this. The flask was placed in an ice bath, 5 ml of acetic acid and 0.47 g of 18-crown-6-ether were added, and the whole was stirred. Next, 0.38 g of potassium permanganate was gradually added to the flask in the ice bath, and the whole was stirred in the ice bath for 2 hours and stirred at room temperature for an additional 18 hours. After the completion of the reaction, 0.43 g of a polymer was prepared in the same manner as in Example 23. NMR analysis was performed under the same conditions as those of Example 1 to determine the structure of the resultant polymer. The analysis confirmed that the polymer was a polyhydroxyalkanoate containing a unit represented by the following chemical formula (56) as a monomer unit.

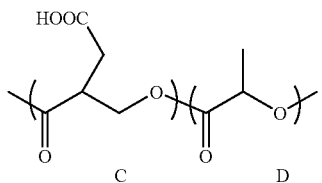
(56)

The resultant polyhydroxyalkanoate was evaluated for average molecular weight in the same manner as in Example 1. As a result, the resultant polyhydroxyalkanoate was found to have a number average molecular weight Mn of 22,300 and a weight average molecular weight Mw of 30,600.

Furthermore, in order to calculate the unit of the resultant polyhydroxyalkanoate, a carboxyl group at the terminal of a side chain of the resultant polyhydroxyalkanoate was methyl esterified with trimethylsilyldiazomethane. 30 mg of the polyhydroxyalkanoate as a target product was placed in a 100-ml round-bottomed flask, and 2.1 ml of chloroform and 0.7 ml of methanol were added to dissolve this. 0.5 ml of a 2-mol/L trimethylsilyldiazomethane-hexane solution was added to the solution, and the whole was stirred at room temperature for 1 hour. After the completion of the reaction, the solvent was distilled off to collect a polymer. The polymer was washed with 50 ml of methanol to collect a polymer. The polymer was dried under reduced pressure to prepare 29 mg of a polyhydroxyalkanoate.

NMR analysis was performed in the same manner as in Example 1. The analysis confirmed that the polyhydroxyalkanoate was a copolymer in which a C unit accounted for 9 mol % of the unit of the polyhydroxyalkanoate represented by the chemical formula (56) and a D unit accounted for 91 mol % thereof.

Example 25

Oxidation Reaction of Polyhydroxyalkanoate Composed of Unit Represented by Chemical Formula (23) Synthesized in Example 3

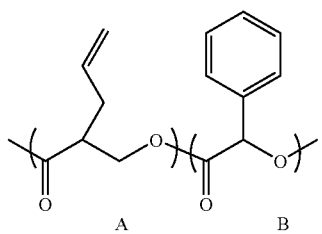
(23)

0.50 g of the polyhydroxyalkanoate copolymer composed of the unit represented by the chemical formula (23) synthesized in Example 3 (A: 10 mol %, B: 90 mol %) was placed in a round-bottomed flask, and 30 ml of acetone was added to dissolve this. The flask was placed in an ice bath, 5 ml of acetic acid and 0.30 g of 18-crown-6-ether were added, and the whole was stirred. Next, 0.24 g of potassium permanganate was gradually added to the flask in the ice bath, and the whole was stirred in the ice bath for 2 hours and stirred at room temperature for an additional 18 hours. After the completion of the reaction, 0.44 g of a polymer was prepared in the same manner as in Example 23. NMR analysis was performed under the same conditions as those of Example 1 to determine the structure of the resultant polymer. The analysis confirmed that the polymer was a polyhydroxyalkanoate containing a unit represented by the following chemical formula (57) as a monomer unit.

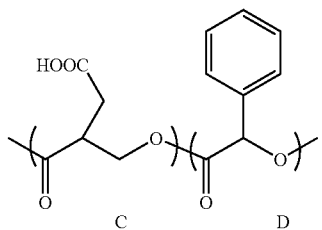
(57)

The resultant polyhydroxyalkanoate was evaluated for average molecular weight in the same manner as in Example 1. As a result, the resultant polyhydroxyalkanoate was found to have a number average molecular weight Mn of 20,100 and a weight average molecular weight Mw of 30,400.

Furthermore, in order to calculate the unit of the resultant polyhydroxyalkanoate, 28 mg of the polyhydroxyalkanoate prepared in the same manner as in Example 24 was subjected to NMR analysis in the same manner as in Example 1. The analysis confirmed that the polyhydroxyalkanoate was a copolymer in which a C unit accounted for 10 mol % of the unit of the polyhydroxyalkanoate represented by the chemical formula (56) and a D unit accounted for 90 mol % thereof.

Example 26

Oxidation Reaction of Polyhydroxyalkanoate Composed of Unit Represented by Chemical Formula (24) Synthesized in Example 4

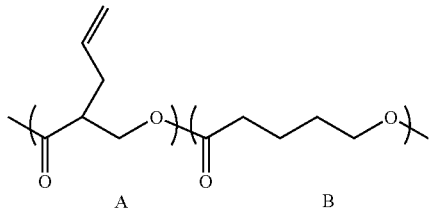

(24)

0.50 g of the polyhydroxyalkanoate copolymer composed of the unit represented by the chemical formula (24) synthesized in Example 4 (A: 16 mol %, B: 84 mol %) was placed in a round-bottomed flask, and 30 ml of acetone was added to dissolve this. The flask was placed in an ice bath, 5 ml of acetic acid and 0.62 g of 18-crown-6-ether were added, and the whole was stirred. Next, 0.50 g of potassium permanganate was gradually added to the flask in the ice bath, and the whole was stirred in the ice bath for 2 hours and stirred at room temperature for an additional 18 hours. After the completion of the reaction, 0.42 g of a polymer was prepared in the same manner as in Example 23. NMR analysis was performed under the same conditions as those of Example 1 to determine the structure of the resultant polymer. The analysis confirmed that the polymer was a polyhydroxyalkanoate containing a unit represented by the following chemical formula (58) as a monomer unit.

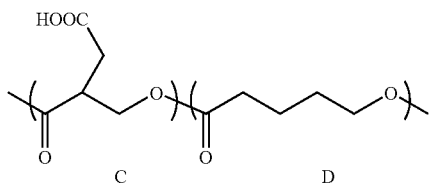

(58)

The resultant polyhydroxyalkanoate was evaluated for average molecular weight in the same manner as in Example 1. As a result, the resultant polyhydroxyalkanoate was found to have a number average molecular weight Mn of 15,700 and a weight average molecular weight Mw of 23,700.

Furthermore, in order to calculate the unit of the resultant polyhydroxyalkanoate, 27 mg of the polyhydroxyalkanoate prepared in the same manner as in Example 24 was subjected to NMR analysis in the same manner as in Example 1. The analysis confirmed that the polyhydroxyalkanoate was a copolymer in which a C unit accounted for 15 mol % of the unit of the polyhydroxyalkanoate represented by the chemical formula (58) and a D unit accounted for 85 mol % thereof.

Example 27

Oxidation Reaction of Polyhydroxyalkanoate Composed of Unit Represented by Chemical Formula (26) Synthesized in Example 5

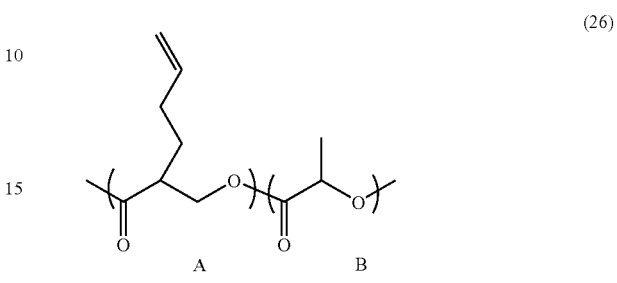

(26)

0.50 g of the polyhydroxyalkanoate copolymer composed of the unit represented by the chemical formula (26) synthesized in Example 5 (A: 8 mol %, B: 92 mol %) was placed in a round-bottomed flask, and 30 ml of acetone was added to dissolve this. The flask was placed in an ice bath, 5 ml of acetic acid and 0.42 g of 18-crown-6-ether were added, and the whole was stirred. Next, 0.33 g of potassium permanganate was gradually added to the flask in the ice bath, and the whole was stirred in the ice bath for 2 hours and stirred at room temperature for an additional 18 hours. After the completion of the reaction, 0.42 g of a polymer was prepared in the same manner as in Example 23. NMR analysis was performed under the same conditions as those of Example 1 to determine the structure of the resultant polymer. The analysis confirmed that the polymer was a polyhydroxyalkanoate containing a unit represented by the following chemical formula (59) as a monomer unit.

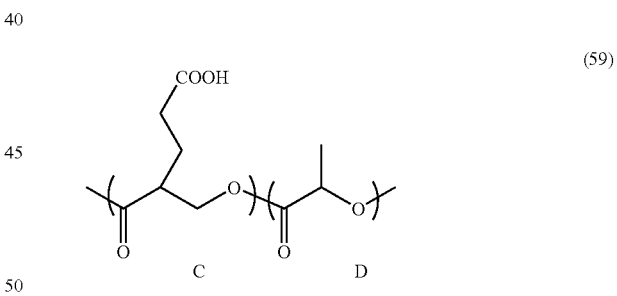

(59)

The resultant polyhydroxyalkanoate was evaluated for average molecular weight in the same manner as in Example 1. As a result, the resultant polyhydroxyalkanoate was found to have a number average molecular weight Mn of 19,800 and a weight average molecular weight Mw of 30,700.

Furthermore, in order to calculate the unit of the resultant polyhydroxyalkanoate, 29 mg of the polyhydroxyalkanoate prepared in the same manner as in Example 24 was subjected to NMR analysis in the same manner as in Example 1. The analysis confirmed that the polyhydroxyalkanoate was a copolymer in which a C unit accounted for 8 mol % of the unit of the polyhydroxyalkanoate represented by the chemical formula (59) and a D unit accounted for 92 mol % thereof.

Example 28

Oxidation Reaction of Polyhydroxyalkanoate Composed of Unit Represented by Chemical Formula (28) Synthesized in Example 6

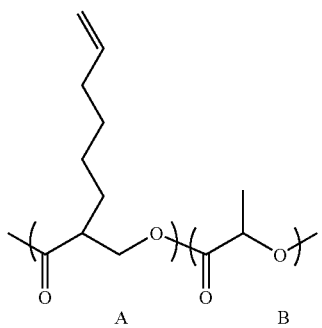
(28)

0.50 g of the polyhydroxyalkanoate copolymer composed of the unit represented by the chemical formula (28) synthesized in Example 6 (A: 7 mol %, B: 93 mol %) was placed in a round-bottomed flask, and 30 ml of acetone was added to dissolve this. The flask was placed in an ice bath, 5 ml of acetic acid and 0.36 g of 18-crown-6-ether were added, and the whole was stirred. Next, 0.28 g of potassium permanganate was gradually added to the flask in the ice bath, and the whole was stirred in the ice bath for 2 hours and stirred at room temperature for an additional 18 hours. After the completion of the reaction, 0.43 g of a polymer was prepared in the same manner as in Example 23. NMR analysis was performed under the same conditions as those of Example 1 to determine the structure of the resultant polymer. The analysis confirmed that the polymer was a polyhydroxyalkanoate containing a unit represented by the following chemical formula (60) as a monomer unit.

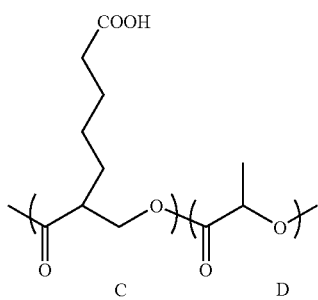
(60)

The resultant polyhydroxyalkanoate was evaluated for average molecular weight in the same manner as in Example 1. As a result, the resultant polyhydroxyalkanoate was found to have a number average molecular weight Mn of 13,200 and a weight average molecular weight Mw of 20,300.

Furthermore, in order to calculate the unit of the resultant polyhydroxyalkanoate, 30 mg of the polyhydroxyalkanoate prepared in the same manner as in Example 24 was subjected to NMR analysis in the same manner as in Example 1. The analysis confirmed that the polyhydroxyalkanoate was a copolymer in which a C unit accounted for 7 mol % of the unit of the polyhydroxyalkanoate represented by the chemical formula (60) and a D unit accounted for 93 mol % thereof.

Example 29

Oxidation Reaction of Polyhydroxyalkanoate Composed of Unit Represented by Chemical Formula (30) Synthesized in Example 7

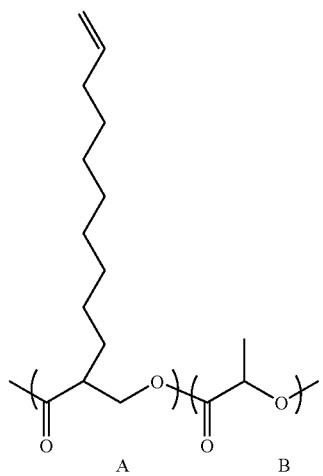
(30)

0.50 g of the polyhydroxyalkanoate copolymer composed of the unit represented by the chemical formula (30) synthesized in Example 7 (A: 4 mol %, B: 96 mol %) was placed in a round-bottomed flask, and 30 ml of acetone was added to dissolve this. The flask was placed in an ice bath, 5 ml of acetic acid and 0.21 g of 18-crown-6-ether were added, and the whole was stirred. Next, 0.17 g of potassium permanganate was gradually added to the flask in the ice bath, and the whole was stirred in the ice bath for 2 hours and stirred at room temperature for an additional 18 hours. 0.44 g of a polymer was prepared in the same manner as in Example 23. NMR analysis was performed under the same conditions as those of Example 1 to determine the structure of the resultant polymer. The analysis confirmed that the polymer was a polyhydroxyalkanoate containing a unit represented by the following chemical formula (61) as a monomer unit.

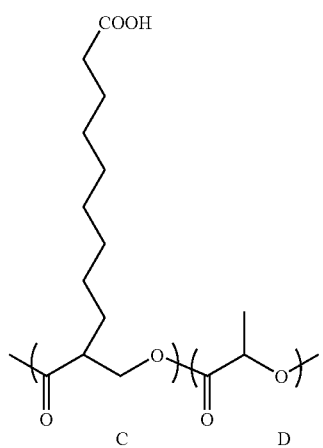
(61)

The resultant polyhydroxyalkanoate was evaluated for average molecular weight in the same manner as in Example 1. As a result, the resultant polyhydroxyalkanoate was found to have a number average molecular weight Mn of 13,100 and a weight average molecular weight Mw of 19,100.

Furthermore, in order to calculate the unit of the resultant polyhydroxyalkanoate, 29 mg of the polyhydroxyalkanoate prepared in the same manner as in Example 24 was subjected to NMR analysis in the same manner as in Example 1. The analysis confirmed that the polyhydroxyalkanoate was a copolymer in which a C unit accounted for 4 mol % of the unit of the polyhydroxyalkanoate represented by the chemical formula (61) and a D unit accounted for 96 mol % thereof.

Example 30

Oxidation Reaction of Polyhydroxyalkanoate Composed of Unit Represented by Chemical Formula (32) Synthesized in Example 8

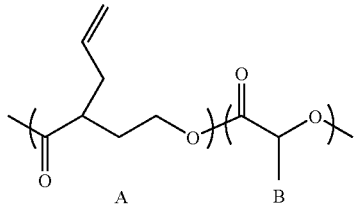

(32)

A    B 0.50 g of the polyhydroxyalkanoate copolymer composed of the unit represented by the chemical formula (32) synthesized in Example 8 (A: 5 mol %, B: 95 mol %) was placed in a round-bottomed flask, and 30 ml of acetone was added to dissolve this. The flask was placed in an ice bath, 5 ml of acetic acid and 0.26 g of 18-crown-6-ether were added, and the whole was stirred. Next, 0.21 g of potassium permanganate was gradually added to the flask in the ice bath, and the whole was stirred in the ice bath for 2 hours and stirred at room temperature for an additional 18 hours. 0.45 g of a polymer was prepared in the same manner as in Example 23. NMR analysis was performed under the same conditions as those of Example 1 to determine the structure of the resultant polymer. The analysis confirmed that the polymer was a polyhydroxyalkanoate containing a unit represented by the following chemical formula (62) as a monomer unit.

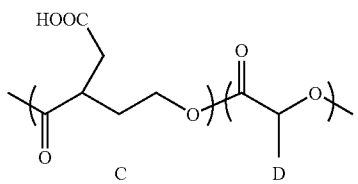

(62)

C    D

The resultant polyhydroxyalkanoate was evaluated for average molecular weight in the same manner as in Example 1. As a result, the resultant polyhydroxyalkanoate was found to have a number average molecular weight Mn of 7,800 and a weight average molecular weight Mw of 12,200.

Furthermore, in order to calculate the unit of the resultant polyhydroxyalkanoate, 29 mg of the polyhydroxyalkanoate prepared in the same manner as in Example 24 was subjected to NMR analysis in the same manner as in Example 1. The analysis confirmed that the polyhydroxyalkanoate was a copolymer in which a C unit accounted for 5 mol % of the unit of the polyhydroxyalkanoate represented by the chemical formula (62) and a D unit accounted for 95 mol % thereof.

Example 31

Oxidation Reaction of Polyhydroxyalkanoate Composed of Unit Represented by Chemical Formula (33) Synthesized in Example 9

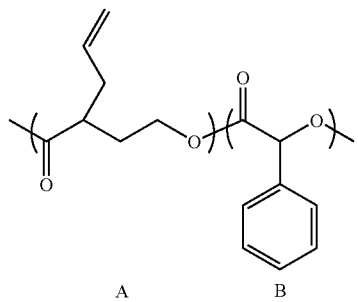

(33)

A    B 0.50 g of the polyhydroxyalkanoate copolymer composed of the unit represented by the chemical formula (33) synthesized in Example 9 (A: 6 mol %, B: 94 mol %) was placed in a round-bottomed flask, and 30 ml of acetone was added to dissolve this. The flask was placed in an ice bath, 5 ml of acetic acid and 0.18 g of 18-crown-6-ether were added, and the whole was stirred. Next, 0.14 g of potassium permanganate was gradually added to the flask in the ice bath, and the whole was stirred in the ice bath for 2 hours and stirred at room temperature for an additional 18 hours. 0.44 g of a polymer was prepared in the same manner as in Example 23. NMR analysis was performed under the same conditions as those of Example 1 to determine the structure of the resultant polymer. The analysis confirmed that the polymer was a polyhydroxyalkanoate containing a unit represented by the following chemical formula (63) as a monomer unit.

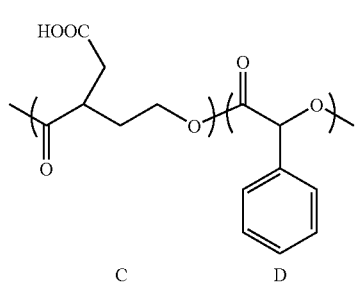

(63)

C    D

The resultant polyhydroxyalkanoate was evaluated for average molecular weight in the same manner as in Example 1. As a result, the resultant polyhydroxyalkanoate was found to have a number average molecular weight Mn of 7,300 and a weight average molecular weight Mw of 11,100.

Furthermore, in order to calculate the unit of the resultant polyhydroxyalkanoate, 28 mg of the polyhydroxyalkanoate prepared in the same manner as in Example 24 was subjected to NMR analysis in the same manner as in Example 1. The analysis confirmed that the polyhydroxyalkanoate was a copolymer in which a C unit accounted for 6 mol % of the unit of the polyhydroxyalkanoate represented by the chemical formula (63) and a D unit accounted for 94 mol % thereof.

Example 32

Oxidation Reaction of Polyhydroxyalkanoate Composed of Unit Represented by Chemical Formula (35) Synthesized in Example 10

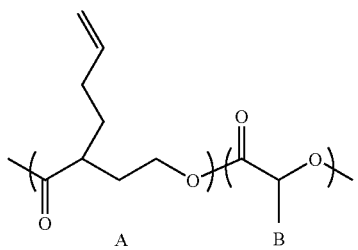

(35)

0.50 g of the polyhydroxyalkanoate copolymer composed of the unit represented by the chemical formula (35) synthesized in Example 10 (A: 4 mol %, B: 96 mol %) was placed in a round-bottomed flask, and 30 ml of acetone was added to dissolve this. The flask was placed in an ice bath, 5 ml of acetic acid and 0.21 g of 18-crown-6-ether were added, and the whole was stirred. Next, 0.17 g of potassium permanganate was gradually added to the flask in the ice bath, and the whole was stirred in the ice bath for 2 hours and stirred at room temperature for an additional 18 hours. After the completion of the reaction, 0.44 g of a polymer was prepared in the same manner as in Example 23. NMR analysis was performed under the same conditions as those of Example 1 to determine the structure of the resultant polymer. The analysis confirmed that the polymer was a polyhydroxyalkanoate containing a unit represented by the following chemical formula (64) as a monomer unit.

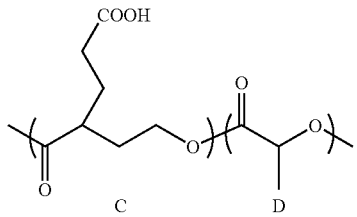

(64)

The resultant polyhydroxyalkanoate was evaluated for average molecular weight in the same manner as in Example 1. As a result, the resultant polyhydroxyalkanoate was found to have a number average molecular weight Mn of 5,800 and a weight average molecular weight Mw of 9,500.

Furthermore, in order to calculate the unit of the resultant polyhydroxyalkanoate, 29 mg of the polyhydroxyalkanoate prepared in the same manner as in Example 24 was subjected to NMR analysis in the same manner as in Example 1. The analysis confirmed that the polyhydroxyalkanoate was a copolymer in which a C unit accounted for 4 mol % of the unit of the polyhydroxyalkanoate represented by the chemical formula (64) and a D unit accounted for 96 mol % thereof.

Example 33

Oxidation Reaction of Polyhydroxyalkanoate Composed of Unit Represented by Chemical Formula (37) Synthesized in Example 11

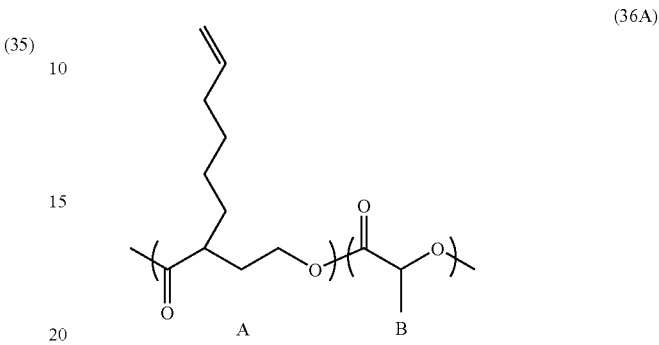

(36A)

0.50 g of the polyhydroxyalkanoate copolymer composed of the unit represented by the chemical formula (36A) synthesized in Example 11 (A: 4 mol %, B: 96 mol %) was placed in a round-bottomed flask, and 30 ml of acetone were added to dissolve this. The flask was placed in an ice bath, 5 ml of acetic acid and 0.20 g of 18-crown-6-ether were added, and the whole was stirred. Next, 0.16 g of potassium permanganate was gradually added to the flask in the ice bath, and the whole was stirred in the ice bath for 2 hours and stirred at room temperature for an additional 18 hours. After the completion of the reaction, 0.43 g of a polymer was prepared in the same manner as in Example 23. NMR analysis was performed under the same conditions as those of Example 1 to determine the structure of the resultant polymer. The analysis confirmed that the polymer was a polyhydroxyalkanoate containing a unit represented by the following chemical formula (65) as a monomer unit.

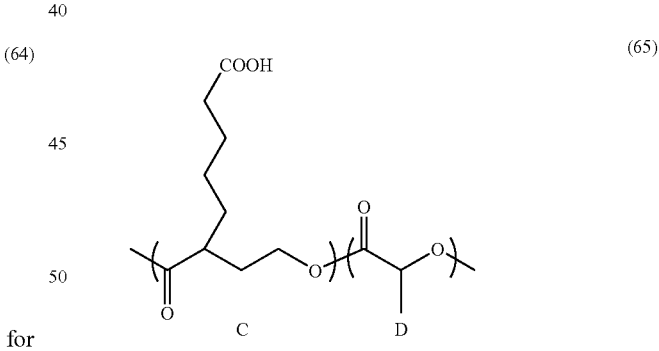

(65)

The resultant polyhydroxyalkanoate was evaluated for average molecular weight in the same manner as in Example 1. As a result, the resultant polyhydroxyalkanoate was found to have a number average molecular weight Mn of 5,200 and a weight average molecular weight Mw of 7,900.

Furthermore, in order to calculate the unit of the resultant polyhydroxyalkanoate, 28 mg of the polyhydroxyalkanoate prepared in the same manner as in Example 24 was subjected to NMR analysis in the same manner as in Example 1. The analysis confirmed that the polyhydroxyalkanoate was a copolymer in which a C unit accounted for 4 mol % of the unit of the polyhydroxyalkanoate represented by the chemical formula (65) and a D unit accounted for 96 mol % thereof.

Example 34

Oxidation Reaction of Polyhydroxyalkanoate Composed of Unit Represented by Chemical Formula (38) Synthesized in Example 12

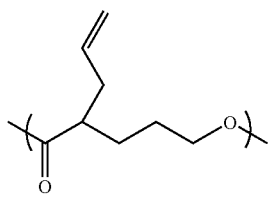
(38)

0.50 g of the polyhydroxyalkanoate composed of the unit represented by the chemical formula (38) synthesized in Example 12 was placed in a round-bottomed flask, and 30 ml of acetone was added to dissolve this. The flask was placed in an ice bath, 5 ml of acetic acid and 2.83 g of 18-crown-6-ether were added, and the whole was stirred. Next, 2.25 g of potassium permanganate was gradually added to the flask in the ice bath, and the whole was stirred in the ice bath for 2 hours and stirred at room temperature for an additional 18 hours. After the completion of the reaction, 0.43 g of a polymer was prepared in the same manner as in Example 23. NMR analysis was performed under the same conditions as those of Example 1 to determine the structure of the resultant polymer. The analysis confirmed that the polymer was a polyhydroxyalkanoate containing a unit represented by the following chemical formula (66) as a monomer unit.

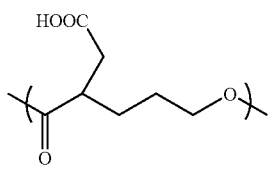
(66)

The resultant polyhydroxyalkanoate was evaluated for average molecular weight in the same manner as in Example 1. As a result, the resultant polyhydroxyalkanoate was found to have a number average molecular weight Mn of 5,300 and a weight average molecular weight Mw of 6,500.

Example 35

Oxidation Reaction of Polyhydroxyalkanoate Composed of Unit Represented by Chemical Formula (39) Synthesized in Example 13

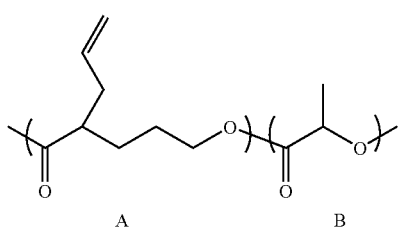
(39)

0.50 g of the polyhydroxyalkanoate copolymer composed of the unit represented by the chemical formula (39) synthesized in Example 13 (A: 10 mol %, B: 90 mol %) was placed in a round-bottomed flask, and 30 ml of acetone were added to dissolve this. The flask was placed in an ice bath, 5 ml of acetic acid and 0.50 g of 18-crown-6-ether were added, and the whole was stirred. Next, 0.40 g of potassium permanganate was gradually added to the flask in the ice bath, and the whole was stirred in the ice bath for 2 hours and stirred at room temperature for an additional 18 hours. After the completion of the reaction, 0.45 g of a polymer was prepared in the same manner as in Example 23. NMR analysis was performed under the same conditions as those of Example 1 to determine the structure of the resultant polymer. The analysis confirmed that the polymer was a polyhydroxyalkanoate containing a unit represented by the following chemical formula (67) as a monomer unit.

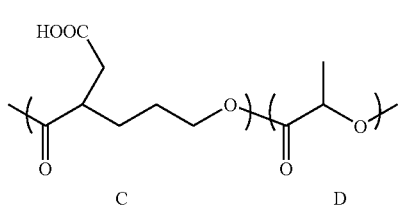
(67)

The resultant polyhydroxyalkanoate was evaluated for average molecular weight in the same manner as in Example 1. As a result, the resultant polyhydroxyalkanoate was found to have a number average molecular weight Mn of 117,300 and a weight average molecular weight Mw of 206,400.

Furthermore, in order to calculate the unit of the resultant polyhydroxyalkanoate, 29 mg of the polyhydroxyalkanoate prepared in the same manner as in Example 24 was subjected to NMR analysis in the same manner as in Example 1. The analysis confirmed that the polyhydroxyalkanoate was a copolymer in which a C unit accounted for 10 mol % of the unit of the polyhydroxyalkanoate represented by the chemical formula (67) and a D unit accounted for 90 mol % thereof.

Example 36

Oxidation Reaction of Polyhydroxyalkanoate Composed of Unit Represented by Chemical Formula (40) Synthesized in Example 14

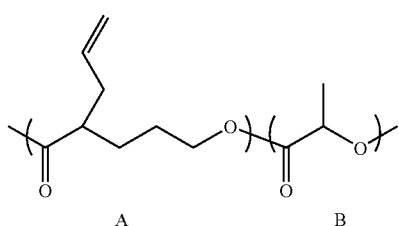
(40)

5.00 g of the polyhydroxyalkanoate copolymer composed of the unit represented by the chemical formula (40) synthesized in Example 14 (A: 11 mol %, B: 89 mol %) was placed in a round-bottomed flask, and 300 ml of acetone was added to dissolve this. The flask was placed in an ice bath, 50 ml of acetic acid and 5.48 g of 18-crown-6-ether were added, and the whole was stirred. Next, 4.37 g of potassium permanganate was gradually added to the flask in the ice bath, and the whole was stirred in the ice bath for 2 hours and stirred at room temperature for an additional 18 hours. After the completion of the reaction, 600 ml of ethyl acetate were added, and 450 ml of water were further added. Next, sodium hydrogen sulfite was added until peracid was removed. After that, liquid property was adjusted with 1.0N hydrochloric acid to have a pH of 1. The organic layer was extracted and washed with 1.0N hydrochloric acid 3 times. After the organic layer had been collected, the solvent was distilled off to collect a crude polymer. Next, the polymer was washed with 500 ml of water and 500 ml of methanol, and was further washed with 500 ml of water 3 times, followed by collection of a polymer. Next, the polymer was dissolved into 30 ml of THF, then dissolved into THF, and reprecipitated in methanol in an amount 50 times that of THF necessary for the dissolution. The precipitate was collected and dried under reduced pressure to prepare 4.51 g of a polymer. NMR analysis was performed under the same conditions as those of Example 1 to determine the structure of the resultant polymer. The analysis confirmed that the polymer was a polyhydroxyalkanoate containing a unit represented by the following chemical formula (68) as a monomer unit.

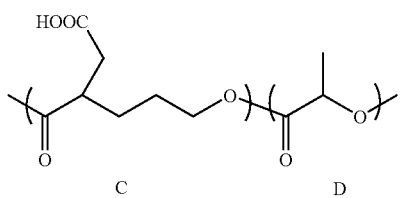

(68)

The resultant polyhydroxyalkanoate was evaluated for average molecular weight in the same manner as in Example 1. As a result, the resultant polyhydroxyalkanoate was found to have a number average molecular weight Mn of 123,500 and a weight average molecular weight Mw of 202,500.

Furthermore, in order to calculate the unit of the resultant polyhydroxyalkanoate, 28 mg of the polyhydroxyalkanoate prepared in the same manner as in Example 24 was subjected to NMR analysis in the same manner as in Example 1. The analysis confirmed that the polyhydroxyalkanoate was a copolymer in which a C unit accounted for 10 mol % of the unit of the polyhydroxyalkanoate represented by the chemical formula (68) and a D unit accounted for 90 mol % thereof.

Example 37

Oxidation Reaction of Polyhydroxyalkanoate Composed of Unit Represented by Chemical Formula (41) Synthesized in Example 15

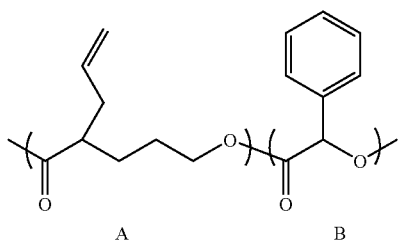

(41)

0.50 g of the polyhydroxyalkanoate copolymer composed of the unit represented by the chemical formula (41) synthesized in Example 15 (A: 12 mol %, B: 88 mol %) was placed in a round-bottomed flask, and 30 ml of acetone was added to dissolve this. The flask was placed in an ice bath, 5 ml of acetic acid and 0.35 g of 18-crown-6-ether were added, and the whole was stirred. Next, 0.28 g of potassium permanganate was gradually added to the flask in the ice bath, and the whole was stirred in the ice bath for 2 hours and stirred at room temperature for an additional 18 hours. After the completion of the reaction, 0.44 g of a polymer was prepared in the same manner as in Example 23. NMR analysis was performed under the same conditions as those of Example 1 to determine the structure of the resultant polymer. The analysis confirmed that the polymer was a polyhydroxyalkanoate containing a unit represented by the following chemical formula (69) as a monomer unit.

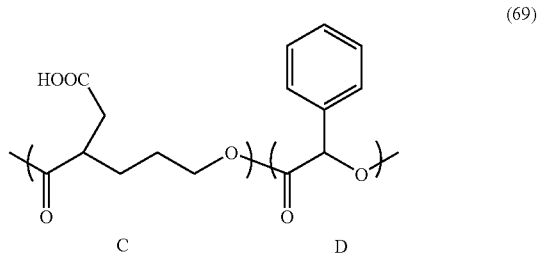

(69)

The resultant polyhydroxyalkanoate was evaluated for average molecular weight in the same manner as in Example 1. As a result, the resultant polyhydroxyalkanoate was found to have a number average molecular weight Mn of 38,600 and a weight average molecular weight Mw of 69,100.

Furthermore, in order to calculate the unit of the resultant polyhydroxyalkanoate, 28 mg of the polyhydroxyalkanoate prepared in the same manner as in Example 24 was subjected to NMR analysis in the same manner as in Example 1. The analysis confirmed that the polyhydroxyalkanoate was a copolymer in which a C unit accounted for 11 mol % of the unit of the polyhydroxyalkanoate represented by the chemical formula (69) and a D unit accounted for 89 mol % thereof.

Example 38

Oxidation Reaction of Polyhydroxyalkanoate Composed of Unit Represented by Chemical Formula (43) Synthesized in Example 16

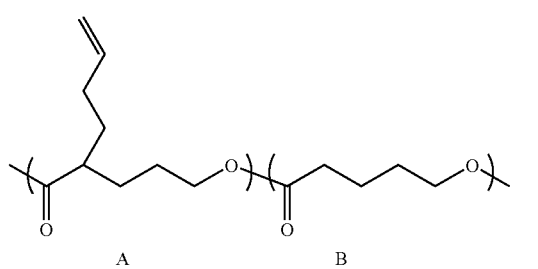

(43)

0.50 g of the polyhydroxyalkanoate copolymer composed of the unit represented by the chemical formula (43) synthesized in Example 17 (A: 18 mol %, B: 82 mol %) was placed in a round-bottomed flask, and 30 ml of acetone was added to dissolve this. The flask was placed in an ice bath, 5 ml of acetic acid and 0.82 g of 18-crown-6-ether were added, and the whole was stirred. Next, 0.66 g of potassium permanganate was gradually added to the flask in the ice bath, and the whole was stirred in the ice bath for 2 hours and stirred at room temperature for an additional 18 hours. After the completion of the reaction, 0.44 g of a polymer was prepared in the same manner as in Example 23. NMR analysis was performed under the same conditions as those of Example 1 to determine the structure of the resultant polymer. The analysis confirmed that the polymer was a polyhydroxyalkanoate containing a unit represented by the following chemical formula (70) as a monomer unit.

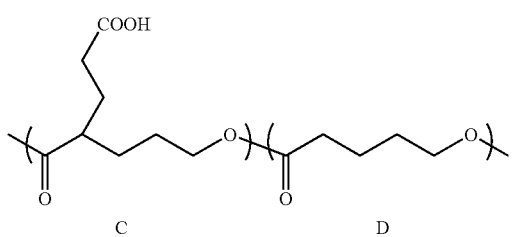

The resultant polyhydroxyalkanoate was evaluated for average molecular weight in the same manner as in Example 1. As a result, the resultant polyhydroxyalkanoate was found to have a number average molecular weight Mn of 31,500 and a weight average molecular weight Mw of 54,200.

Furthermore, in order to calculate the unit of the resultant polyhydroxyalkanoate, 29 mg of the polyhydroxyalkanoate prepared in the same manner as in Example 24 was subjected to NMR analysis in the same manner as in Example 1. The analysis confirmed that the polyhydroxyalkanoate was a copolymer in which a C unit accounted for 16 mol % of the unit of the polyhydroxyalkanoate represented by the chemical formula (70) and a D unit accounted for 84 mol % thereof.

Example 39

Oxidation Reaction of Polyhydroxyalkanoate Composed of Unit Represented by Chemical Formula (44) Synthesized in Example 17

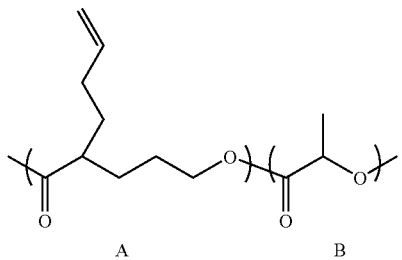

0.50 g of the polyhydroxyalkanoate copolymer composed of the unit represented by the chemical formula (44) synthesized in Example 17 (A: 9 mol %, B: 91 mol %) was placed in a round-bottomed flask, and 30 ml of acetone was added to dissolve this. The flask was placed in an ice bath, 5 ml of acetic acid and 0.45 g of 18-crown-6-ether were added, and the whole was stirred. Next, 0.36 g of potassium permanganate was gradually added to the flask in the ice bath, and the whole was stirred in the ice bath for 2 hours and stirred at room temperature for an additional 18 hours. After the completion of the reaction, 0.44 g of a polymer was prepared in the same manner as in Example 23. NMR analysis was performed under the same conditions as those of Example 1 to determine the structure of the resultant polymer. The analysis confirmed that the polymer was a polyhydroxyalkanoate containing a unit represented by the following chemical formula (71) as a monomer unit.

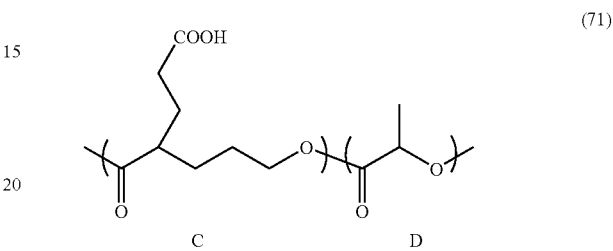

The resultant polyhydroxyalkanoate was evaluated for average molecular weight in the same manner as in Example 1. As a result, the resultant polyhydroxyalkanoate was found to have a number average molecular weight Mn of 68,500 and a weight average molecular weight Mw of 112,000.

Furthermore, in order to calculate the unit of the resultant polyhydroxyalkanoate, 28 mg of the polyhydroxyalkanoate prepared in the same manner as in Example 24 was subjected to NMR analysis in the same manner as in Example 1. The analysis confirmed that the polyhydroxyalkanoate was a copolymer in which a C unit accounted for 9 mol % of the unit of the polyhydroxyalkanoate represented by the chemical formula (71) and a D unit accounted for 91 mol % thereof.

Example 40

Oxidation Reaction of Polyhydroxyalkanoate Composed of Unit Represented by Chemical Formula (46) Synthesized in Example 18

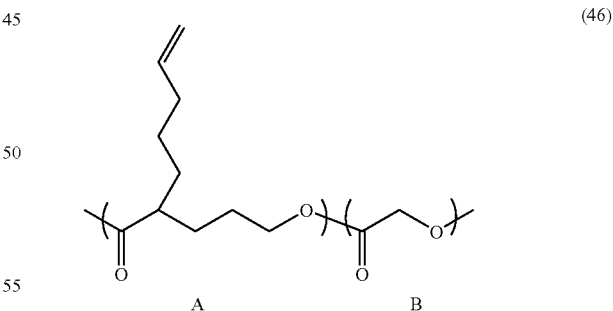

0.50 g of the polyhydroxyalkanoate copolymer composed of the unit represented by the chemical formula (46) synthesized in Example 18 (A: 7 mol %, B: 93 mol %) was placed in a round-bottomed flask, and 30 ml of acetone was added to dissolve this. The flask was placed in an ice bath, 5 ml of acetic acid and 0.42 g of 18-crown-6-ether were added, and the whole was stirred. Next, 0.34 g of potassium permanganate was gradually added to the flask in the ice bath, and the whole was stirred in the ice bath for 2 hours and stirred at room temperature for an additional 18 hours. After the completion of the reaction, 0.44 g of a polymer was prepared in the same manner as in Example 23. NMR analysis was performed under the same conditions as those of Example 1 to determine the structure of the resultant polymer. The analysis confirmed that the polymer was a polyhydroxyalkanoate containing a unit represented by the following chemical formula (72) as a monomer unit.

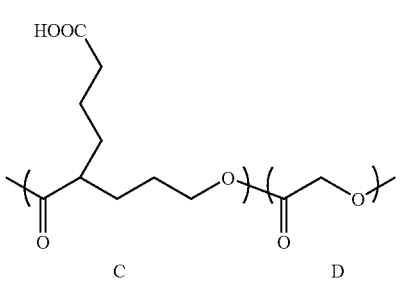

(72)

The resultant polyhydroxyalkanoate was evaluated for average molecular weight in the same manner as in Example 1. As a result, the resultant polyhydroxyalkanoate was found to have a number average molecular weight Mn of 58,700 and a weight average molecular weight Mw of 95,700.

Furthermore, in order to calculate the unit of the resultant polyhydroxyalkanoate, 29 mg of the polyhydroxyalkanoate prepared in the same manner as in Example 24 was subjected to NMR analysis in the same manner as in Example 1. The analysis confirmed that the polyhydroxyalkanoate was a copolymer in which a C unit accounted for 7 mol % of the unit of the polyhydroxyalkanoate represented by the chemical formula (72) and a D unit accounted for 93 mol % thereof.

Example 41

Oxidation Reaction of Polyhydroxyalkanoate Composed of Unit Represented by Chemical Formula (48) Synthesized in Example 19

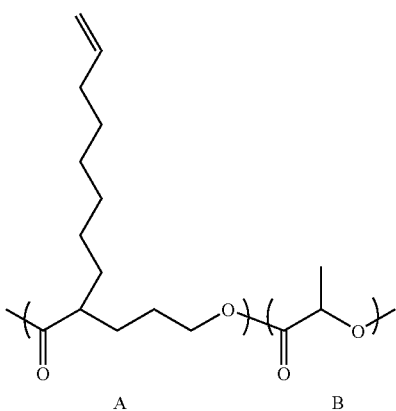

(48)

0.50 g of the polyhydroxyalkanoate copolymer composed of the unit represented by the chemical formula (48) synthesized in Example 19 (A: 6 mol %, B: 94 mol %) was placed in a round-bottomed flask, and 30 ml of acetone was added to dissolve this. The flask was placed in an ice bath, 5 ml of acetic acid and 0.30 g of 18-crown-6-ether were added, and the whole was stirred. Next, 0.24 g of potassium permanganate was gradually added to the flask in the ice bath, and the whole was stirred in the ice bath for 2 hours and stirred at room temperature for an additional 18 hours. After the completion of the reaction, 0.45 g of a polymer was prepared in the same manner as in Example 23. NMR analysis was performed under the same conditions as those of Example 1 to determine the structure of the resultant polymer. The analysis confirmed that the polymer was a polyhydroxyalkanoate containing a unit represented by the following chemical formula (73) as a monomer unit.

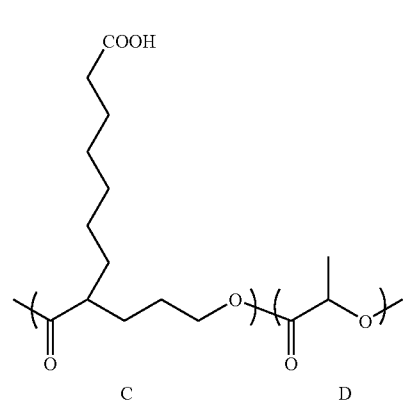

(73)

The resultant polyhydroxyalkanoate was evaluated for average molecular weight in the same manner as in Example 1. As a result, the resultant polyhydroxyalkanoate was found to have a number average molecular weight Mn of 72,600 and a weight average molecular weight Mw of 131,400.

Furthermore, in order to calculate the unit of the resultant polyhydroxyalkanoate, 28 mg of the polyhydroxyalkanoate prepared in the same manner as in Example 24 was subjected to NMR analysis in the same manner as in Example 1. The analysis confirmed that the polyhydroxyalkanoate was a copolymer in which a C unit accounted for 6 mol % of the unit of the polyhydroxyalkanoate represented by the chemical formula (73) and a D unit accounted for 94 mol % thereof.

Example 42

Oxidation Reaction of Polyhydroxyalkanoate Composed of Unit Represented by Chemical Formula (50) Synthesized in Example 20

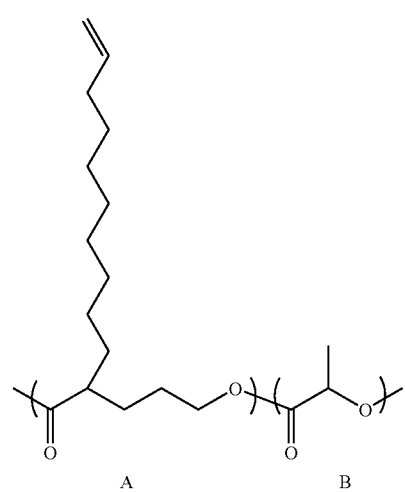

(50)

0.50 g of the polyhydroxyalkanoate copolymer composed of the unit represented by the chemical formula (50) synthesized in Example 20 (A: 4 mol %, B: 96 mol %) was placed in a round-bottomed flask, and 30 ml of acetone was added to dissolve this. The flask was placed in an ice bath, 5 ml of acetic acid and 0.20 g of 18-crown-6-ether were added, and the whole was stirred. Next, 0.16 g of potassium permanganate was gradually added to the flask in the ice bath, and the whole was stirred in the ice bath for 2 hours and stirred at room temperature for an additional 18 hours. After the completion of the reaction, 0.43 g of a polymer was prepared in the same manner as in Example 23. NMR analysis was performed under the same conditions as those of Example 1 to determine the structure of the resultant polymer. The analysis confirmed that the polymer was a polyhydroxyalkanoate containing a unit represented by the following chemical formula (74) as a monomer unit.

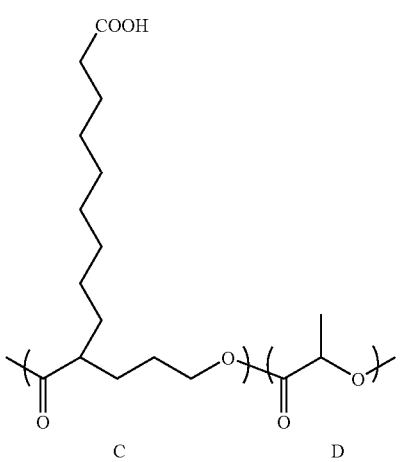

(74)

The resultant polyhydroxyalkanoate was evaluated for average molecular weight in the same manner as in Example 1. As a result, the resultant polyhydroxyalkanoate was found to have a number average molecular weight Mn of 48,700 and a weight average molecular weight Mw of 85,200.

Furthermore, in order to calculate the unit of the resultant polyhydroxyalkanoate, 29 mg of the polyhydroxyalkanoate prepared in the same manner as in Example 24 was subjected to NMR analysis in the same manner as in Example 1. The analysis confirmed that the polyhydroxyalkanoate was a copolymer in which a C unit accounted for 4 mol % of the unit of the polyhydroxyalkanoate represented by the chemical formula (74) and a D unit accounted for 96 mol % thereof.

Example 43

Oxidation Reaction of Polyhydroxyalkanoate Composed of Unit Represented by Chemical Formula (52) Synthesized in Example 21

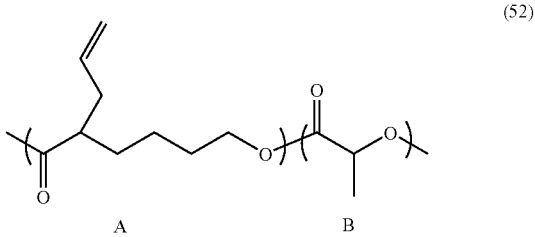

(52)

0.50 g of the polyhydroxyalkanoate copolymer composed of the unit represented by the chemical formula (52) synthesized in Example 21 (A: 9 mol %, B: 91 mol %) was placed in a round-bottomed flask, and 30 ml of acetone was added to dissolve this. The flask was placed in an ice bath, 5 ml of acetic acid and 0.45 g of 18-crown-6-ether were added, and the whole was stirred. Next, 0.36 g of potassium permanganate was gradually added to the flask in the ice bath, and the whole was stirred in the ice bath for 2 hours and stirred at room temperature for an additional 18 hours. After the completion of the reaction, 0.44 g of a polymer was prepared in the same manner as in Example 23. NMR analysis was performed under the same conditions as those of Example 1 to determine the structure of the resultant polymer. The analysis confirmed that the polymer was a polyhydroxyalkanoate containing a unit represented by the following chemical formula (75) as a monomer unit.

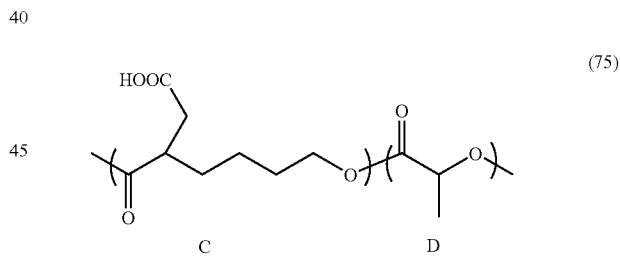

(75)

The resultant polyhydroxyalkanoate was evaluated for average molecular weight in the same manner as in Example 1. As a result, the resultant polyhydroxyalkanoate was found to have a number average molecular weight Mn of 115,400 and a weight average molecular weight Mw of 202,000.

Furthermore, in order to calculate the unit of the resultant polyhydroxyalkanoate, 28 mg of the polyhydroxyalkanoate prepared in the same manner as in Example 24 was subjected to NMR analysis in the same manner as in Example 1. The analysis confirmed that the polyhydroxyalkanoate was a copolymer in which a C unit accounted for 9 mol % of the unit of the polyhydroxyalkanoate represented by the chemical formula (75) and a D unit accounted for 91 mol % thereof.

Example 44

Oxidation Reaction of Polyhydroxyalkanoate Composed of Unit Represented by Chemical Formula (54) Synthesized in Example 22

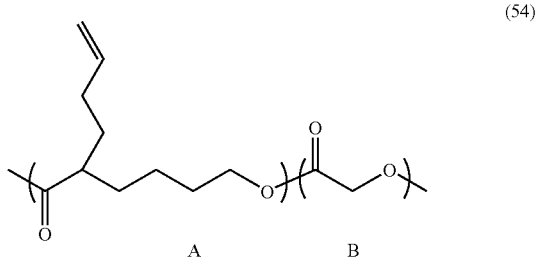

(54)

0.50 g of the polyhydroxyalkanoate copolymer composed of the unit represented by the chemical formula (54) synthesized in Example 22 (A: 7 mol %, B: 93 mol %) was placed in a round-bottomed flask, and 30 ml of acetone was added to dissolve this. The flask was placed in an ice bath, 5 ml of acetic acid and 0.42 g of 18-crown-6-ether were added, and the whole was stirred. Next, 0.34 g of potassium permanganate was gradually added to the flask in the ice bath, and the whole was stirred in the ice bath for 2 hours and stirred at room temperature for an additional 18 hours. After the completion of the reaction, 0.44 g of a polymer was prepared in the same manner as in Example 23. NMR analysis was performed under the same conditions as those of Example 1 to determine the structure of the resultant polymer. The analysis confirmed that the polymer was a polyhydroxyalkanoate containing a unit represented by the following chemical formula (76) as a monomer unit.

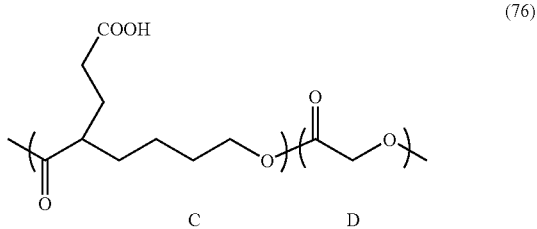

(76)

The resultant polyhydroxyalkanoate was evaluated for average molecular weight in the same manner as in Example 1. As a result, the resultant polyhydroxyalkanoate was found to have a number average molecular weight Mn of 106,800 and a weight average molecular weight Mw of 174,100.

Furthermore, in order to calculate the unit of the resultant polyhydroxyalkanoate, 27 mg of the polyhydroxyalkanoate prepared in the same manner as in Example 24 was subjected to NMR analysis in the same manner as in Example 1. The analysis confirmed that the polyhydroxyalkanoate was a copolymer in which a C unit accounted for 7 mol % of the unit of the polyhydroxyalkanoate represented by the chemical formula (76) and a D unit accounted for 93 mol % thereof.

Example 45

Condensation Reaction Between Polyhydroxyalkanoate Composed of Unit Represented by Chemical Formula (56) Synthesized in Example 24 and 2-aminobenzenesulfonic Acid

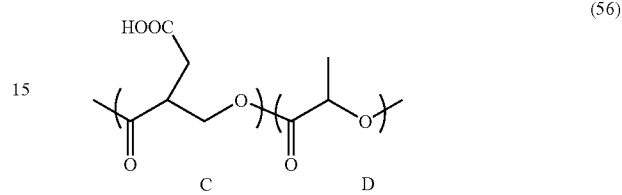

(56)

Under a nitrogen atmosphere, 0.40 g of the polymer synthesized by using the polyhydroxyalkanoate copolymer composed of the unit represented by the chemical formula (56) synthesized in Example 24 (C: 9 mol %, D: 91 mol %) and 0.40 g of 2-aminobenzenesulfonic acid were placed in a 100-ml three-necked flask. 15.0 ml of pyridine was added to the flask, and the mixture was stirred. After that, 1.21 ml of triphenyl phosphite were added, and the whole was heated at 120° C. for 6 hours. After the completion of the reaction, the resultant was reprecipitated in 150 ml of ethanol, followed by collection. The resultant polymer was washed with 1N hydrochloric acid for 1 day, stirred in water for 1 day to wash the polymer, and dried under reduced pressure to prepare 0.34 g of a polymer. The structure of the resultant polymer was determined through analysis according to $^1$H-NMR (FT-NMR: Bruker DPX 400; resonance frequency: 400 MHz; measured nuclear species: $^1$H; solvent used: DMSO-$d_6$; measurement temperature: room temperature) or Fourier transformation-infrared absorption (FT-IR) spectrum (Nicolet AVATAR 360FT-IR). As a result of IR measurement, a peak at 1,695 cm$^{-1}$ derived from a carboxylic acid reduced, and a peak derived from an amide group was newly observed at 1,658 cm$^{-1}$.

$^1$H-NMR confirmed that the resultant polymer was a polyhydroxyalkanoate containing a unit represented by the following chemical formula (77) as a monomer unit because a peak derived from an aromatic ring of the 2-aminobenzenesulfonic acid structure shifted.

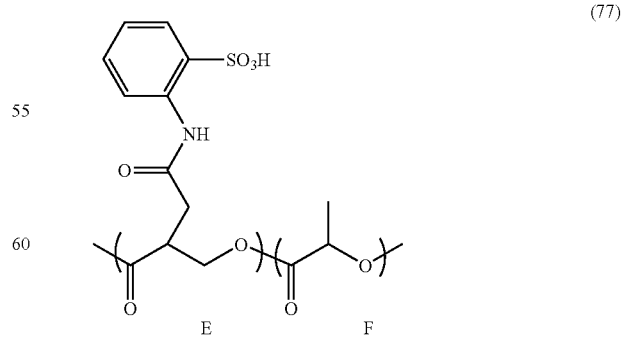

(77)

It was also confirmed that the polyhydroxyalkanoate was a copolymer in which an E unit accounted for 9 mol % of the unit of the polyhydroxyalkanoate represented by the chemical formula (77) and an F unit accounted for 91 mol % thereof. The resultant polymer was evaluated for average molecular weight by means of gel permeation chromatography (GPC; Tosoh Corporation HLC-8120, column; Polymer Laboratories PLgel 5μ MIXED-C, solvent; DMF/LiBr 0.1% (w/v), polystyrene conversion). As a result, the resultant polymer was found to have a number average molecular weight Mn of 19,800 and a weight average molecular weight Mw of 28,100.

Example 46

Condensation Reaction Between Polyhydroxyalkanoate Composed of Unit Represented by Chemical Formula (57) Synthesized in Example 25 and 2-amino-2-methylpropanesulfonic Acid

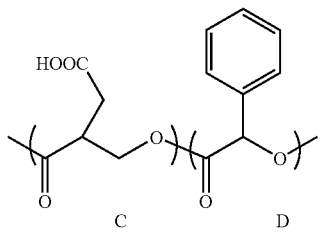

(57)

Under a nitrogen atmosphere, 0.40 g of the polymer synthesized by using the polyhydroxyalkanoate copolymer composed of the unit represented by the chemical formula (57) synthesized in Example 25 (C: 10 mol %, D: 90 mol %) and 0.23 g of 2-amino-2-methylpropanesulfonic acid were placed in a 100-ml three-necked flask. 15.0 ml of pyridine were added to the flask, and the mixture was stirred. After that, 0.78 ml of triphenyl phosphite was added, and the whole was heated at 120° C. for 6 hours. After the completion of the reaction, 0.32 g of a polymer was prepared in the same manner as in Example 45. The structure of the resultant polymer was determined through analysis in the same manner as in Example 45. As a result of IR measurement, a peak at 1,695 $cm^{-1}$ derived from a carboxylic acid reduced, and a peak derived from an amide group was newly observed at 1,668 $cm^{-1}$.

$^1$H-NMR confirmed that the resultant polymer was a polyhydroxyalkanoate containing a unit represented by the following chemical formula (78) as a monomer unit because a peak derived from methylene of the 2-amino-2-methylpropanesulfonic acid structure shifted.

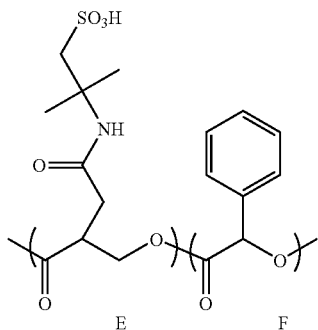

(78)

It was also confirmed that the polyhydroxyalkanoate was a copolymer in which an E unit accounted for 10 mol % of the unit of the polyhydroxyalkanoate represented by the chemical formula (78) and an F unit accounted for 90 mol % thereof. The resultant polymer was evaluated for average molecular weight in the same manner as in Example 45. As a result, the resultant polymer was found to have a number average molecular weight Mn of 17,600 and a weight average molecular weight Mw of 27,100.

Example 47

Condensation Reaction Between Polyhydroxyalkanoate Composed of Unit Represented by Chemical Formula (58) Synthesized in Example 26 and 2-aminobenzenesulfonic Acid Phenyl Ester

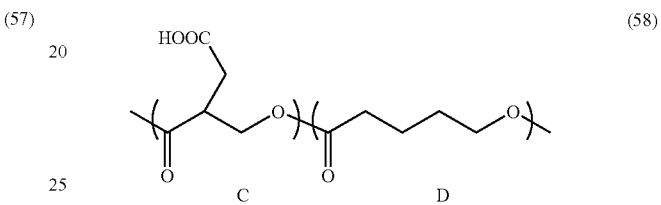

(58)

Under a nitrogen atmosphere, 0.40 g of the polymer synthesized by using the polyhydroxyalkanoate copolymer composed of the unit represented by the chemical formula (58) synthesized in Example 26 (C: 15 mol %, D: 85 mol %) and 0.71 g of 2-aminobenzenesulfonic acid phenyl ester were placed in a 100-ml three-necked flask. 15.0 ml of pyridine was added to the flask, and the mixture was stirred. After that, 1.50 ml of triphenyl phosphite was added, and the whole was heated at 120° C. for 6 hours. After the completion of the reaction, 0.37 g of a polymer was prepared in the same manner as in Example 45. The structure of the resultant polymer was determined through analysis in the same manner as in Example 45. As a result of IR measurement, a peak at 1,695 $cm^{-1}$ derived from a carboxylic acid reduced, and a peak derived from an amide group was newly observed at 1,658 $cm^{-1}$.

$^1$H-NMR confirmed that the resultant polymer was a polyhydroxyalkanoate containing a unit represented by the following chemical formula (79) as a monomer unit because a peak derived from an aromatic ring of the 2-aminobenzenesulfonic acid phenyl ester structure shifted.

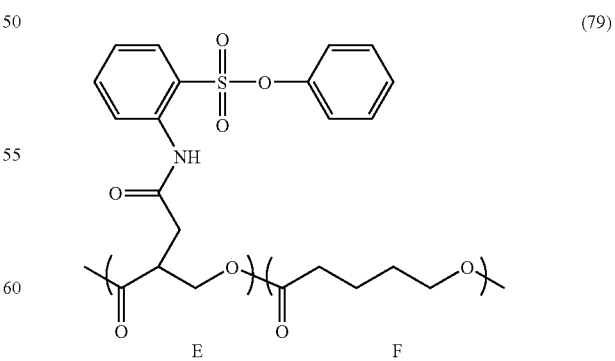

(79)

It was also confirmed that the polyhydroxyalkanoate was a copolymer in which an E unit accounted for 15 mol % of the unit of the polyhydroxyalkanoate represented by the chemi-

Example 48

Condensation Reaction Between Polyhydroxyalkanoate Composed of Unit Represented by Chemical Formula (59) Synthesized in Example 27 and 2-amino-1-naphthalenesulfonic Acid

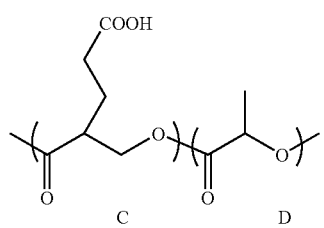

(59)

Under a nitrogen atmosphere, 0.40 g of the polymer synthesized by using the polyhydroxyalkanoate copolymer composed of the unit represented by the chemical formula (59) synthesized in Example 27 (C: 8 mol %, D: 92 mol %) and 0.46 g of 2-amino-1-naphthalenesulfonic acid were placed in a 100-ml three-necked flask. 15.0 ml of pyridine was added to the flask, and the mixture was stirred. After that, 1.07 ml of triphenyl phosphite was added, and the whole was heated at 120° C. for 6 hours. After the completion of the reaction, 0.36 g of a polymer was prepared in the same manner as in Example 45. The structure of the resultant polymer was determined through analysis in the same manner as in Example 45. As a result of IR measurement, a peak at 1,695 cm$^{-1}$ derived from a carboxylic acid reduced, and a peak derived from an amide group was newly observed at 1,658 cm$^{-1}$. $^1$H-NMR confirmed that the resultant polymer was a polyhydroxyalkanoate containing a unit represented by the following chemical formula (80) as a monomer unit because a peak derived from an aromatic ring of the 2-amino-1-naphthalenesulfonic acid structure shifted.

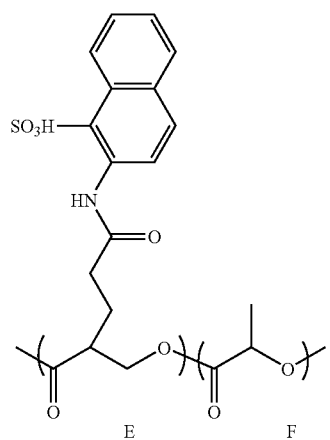

(80)

It was also confirmed that the polyhydroxyalkanoate was a copolymer in which an E unit accounted for 8 mol % of the unit of the polyhydroxyalkanoate represented by the chemical formula (80) and an F unit accounted for 92 mol % thereof. The resultant polymer was evaluated for average molecular weight in the same manner as in Example 45. As a result, the resultant polymer was found to have a number average molecular weight Mn of 17,800 and a weight average molecular weight Mw of 28,100.

Example 49

Condensation Reaction Between Polyhydroxyalkanoate Composed of Unit Represented by Chemical Formula (60) Synthesized in Example 28 and p-toluidine-2-sulfonic Acid

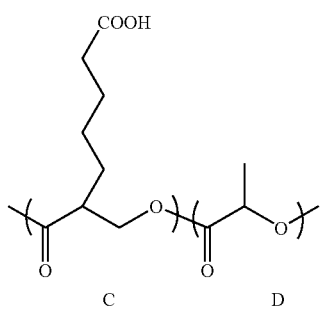

(60)

Under a nitrogen atmosphere, 0.40 g of the polymer synthesized by using the polyhydroxyalkanoate copolymer composed of the unit represented by the chemical formula (60) synthesized in Example 28 (C: 7 mol %, D: 93 mol %) and 0.33 g of p-toluidine-2-sulfonic acid were placed in a 100-ml three-necked flask. 15.0 ml of pyridine was added to the flask, and the mixture was stirred. After that, 0.92 ml of triphenyl phosphite was added, and the whole was heated at 120° C. for 6 hours. After the completion of the reaction, 0.33 g of a polymer was prepared in the same manner as in Example 45. The structure of the resultant polymer was determined through analysis in the same manner as in Example 45. As a result of IR measurement, a peak at 1,695 cm$^{-1}$ derived from a carboxylic acid reduced, and a peak derived from an amide group was newly observed at 1,658 cm$^{-1}$. $^1$H-NMR confirmed that the resultant polymer was a polyhydroxyalkanoate containing a unit represented by the following chemical formula (81) as a monomer unit because a peak derived from an aromatic ring of the p-toluidine-2-sulfonic acid structure shifted.

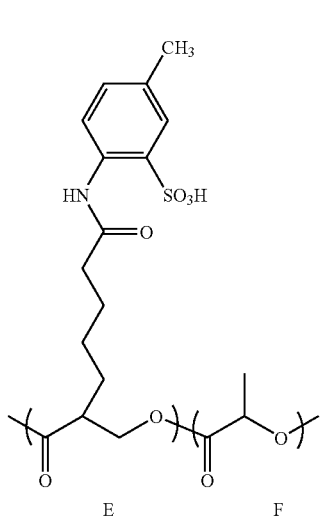

(81)

It was also confirmed that the polyhydroxyalkanoate was a copolymer in which an E unit accounted for 7 mol % of the unit of the polyhydroxyalkanoate represented by the chemical formula (81) and an F unit accounted for 93 mol % thereof. The resultant polymer was evaluated for average molecular weight in the same manner as in Example 45. As a result, the resultant polymer was found to have a number average molecular weight Mn of 12,100 and a weight average molecular weight Mw of 19,400.

Example 50

Condensation Reaction Between Polyhydroxyalkanoate Composed of Unit Represented by Chemical Formula (61) Synthesized in Example 29 and 4-methoxyaniline-2-sulfonic Acid

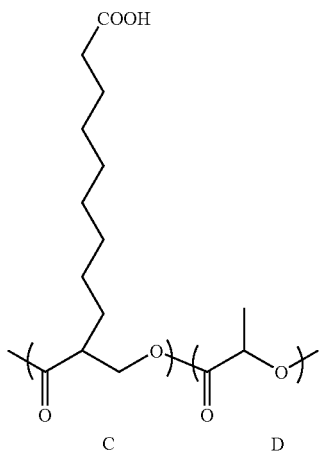

(61)

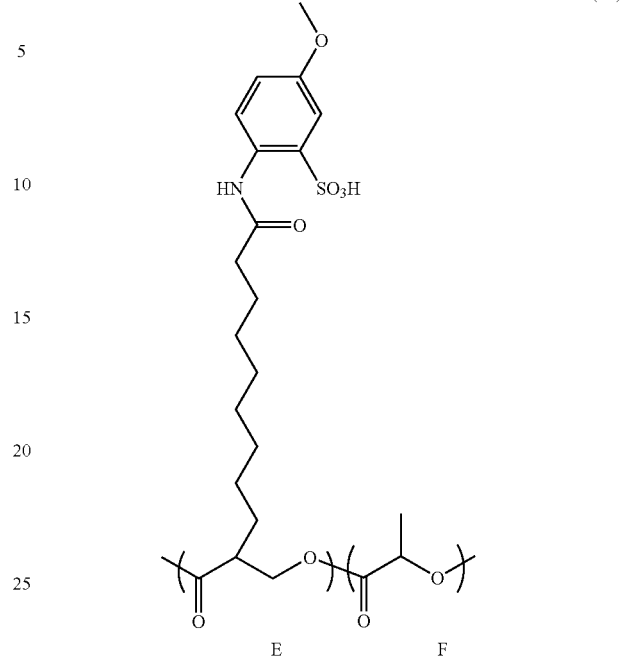

(82)

Under a nitrogen atmosphere, 0.40 g of the polymer synthesized by using the polyhydroxyalkanoate copolymer composed of the unit represented by the chemical formula (61) synthesized in Example 29 (C: 4 mol %, D: 96 mol %) and 0.21 g of 4-methoxyaniline-2-sulfonic acid were placed in a 100-ml three-necked flask. 15.0 ml of pyridine was added to the flask, and the mixture was stirred. After that, 0.53 ml of triphenyl phosphite was added, and the whole was heated at 120° C. for 6 hours. After the completion of the reaction, 0.34 g of a polymer was prepared in the same manner as in Example 45. The structure of the resultant polymer was determined through analysis in the same manner as in Example 45. As a result of IR measurement, a peak at 1,695 cm$^{-1}$ derived from a carboxylic acid reduced, and a peak derived from an amide group was newly observed at 1,658 cm$^{-1}$. $^1$H-NMR confirmed that the resultant polymer was a polyhydroxyalkanoate containing a unit represented by the following chemical formula (82) as a monomer unit because a peak derived from an aromatic ring of the 4-methoxyaniline-2-sulfonic acid structure shifted.

It was also confirmed that the polyhydroxyalkanoate was a copolymer in which an E unit accounted for 4 mol % of the unit of the polyhydroxyalkanoate represented by the chemical formula (82) and an F unit accounted for 96 mol % thereof. The resultant polymer was evaluated for average molecular weight in the same manner as in Example 45. As a result, the resultant polymer was found to have a number average molecular weight Mn of 11,900 and a weight average molecular weight Mw of 18,800.

Example 51

Condensation Reaction Between Polyhydroxyalkanoate Composed of Unit Represented by Chemical Formula (62) Synthesized in Example 30 and 2-aminobenzenesulfonic Acid

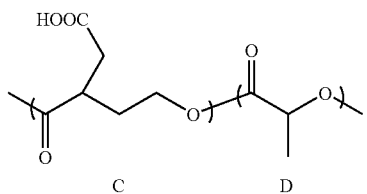

(62)

Under a nitrogen atmosphere, 0.40 g of the polymer synthesized by using the polyhydroxyalkanoate copolymer composed of the unit represented by the chemical formula (62) synthesized in Example 24 (C: 5 mol %, D: 95 mol %) and 0.23 g of 2-aminobenzenesulfonic acid were placed in a 100-ml three-necked flask. 15.0 ml of pyridine was added to the flask, and the mixture was stirred. After that, 0.69 ml of triphenyl phosphite was added, and the whole was heated at 120° C. for 6 hours. After the completion of the reaction, 0.33 g of a polymer was prepared in the same manner as in Example 45. The structure of the resultant polymer was determined through analysis in the same manner as in Example 45. As a result of IR measurement, a peak at 1,695 cm$^{-1}$ derived from a carboxylic acid reduced, and a peak derived from an amide group was newly observed at 1,658 cm$^{-1}$. $^1$H-NMR confirmed that the resultant polymer was a polyhydroxyalkanoate containing a unit represented by the following chemical formula (83) as a monomer unit because a peak derived from an aromatic ring of the 2-aminobenzenesulfonic acid structure shifted.

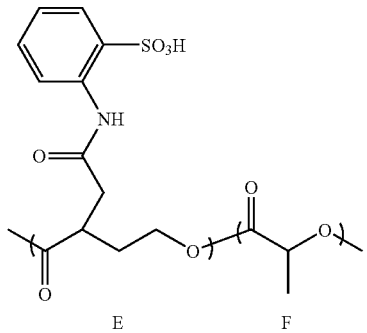

(83)

It was also confirmed that the polyhydroxyalkanoate was a copolymer in which an E unit accounted for 5 mol % of the unit of the polyhydroxyalkanoate represented by the chemical formula (83) and an F unit accounted for 95 mol % thereof. The resultant polymer was evaluated for average molecular weight in the same manner as in Example 45. As a result, the resultant polymer was found to have a number average molecular weight Mn of 7,300 and a weight average molecular weight Mw of 11,600.

Example 52

Condensation Reaction Between Polyhydroxyalkanoate Composed of Unit Represented by Chemical Formula (63) Synthesized in Example 31 and Taurine

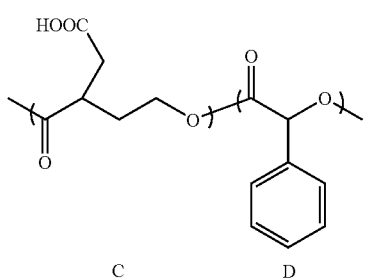

(63)

Under a nitrogen atmosphere, 0.40 g of the polymer synthesized by using the polyhydroxyalkanoate copolymer composed of the unit represented by the chemical formula (63) synthesized in Example 31 (C: 6 mol %, D: 94 mol %) and 0.11 g of taurine were placed in a 100-ml three-necked flask. 15.0 ml of pyridine were added to the flask, and the mixture was stirred. After that, 0.46 ml of triphenyl phosphite was added, and the whole was heated at 120° C. for 6 hours. After the completion of the reaction, 0.30 g of a polymer was prepared in the same manner as in Example 45. The structure of the resultant polymer was determined through analysis in the same manner as in Example 45. As a result of IR measurement, a peak at 1,695 cm$^{-1}$ derived from a carboxylic acid reduced, and a peak derived from an amide group was newly observed at 1,668 cm$^{-1}$.

$^1$H-NMR confirmed that the resultant polymer was a polyhydroxyalkanoate containing a unit represented by the following chemical formula (84) as a monomer unit because a peak derived from methylene of the taurine structure shifted.

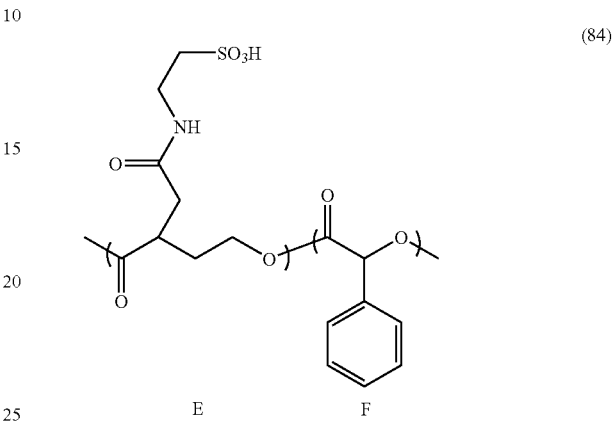

(84)

It was also confirmed that the polyhydroxyalkanoate was a copolymer in which an E unit accounted for 6 mol % of the unit of the polyhydroxyalkanoate represented by the chemical formula (84) and an F unit accounted for 94 mol % thereof. The resultant polymer was evaluated for average molecular weight in the same manner as in Example 45. As a result, the resultant polymer was found to have a number average molecular weight Mn of 6,800 and a weight average molecular weight Mw of 10,900.

Example 53

Condensation Reaction Between Polyhydroxyalkanoate Composed of Unit Represented by Chemical Formula (64) Synthesized in Example 32 and 1-naphthylamine-8-sulfonic Acid

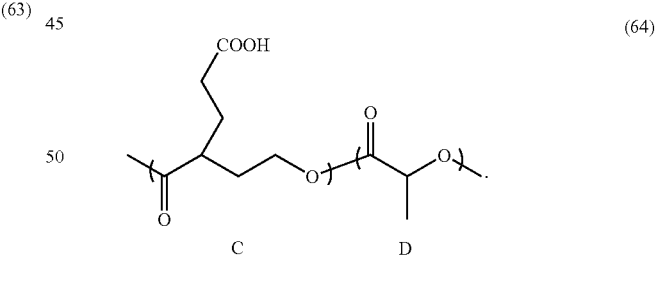

(64)

Under a nitrogen atmosphere, 0.40 g of the polymer synthesized by using the polyhydroxyalkanoate copolymer composed of the unit represented by the chemical formula (64) synthesized in Example 32 (C: 4 mol %, D: 96 mol %) and 0.24 g of 1-naphthylamine-8-sulfonic acid were placed in a 100-ml three-necked flask. 15.0 ml of pyridine was added to the flask, and the mixture was stirred. After that, 0.55 ml of triphenyl phosphite was added, and the whole was heated at 120° C. for 6 hours. After the completion of the reaction, 0.35 g of a polymer was prepared in the same manner as in Example 45. The structure of the resultant polymer was determined through analysis in the same manner as in Example 45.

As a result of IR measurement, a peak at 1,695 cm$^{-1}$ derived from a carboxylic acid reduced, and a peak derived from an amide group was newly observed at 1,658 cm$^{-1}$. $^1$H-NMR confirmed that the resultant polymer was a polyhydroxyalkanoate containing a unit represented by the following chemical formula (85) as a monomer unit because a peak derived from an aromatic ring of the 1-naphthylamine-8-sulfonic acid structure shifted.

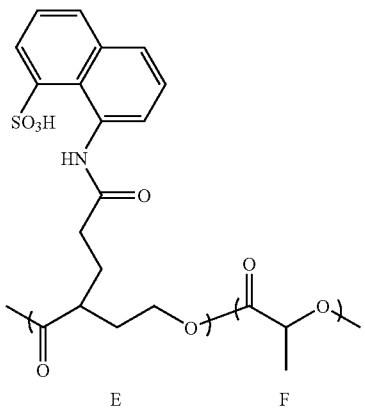

(85)

It was also confirmed that the polyhydroxyalkanoate was a copolymer in which an E unit accounted for 4 mol % of the unit of the polyhydroxyalkanoate represented by the chemical formula (85) and an F unit accounted for 96 mol % thereof. The resultant polymer was evaluated for average molecular weight in the same manner as in Example 45. As a result, the resultant polymer was found to have a number average molecular weight Mn of 5,300 and a weight average molecular weight Mw of 9,000.

Example 54

Condensation Reaction Between Polyhydroxyalkanoate Composed of Unit Represented by Chemical Formula (65) Synthesized in Example 33 and 4-aminobenzenesulfonic Acid Phenyl Ester

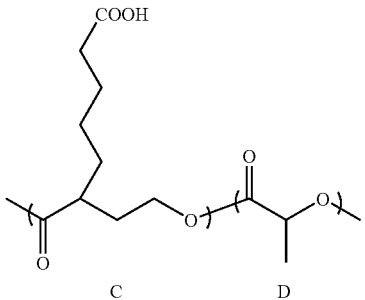

(65)

Under a nitrogen atmosphere, 0.40 g of the polymer synthesized by using the polyhydroxyalkanoate copolymer composed of the unit represented by the chemical formula (65) synthesized in Example 33 (C: 4 mol %, D: 96 mol %) and 0.25 g of 4-aminobenzenesulfonic acid phenyl ester were placed in a 100-ml three-necked flask. 15.0 ml of pyridine was added to the flask, and the mixture was stirred. After that, 0.53 ml of triphenyl phosphite was added, and the whole was heated at 120° C. for 6 hours. After the completion of the reaction, 0.35 g of a polymer was prepared in the same manner as in Example 45. The structure of the resultant polymer was determined through analysis in the same manner as in Example 45. As a result of IR measurement, a peak at 1,695 cm$^{-1}$ derived from a carboxylic acid reduced, and a peak derived from an amide group was newly observed at 1,658 cm$^{-1}$.

$^1$H-NMR confirmed that the resultant polymer was a polyhydroxyalkanoate containing a unit represented by the following chemical formula (86) as a monomer unit because a peak derived from an aromatic ring of the 4-aminobenzenesulfonic acid phenyl ester structure shifted.

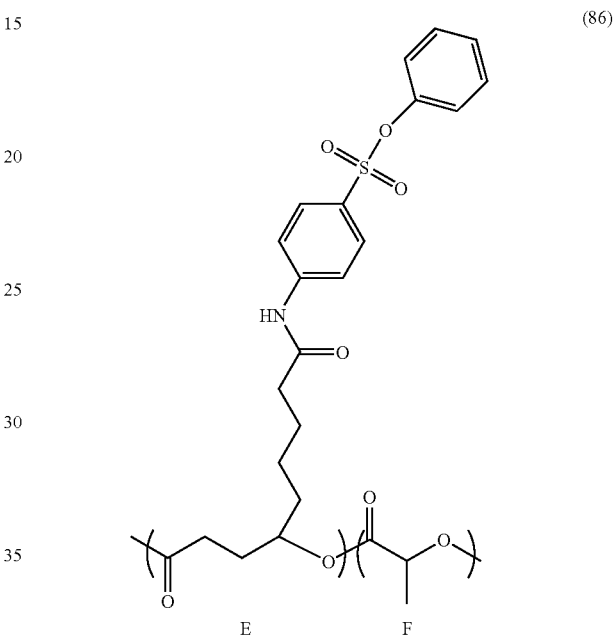

(86)

It was also confirmed that the polyhydroxyalkanoate was a copolymer in which an E unit accounted for 4 mol % of the unit of the polyhydroxyalkanoate represented by the chemical formula (86) and an F unit accounted for 96 mol % thereof. The resultant polymer was evaluated for average molecular weight in the same manner as in Example 45. As a result, the resultant polymer was found to have a number average molecular weight Mn of 5,200 and a weight average molecular weight Mw of 8,000.

Example 55

Condensation Reaction Between Polyhydroxyalkanoate Composed of Unit Represented by Chemical Formula (68) Synthesized in Example 36 and 2-aminobenzenesulfonic Acid

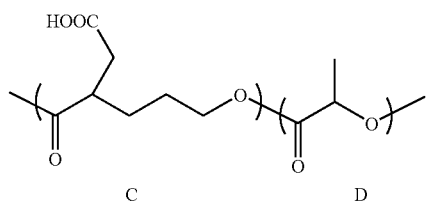

(68)

Under a nitrogen atmosphere, 0.40 g of the polymer synthesized by using the polyhydroxyalkanoate copolymer composed of the unit represented by the chemical formula (68) synthesized in Example 36 (C: 10 mol %, D: 90 mol %) and 0.43 g of 2-aminobenzenesulfonic acid were placed in a 100-ml three-necked flask. 15.0 ml of pyridine was added to the flask, and the mixture was stirred. After that, 1.29 ml of triphenyl phosphite was added, and the whole was heated at 120° C. for 6 hours. After the completion of the reaction, 0.34 g of a polymer was prepared in the same manner as in Example 45. The structure of the resultant polymer was determined through analysis in the same manner as in Example 45. As a result of IR measurement, a peak at 1,695 cm$^{-1}$ derived from a carboxylic acid reduced, and a peak derived from an amide group was newly observed at 1,658 cm$^{-1}$. $^{1}$H-NMR confirmed that the resultant polymer was a polyhydroxyalkanoate containing a unit represented by the following chemical formula (87) as a monomer unit because a peak derived from an aromatic ring of the 2-aminobenzenesulfonic acid structure shifted.

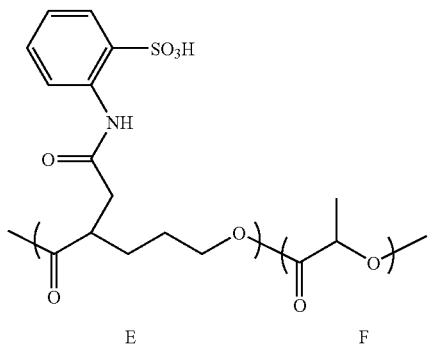

(87)

It was also confirmed that the polyhydroxyalkanoate was a copolymer in which an E unit accounted for 10 mol % of the unit of the polyhydroxyalkanoate represented by the chemical formula (87) and an F unit accounted for 90 mol % thereof. The resultant polymer was evaluated for average molecular weight in the same manner as in Example 45. As a result, the resultant polymer was found to have a number average molecular weight Mn of 109,800 and a weight average molecular weight Mw of 184,500.

Example 56

Condensation Reaction Between Polyhydroxyalkanoate Composed of Unit Represented by Chemical Formula (68) Synthesized in Example 36 and 2 amino-2-methylpropanesulfonic Acid

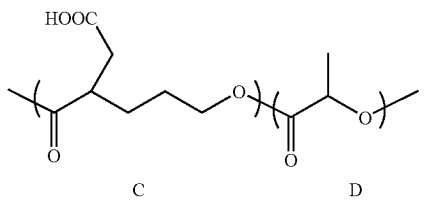

(68)

Under a nitrogen atmosphere, 0.40 g of the polymer synthesized by using the polyhydroxyalkanoate copolymer composed of the unit represented by the chemical formula (68) synthesized in Example 36 (C: 10 mol %, D: 90 mol %) and 0.38 g of 2-amino-2-methylpropanesulfonic acid were placed in a 100-ml three-necked flask. 15.0 ml of pyridine was added to the flask, and the mixture was stirred. After that, 1.29 ml of triphenyl phosphite was added, and the whole was heated at 120° C. for 6 hours. After the completion of the reaction, 0.34 g of a polymer was prepared in the same manner as in Example 45. The structure of the resultant polymer was determined through analysis in the same manner as in Example 45. As a result of IR measurement, a peak at 1,695 cm$^{-1}$ derived from a carboxylic acid reduced, and a peak derived from an amide group was newly observed at 1,668 cm$^{-1}$.

$^{1}$H-NMR confirmed that the resultant polymer was a polyhydroxyalkanoate containing a unit represented by the following chemical formula (88) as a monomer unit because a peak derived from methylene of the 2-amino-2-methylpropanesulfonic acid structure shifted.

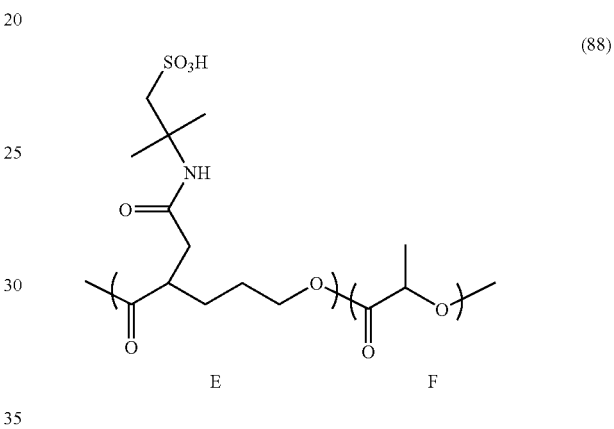

(88)

It was also confirmed that the polyhydroxyalkanoate was a copolymer in which an E unit accounted for 10 mol % of the unit of the polyhydroxyalkanoate represented by the chemical formula (88) and an F unit accounted for 90 mol % thereof. The resultant polymer was evaluated for average molecular weight in the same manner as in Example 45. As a result, the resultant polymer was found to have a number average molecular weight Mn of 105,300 and a weight average molecular weight Mw of 181,100.

Example 57

Condensation Reaction Between Polyhydroxyalkanoate Composed of Unit Represented by Chemical Formula (68) Synthesized in Example 36 and 2-aminobenzenesulfonic Acid Phenyl Ester

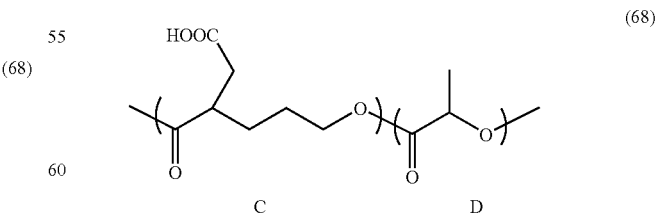

(68)

Under a nitrogen atmosphere, 0.40 g of the polymer synthesized by using the polyhydroxyalkanoate copolymer composed of the unit represented by the chemical formula (68) synthesized in Example 36 (C: 10 mol %, D: 90 mol %) and 0.62 g of 2-aminobenzenesulfonic acid phenyl ester were placed in a 100-ml three-necked flask. 15.0 ml of pyridine was added to the flask, and the mixture was stirred. After that, 1.29 ml of triphenyl phosphite was added, and the whole was heated at 120° C. for 6 hours. After the completion of the reaction, 0.37 g of a polymer was prepared in the same manner as in Example 45. The structure of the resultant polymer was determined through analysis in the same manner as in Example 45. As a result of IR measurement, a peak at 1,695 cm$^{-1}$ derived from a carboxylic acid reduced, and a peak derived from an amide group was newly observed at 1,658 cm$^{-1}$.

$^1$H-NMR confirmed that the resultant polymer was a polyhydroxyalkanoate containing a unit represented by the following chemical formula (89) as a monomer unit because a peak derived from an aromatic ring of the 2-aminobenzenesulfonic acid phenyl ester structure shifted.

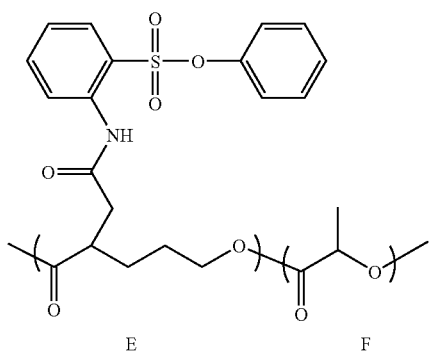

(89)

It was also confirmed that the polyhydroxyalkanoate was a copolymer in which an E unit accounted for 10 mol % of the unit of the polyhydroxyalkanoate represented by the chemical formula (89) and an F unit accounted for 90 mol % thereof. The resultant polymer was evaluated for average molecular weight in the same manner as in Example 45. As a result, the resultant polymer was found to have a number average molecular weight Mn of 113,000 and a weight average molecular weight Mw of 200,000.

Example 58

Condensation Reaction Between Polyhydroxyalkanoate Composed of Unit Represented by Chemical Formula (68) Synthesized in Example 36 and 2-amino-1-naphthalenesulfonic Acid

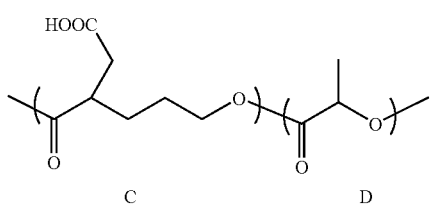

(68)

Under a nitrogen atmosphere, 0.40 g of the polymer synthesized by using the polyhydroxyalkanoate copolymer composed of the unit represented by the chemical formula (68) synthesized in Example 36 (C: 10 mol %, D: 90 mol %) and 0.55 g of 2-amino-1-naphthalenesulfonic acid were placed in a 100-ml three-necked flask. 15.0 ml of pyridine was added to the flask, and the mixture was stirred. After that, 1.29 ml of triphenyl phosphite was added, and the whole was heated at 120° C. for 6 hours. After the completion of the reaction, 0.36 g of a polymer was prepared in the same manner as in Example 45. The structure of the resultant polymer was determined through analysis in the same manner as in Example 45. As a result of IR measurement, a peak at 1,695 cm$^{-1}$ derived from a carboxylic acid reduced, and a peak derived from an amide group was newly observed at 1,658 cm$^{-1}$. $^1$H-NMR confirmed that the resultant polymer was a polyhydroxyalkanoate containing a unit represented by the following chemical formula (90) as a monomer unit because a peak derived from an aromatic ring of the 2-amino-1-naphthalenesulfonic acid structure shifted.

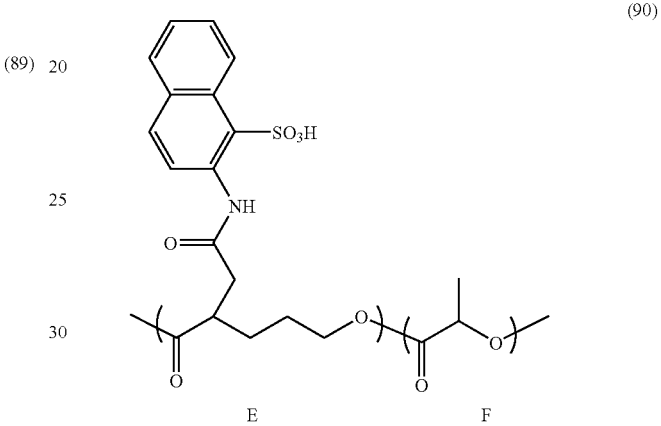

(90)

It was also confirmed that the polyhydroxyalkanoate was a copolymer in which an E unit accounted for 10 mol % of the unit of the polyhydroxyalkanoate represented by the chemical formula (90) and an F unit accounted for 90 mol % thereof. The resultant polymer was evaluated for average molecular weight in the same manner as in Example 45. As a result, the resultant polymer was found to have a number average molecular weight Mn of 111,400 and a weight average molecular weight Mw of 187,200.

Example 59

Condensation Reaction Between Polyhydroxyalkanoate Composed of Unit Represented by Chemical Formula (69) Synthesized in Example 37 and 3-aminobenzenesulfonic Acid

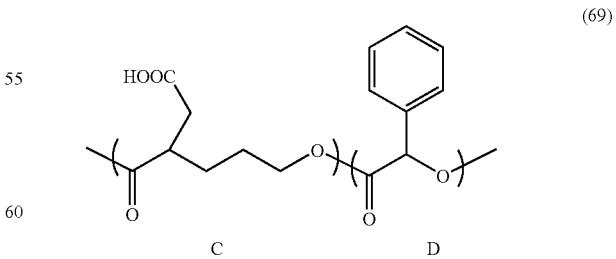

(69)

Under a nitrogen atmosphere, 0.40 g of the polymer synthesized by using the polyhydroxyalkanoate copolymer composed of the unit represented by the chemical formula (69) synthesized in Example 37 (C: 11 mol %, D: 89 mol %) and 0.28 g of 3-aminobenzenesulfonic acid were placed in a 100- ml three-necked flask. 15.0 ml of pyridine was added to the flask, and the mixture was stirred. After that, 0.84 ml of triphenyl phosphite was added, and the whole was heated at 120° C. for 6 hours. After the completion of the reaction, 0.33 g of a polymer was prepared in the same manner as in Example 45. The structure of the resultant polymer was determined through analysis in the same manner as in Example 45. As a result of IR measurement, a peak at 1,695 cm$^{-1}$ derived from a carboxylic acid reduced, and a peak derived from an amide group was newly observed at 1,658 cm$^{-1}$. $^1$H-NMR confirmed that the resultant polymer was a polyhydroxyalkanoate containing a unit represented by the following chemical formula (91) as a monomer unit because a peak derived from an aromatic ring of the 3-aminobenzenesulfonic acid structure shifted.

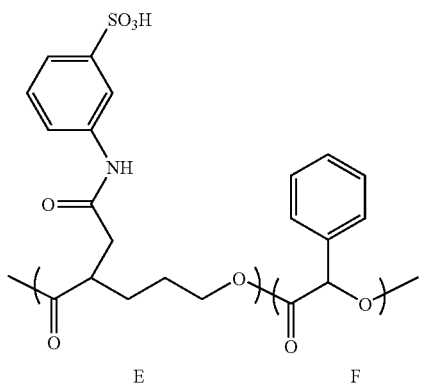

(91)

It was also confirmed that the polyhydroxyalkanoate was a copolymer in which an E unit accounted for 11 mol % of the unit of the polyhydroxyalkanoate represented by the chemical formula (91) and an F unit accounted for 89 mol % thereof. The resultant polymer was evaluated for average molecular weight in the same manner as in Example 45. As a result, the resultant polymer was found to have a number average molecular weight Mn of 32,600 and a weight average molecular weight Mw of 59,000.

Example 60

Condensation Reaction Between Polyhydroxyalkanoate Composed of Unit Represented by Chemical Formula (70) Synthesized in Example 38 and Taurine

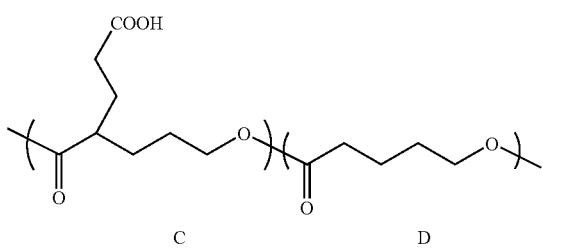

(70)

Under a nitrogen atmosphere, 0.40 g of the polymer synthesized by using the polyhydroxyalkanoate copolymer composed of the unit represented by the chemical formula (70) synthesized in Example 38 (C: 16 mol %, D: 84 mol %) and 0.45 g of taurine were placed in a 100-ml three-necked flask. 15.0 ml of pyridine was added to the flask, and the mixture was stirred. After that, 1.89 ml of triphenyl phosphite was added, and the whole was heated at 120° C. for 6 hours. After the completion of the reaction, 0.32 g of a polymer was prepared in the same manner as in Example 45. The structure of the resultant polymer was determined through analysis in the same manner as in Example 45. As a result of IR measurement, a peak at 1, 695 cm$^{-1}$ derived from a carboxylic acid reduced, and a peak derived from an amide group was newly observed at 1,668 cm$^{-1}$.

$^1$H-NMR confirmed that the resultant polymer was a polyhydroxyalkanoate containing a unit represented by the following chemical formula (92) as a monomer unit because a peak derived from a methylene of the taurine structure shifted.

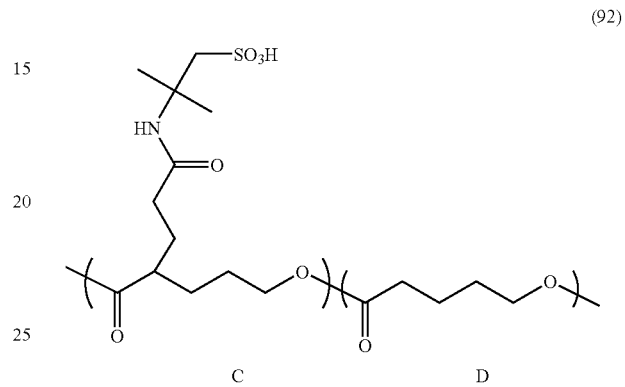

(92)

It was also confirmed that the polyhydroxyalkanoate was a copolymer in which an E unit accounted for 16 mol % of the unit of the polyhydroxyalkanoate represented by the chemical formula (92) and an F unit accounted for 84 mol % thereof. The resultant polymer was evaluated for average molecular weight in the same manner as in Example 45. As a result, the resultant polymer was found to have a number average molecular weight Mn of 28,700 and a weight average molecular weight Mw of 51,100.

Example 61

Condensation Reaction Between Polyhydroxyalkanoate Composed of Unit Represented by Chemical Formula (72) Synthesized in Example 40 and 4-methoxyaniline-2-sulfonic Acid

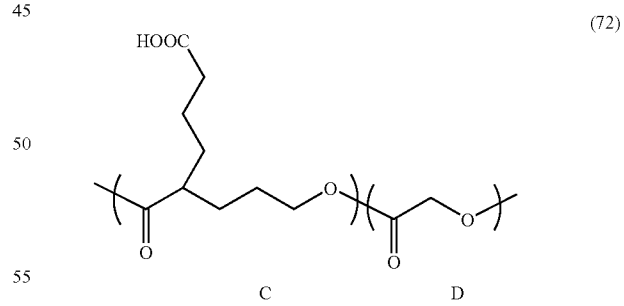

(72)

Under a nitrogen atmosphere, 0.40 g of the polymer synthesized by using the polyhydroxyalkanoate copolymer composed of the unit represented by the chemical formula (72) synthesized in Example 40 (C: 7 mol %, D: 93 mol %) and 0.42 g of 4-methoxyaniline-2-sulfonic acid were placed in a 100-ml three-necked flask. 15.0 ml of pyridine was added to the flask, and the mixture was stirred. After that, 1.09 ml of triphenyl phosphite was added, and the whole was heated at 120° C. for 6 hours. After the completion of the reaction, 0.32 g of a polymer was prepared in the same manner as in Example 45. The structure of the resultant polymer was determined through analysis in the same manner as in Example 45. As a result of IR measurement, a peak at 1,695 cm$^{-1}$ derived from a carboxylic acid reduced, and a peak derived from an amide group was newly observed at 1,658 cm$^{-1}$. $^1$H-NMR confirmed that the resultant polymer was a polyhydroxyalkanoate containing a unit represented by the following chemical formula (93) as a monomer unit because a peak derived from an aromatic ring of the 4-methoxyaniline-2-sulfonic acid structure shifted.

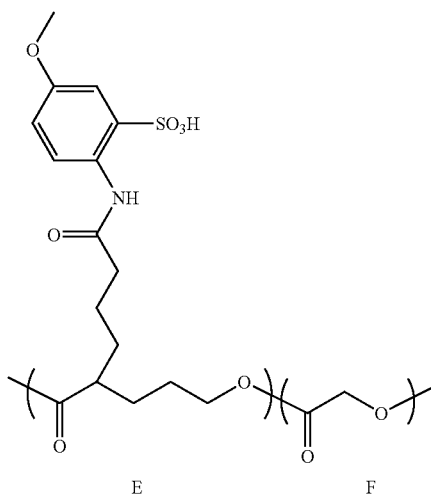

(93)

It was also confirmed that the polyhydroxyalkanoate was a copolymer in which an E unit accounted for 6 mol % of the unit of the polyhydroxyalkanoate represented by the chemical formula (93) and an F unit accounted for 94 mol % thereof. The resultant polymer was evaluated for average molecular weight in the same manner as in Example 45. As a result, the resultant polymer was found to have a number average molecular weight Mn of 47,800 and a weight average molecular weight Mw of 80,800.

Example 62

Condensation Reaction Between Polyhydroxyalkanoate Composed of Unit Represented by Chemical Formula (74) Synthesized in Example 42 and 2-aminobenzenesulfonic Acid

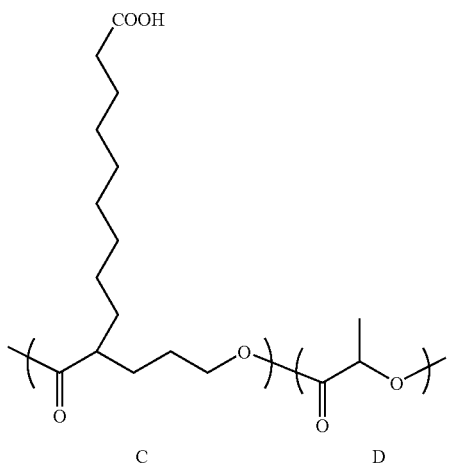

(74)

Under a nitrogen atmosphere, 0.40 g of the polymer synthesized by using the polyhydroxyalkanoate copolymer composed of the unit represented by the chemical formula (74) synthesized in Example 40 (C: 4 mol %, D: 96 mol %) and 0.17 g of 2-aminobenzenesulfonic acid were placed in a 100-ml three-necked flask. 15.0 ml of pyridine was added to the flask, and the mixture was stirred. After that, 0.53 ml of triphenyl phosphite was added, and the whole was heated at 120° C. for 6 hours. After the completion of the reaction, 0.31 g of a polymer was prepared in the same manner as in Example 45. The structure of the resultant polymer was determined through analysis in the same manner as in Example 45. As a result of IR measurement, a peak at 1,695 cm$^{-1}$ derived from a carboxylic acid reduced, and a peak derived from an amide group was newly observed at 1,658 cm$^{-1}$. $^1$H-NMR confirmed that the resultant polymer was a polyhydroxyalkanoate containing a unit represented by the following chemical formula (94) as a monomer unit because a peak derived from an aromatic ring of the 2-aminobenzenesulfonic acid structure shifted.

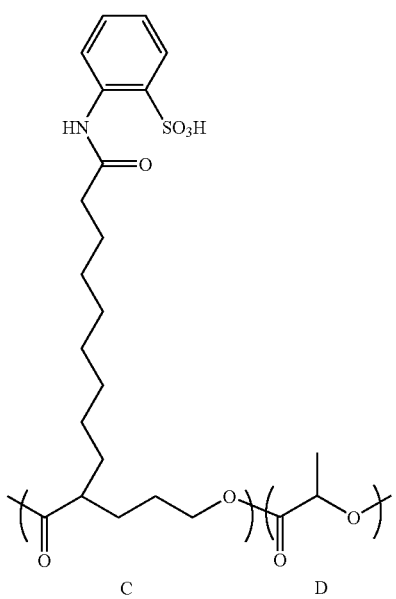

(94)

It was also confirmed that the polyhydroxyalkanoate was a copolymer in which an E unit accounted for 4 mol % of the unit of the polyhydroxyalkanoate represented by the chemical formula (94) and an F unit accounted for 96 mol % thereof. The resultant polymer was evaluated for average molecular weight in the same manner as in Example 45. As a result, the resultant polymer was found to have a number average molecular weight Mn of 42,800 and a weight average molecular weight Mw of 77,500.

Example 63

Condensation Reaction Between Polyhydroxyalkanoate Composed of Unit Represented by Chemical Formula (75) Synthesized in Example 43 and p-toluidine-2-sulfonic Acid

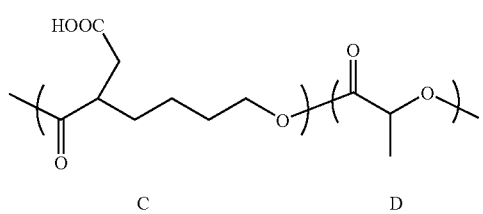

(75)

Under a nitrogen atmosphere, 0.40 g of the polymer synthesized by using the polyhydroxyalkanoate copolymer composed of the unit represented by the chemical formula (75) synthesized in Example 43 (C: 9 mol %, D: 91 mol %) and 0.41 g of p-toluidine-2-sulfonic acid were placed in a 100-ml three-necked flask. 15.0 ml of pyridine was added to the flask, and the mixture was stirred. After that, 1.16 ml of triphenyl phosphite was added, and the whole was heated at 120° C. for 6 hours. After the completion of the reaction, 0.36 g of a polymer was prepared in the same manner as in Example 45. The structure of the resultant polymer was determined through analysis in the same manner as in Example 45. As a result of IR measurement, a peak at 1,695 cm$^{-1}$ derived from a carboxylic acid reduced, and a peak derived from an amide group was newly observed at 1,658 cm$^{-1}$. $^1$H-NMR confirmed that the resultant polymer was a polyhydroxyalkanoate containing a unit represented by the following chemical formula (95) as a monomer unit because a peak derived from an aromatic ring of the p-toluidine-2-sulfonic acid structure shifted.

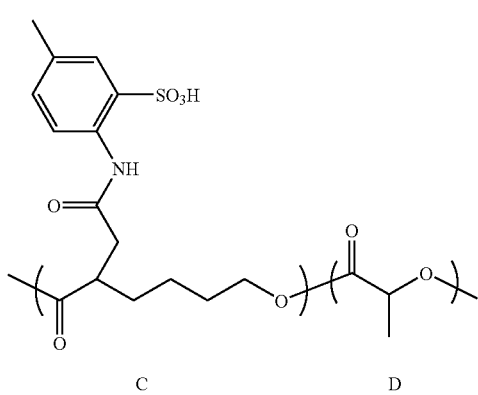

(95)

C  D

It was also confirmed that the polyhydroxyalkanoate was a copolymer in which an E unit accounted for 9 mol % of the unit of the polyhydroxyalkanoate represented by the chemical formula (95) and an F unit accounted for 91 mol % thereof. The resultant polymer was evaluated for average molecular weight in the same manner as in Example 45. As a result, the resultant polymer was found to have a number average molecular weight Mn of 98,500 and a weight average molecular weight Mw of 176,300.

Example 64

Condensation Reaction Between Polyhydroxyalkanoate Composed of Unit Represented by Chemical Formula (76) Synthesized in Example 44 and 2-amino-2-methylpropanesulfonic Acid

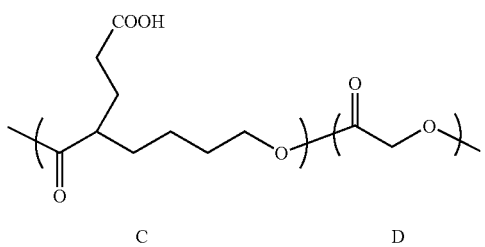

(76)

C  D

Under a nitrogen atmosphere, 0.40 g of the polymer synthesized by using the polyhydroxyalkanoate copolymer composed of the unit represented by the chemical formula (76) synthesized in Example 44 (C: 7 mol %, D: 93 mol %) and 0.32 g of 2-amino-2-methylpropanesulfonic acid were placed in a 100-ml three-necked flask. 15.0 ml of pyridine was added to the flask, and the mixture was stirred. After that, 1.09 ml of triphenyl phosphite was added, and the whole was heated at 120° C. for 6 hours. After the completion of the reaction, 0.36 g of a polymer was prepared in the same manner as in Example 45. The structure of the resultant polymer was determined through analysis in the same manner as in Example 45. As a result of IR measurement, a peak at 1,695 cm$^{-1}$ derived from a carboxylic acid reduced, and a peak derived from an amide group was newly observed at 1,668 cm$^{-1}$. $^1$H-NMR confirmed that the resultant polymer was a polyhydroxyalkanoate containing a unit represented by the following chemical formula (96) as a monomer unit because a peak derived from methylene of the 2-amino-2-methylpropanesulfonic acid structure shifted.

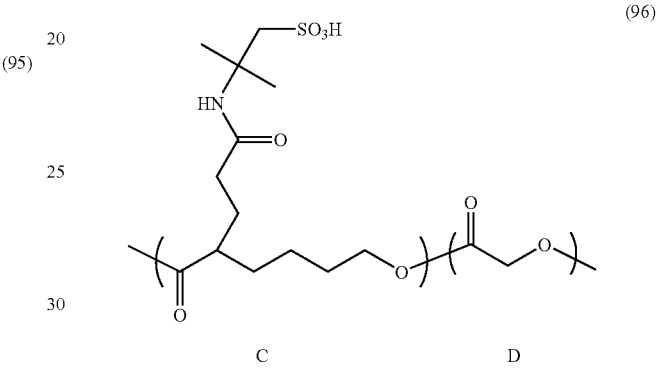

(96)

C  D

It was also confirmed that the polyhydroxyalkanoate was a copolymer in which an E unit accounted for 7 mol % of the unit of the polyhydroxyalkanoate represented by the chemical formula (96) and an F unit accounted for 93 mol % thereof. The resultant polymer was evaluated for average molecular weight in the same manner as in Example 45. As a result, the resultant polymer was found to have a number average molecular weight Mn of 106,800 and a weight average molecular weight Mw of 174,000.

Example 65

Esterification Reaction of Polyhydroxyalkanoate Composed of Unit Represented by Chemical Formula (77) Synthesized in Example 45

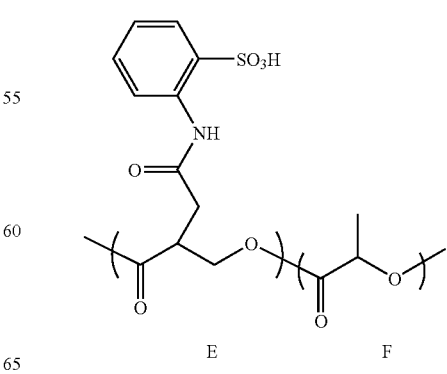

(77)

E  F 0.30 g of the polyhydroxyalkanoate copolymer composed of the unit represented by the chemical formula (77) synthesized in Example 45 (E: 9 mol %, F: 91 mol %) was added to a round-bottomed flask. Then, 21.0 ml of chloroform and 7.0 ml of methanol were added to dissolve the polymer, and the solution was cooled to 0° C. 1.48 ml of a 2-mol/L trimethylsilyldiazomethane-hexane solution (manufactured by Aldrich) were added to the solution, and the whole was stirred for 4 hours. After the completion of the reaction, the solvent was distilled off by using an evaporator, and then the polymer was collected.

Furthermore, 21.0 ml of chloroform and 7.0 ml of methanol were added to dissolve the polymer again. Then, the solvent was distilled off by using an evaporator. This operation was repeated 3 times. The collected polymer was dried under reduced pressure to prepare 0.30 g of a polymer. The structure of the resultant polymer was determined through analysis according to $^1$H-NMR (FT-NMR: Bruker DPX 400; resonance frequency: 400 MHz; measured nuclear species: $^1$H; solvent used: DMSO-$d_6$; measurement temperature: room temperature). $^1$H-NMR confirmed that the resultant polymer was a polyhydroxyalkanoate containing a unit represented by the following chemical formula (97) as a monomer unit because a peak derived from methyl sulfonate was observed at 3 to 4 ppm.

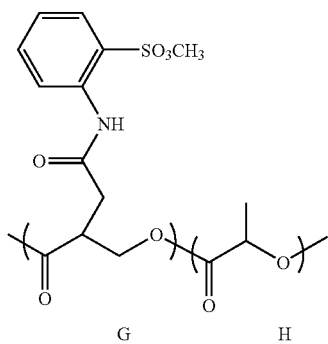

(97)

It was also confirmed that the polyhydroxyalkanoate was a copolymer in which a G unit accounted for 9 mol % of the unit of the polyhydroxyalkanoate represented by the chemical formula (97) and an H unit accounted for 91 mol % thereof.

In addition, there was no peak observed resulted from sulfonic acid in acid value titration using Potentiometric Titrator AT510 (product of Kyoto Electronics Manufacturing Co., Ltd.) and it was also made evident from this that sulfonic acid was converted to methyl sulfonate. The resultant polymer was evaluated for average molecular weight by means of gel permeation chromatography (GPC; Tosoh Corporation HLC-8120, column; Polymer Laboratories PLgel 5μ MIXED-C, solvent; DMF/LiBr 0.1% (w/v), polystyrene conversion). As a result, the resultant polymer was found to have a number average molecular weight Mn of 18,600 and a weight average molecular weight Mw of 27,000.

Example 66

Esterification Reaction of Polyhydroxyalkanoate Composed of Unit Represented by Chemical Formula (84) Synthesized in Example 52

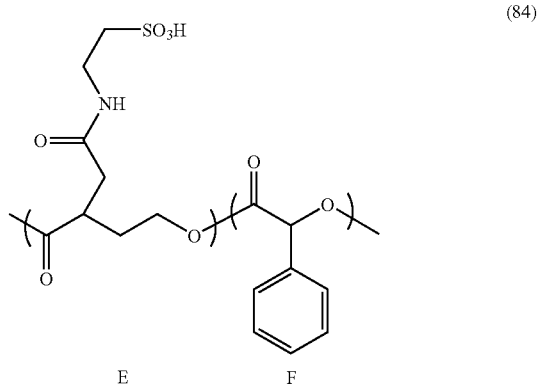

(84)

0.30 g of the polyhydroxyalkanoate copolymer composed of the unit represented by the chemical formula (84) synthesized in Example 52 (E: 6 mol %, F: 94 mol %) was added to a round-bottomed flask. Then, 21.0 ml of chloroform and 7.0 ml of methanol were added to dissolve the polymer, and the solution was cooled to 0° C. 0.64 ml of a 2-mol/L trimethylsilyldiazomethane-hexane solution (manufactured by Aldrich) was added to the solution, and the whole was stirred for 4 hours. After the completion of the reaction, the solvent was distilled off by using an evaporator, and then the polymer was collected.

Furthermore, 21.0 ml of chloroform and 7.0 ml of methanol were added to dissolve the polymer again. Then, the solvent was distilled off by using an evaporator. This operation was repeated 3 times. The collected polymer was dried under reduced pressure to prepare 0.29 g of a polymer. The structure of the resultant polymer was determined through analysis according to $^1$H-NMR (FT-NMR: Bruker DPX 400; resonance frequency: 400 MHz; measured nuclear species: $^1$H; solvent used: DMSO-$d_6$; measurement temperature: room temperature). $^1$H-NMR confirmed that the resultant polymer was a polyhydroxyalkanoate containing a unit represented by the following chemical formula (98) as a monomer unit because a peak derived from methyl sulfonate was observed at 3 to 4 ppm.

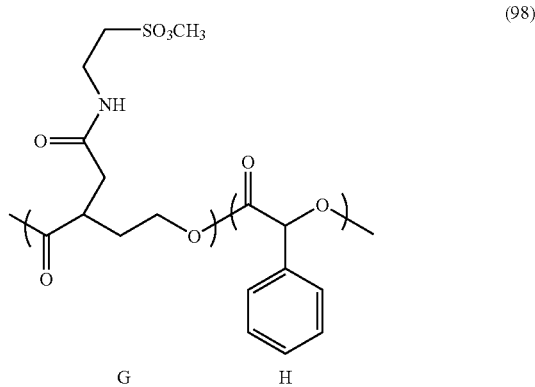

(98)

It was also confirmed that the polyhydroxyalkanoate was a copolymer in which a G unit accounted for 6 mol % of the unit of the polyhydroxyalkanoate represented by the chemical formula (98) and an H unit accounted for 94 mol % thereof. In addition, there was no peak observed resulted from sulfonic acid in acid value titration using Potentiometric Titrator AT510 (product of Kyoto Electronics Manufacturing Co., Ltd.) and it was also made evident from this that sulfonic acid was converted to methyl sulfonate. The resultant polymer was evaluated for average molecular weight in the same manner as in Example 66. As a result, the resultant polymer was found to have a number average molecular weight Mn of 6,800 and a weight average molecular weight Mw of 10,900.

Example 67

Synthesis of Polyester Using δ-valerolactone 10.01 g (100.0 mmol) of δ-valerolactone, 4.0 ml of a solution of 0.1 M of tin octylate(tin 2-ethylhexanoate) in toluene, and 4.0 ml of a solution of 0.1 M of p-tert-butylbenzyl alcohol in toluene were placed in a polymerization ampule, and the whole was dried under reduced pressure for 1 hour and replaced with nitrogen. After that, the ampule was heat-sealed under reduced pressure and heated to 150° C. to perform ring-opening polymerization. 10 hours after that, the reaction was terminated, and the ampule was cooled. The resultant polymer was dissolved into chloroform, and reprecipitated in methanol in an amount 10 times that of chloroform necessary for the dissolution. The precipitate was collected and dried under reduced pressure to prepare 8.51 g of a polymer. NMR analysis was performed under the same conditions as those of Example 1 to determine the structure of the resultant polymer. The analysis confirmed that the polymer was a polyhydroxyalkanoate containing a unit represented by the following chemical formula (109) as a monomer unit.

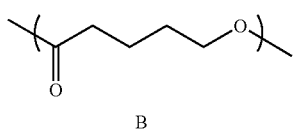

(109)

B

The resultant polyhydroxyalkanoate was evaluated for average molecular weight by means of gel permeation chromatography (GPC; HLC-8220 manufactured by Tosoh Corporation, column; TSK-GEL Super HM-H manufactured by Tosoh Corporation, solvent; chloroform, in terms of polystyrene). As a result, the resultant polyhydroxyalkanoate was found to have a number average molecular weight Mn of 41,000 and a weight average molecular weight Mw of 75,100.

Example 68

2.00 g of the polyhydroxyalkanoate composed of the unit represented by the chemical formula (109) synthesized in Example 67 was placed in a round-bottomed flask, and 100 ml of THF was added to dissolve this. The flask was placed under a nitrogen atmosphere, and the solution was stirred at −78° C. Next, 10.0 ml of a solution of 2 M of lithium diisopropylamide in THF were gradually added to the flask, and the whole was stirred at −78° C. for 30 minutes. Next, 9.16 g of benzyl bromoacetate were added to the flask, and the whole was stirred at room temperature for 30 minutes. After the completion of the reaction, the reaction solution was poured into 400 ml of an aqueous solution of ammonium chloride, and 200 ml of dichloromethane was added to extract the organic layer. The extracted organic layer was washed with 100 ml of water 3 times. After the organic layer had been collected, the solvent was distilled off to collect a crude polymer. Next, the polymer was dissolved into 12 ml of THF, then dissolved into THF, and reprecipitated in methanol in an amount 50 times that of THF necessary for the dissolution. The precipitate was collected and dried under reduced pressure to prepare 1.38 g of a polymer. NMR analysis was performed under the same conditions as those of Example 1 to determine the structure of the resultant polymer. The analysis confirmed that the polymer was a polyhydroxyalkanoate containing a unit represented by the following chemical formula (110) as a monomer unit. The analysis also confirmed that an A unit accounted for 10 mol % of the monomer unit and a B unit accounted for 90 mol % thereof.

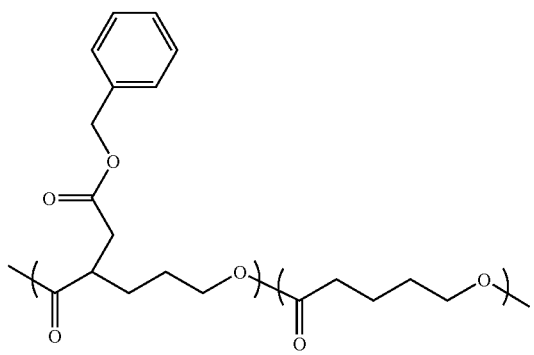

(110)

A        B

The resultant polyhydroxyalkanoate was evaluated for average molecular weight by means of gel permeation chromatography (GPC; HLC-8220 manufactured by Tosoh Corporation, column; TSK-GEL Super HM-H manufactured by Tosoh Corporation, solvent; chloroform, polystyrene conversion). As a result, the resultant polyhydroxyalkanoate was found to have a number average molecular weight Mn of 23,200 and a weight average molecular weight Mw of 54,600.

1.00 g of the polyhydroxyalkanoate copolymer represented by the chemical formula (110) synthesized here was dissolved into 100 ml of a mixed solvent of dioxane-ethanol (75:25), and 0.22 g of a 5% palladium/carbon catalyst was added to the solution. The inside of the reaction system was filled with hydrogen, and the whole was stirred at room temperature for 1 day. After the completion of the reaction, in order to remove the catalyst, the resultant was filtered through a 0.25-μm membrane filter to collect a reaction solution. After the solution had been concentrated, the concentrate was dissolved into chloroform, and reprecipitated in methanol in an amount 10 times that of chloroform. The resultant polymer was collected and dried under reduced pressure to prepare 0.62 g of a polymer. NMR analysis was performed under the same conditions as those of Example 1 to determine the structure of the resultant polymer. The analysis confirmed that the polymer was a polyhydroxyalkanoate copolymer containing a unit represented by the following chemical formula (111) as a monomer unit. The analysis also confirmed that a C unit accounted for 10 mol % of the monomer unit and a D unit accounted for 90 mol % thereof.

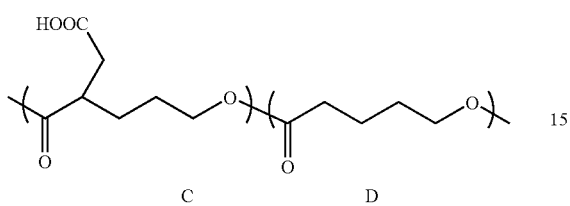

(111)

The resultant polyhydroxyalkanoate was evaluated for average molecular weight by means of gel permeation chromatography (GPC; HLC-8220 manufactured by Tosoh Corporation, column; TSK-GEL Super HM-H manufactured by Tosoh Corporation, solvent; chloroform, polystyrene conversion). As a result, the resultant polyhydroxyalkanoate was found to have a number average molecular weight Mn of 20,100 and a weight average molecular weight Mw of 42,200.

Example 69

2.00 g of the polyhydroxyalkanoate composed of the unit represented by the chemical formula (109) synthesized in Example 67 was placed in a round-bottomed flask, and 100 ml of THF was added to dissolve this. The flask was placed under a nitrogen atmosphere, and the solution was stirred at −78° C. Next, 10 ml of a solution of 2 M of lithium diisopropylamide in THF was gradually added to the flask, and the whole was stirred at −78° C. for 30 minutes. Next, 8.85 g of 2-acrylamide-2-methylpropane methyl sulfonate was added to the flask, and the whole was stirred at room temperature for 30 minutes. After the completion of the reaction, the reaction solution was poured into 400 ml of an aqueous solution of ammonium chloride, and 200 ml of dichloromethane was added to extract the organic layer. The extracted organic layer was washed with 100 ml of water 3 times. After the organic layer had been collected, the solvent was distilled off to collect a crude polymer. Next, the polymer was dissolved into 12 ml of THF, then dissolved into THF, and reprecipitated in methanol in an amount 50 times that of THF necessary for the dissolution. The precipitate was collected and dried under reduced pressure to prepare 1.22 g of a polymer. NMR analysis was performed under the same conditions as those of Example 45 to determine the structure of the resultant polymer. The analysis confirmed that the polymer was a polyhydroxyalkanoate containing a unit represented by the following chemical formula (112) as a monomer unit. The analysis also confirmed that an E unit accounted for 7 mol % of the monomer unit and an F unit accounted for 93 mol % thereof.

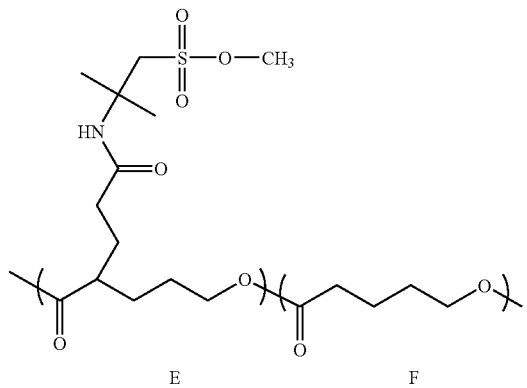

(112)

The resultant polyhydroxyalkanoate was evaluated for average molecular weight in the same manner as in Example 45. As a result, the resultant polyhydroxyalkanoate was found to have a number average molecular weight Mn of 25,300 and a weight average molecular weight Mw of 58,700.

Example 70

Synthesis of Polyester Using tetrahydro-3-(2-propenyl)-2H-pyrane-2-one and phenyl lactide(3,6-bis(phenylmethyl)-1,4-dioxane-2,5-dione)

0.28 g (2.0 mmol) of tetrahydro-3-(2-propenyl)-2H-pyrane-2-one represented by the chemical formula (37), 2.96 g (10.0 mmol) of phenyl lactide, 4.8 ml of a solution of 0.01 M of tin octylate(tin 2-ethylhexanoate) in toluene, and 4.8 ml of a solution of 0.01 M of p-tert-butylbenzyl alcohol in toluene was placed in a polymerization ampule. After that, 2.06 g of a polymer was prepared in the same manner as in Example 1. NMR analysis was performed under the same conditions as those of Example 1 to determine the structure of the resultant polymer. The analysis confirmed that the polymer was a polyhydroxyalkanoate copolymer containing a unit represented by the following chemical formula (113) as a monomer unit. The analysis also confirmed that an A unit accounted for 13 mol % of the monomer unit and a B unit accounted for 87 mol % thereof.

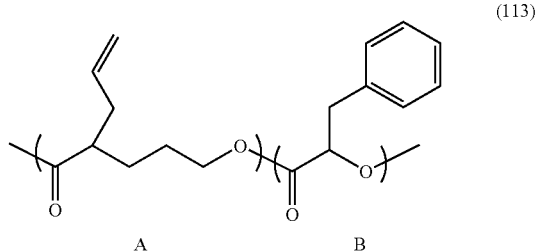

(113)

The resultant polyhydroxyalkanoate was evaluated for average molecular weight in the same manner as in Example 1. As a result, the resultant polyhydroxyalkanoate was found

Example 71

Oxidation Reaction of Polyhydroxyalkanoate Composed of Unit Represented by Chemical Formula (41) Synthesized in Example 70

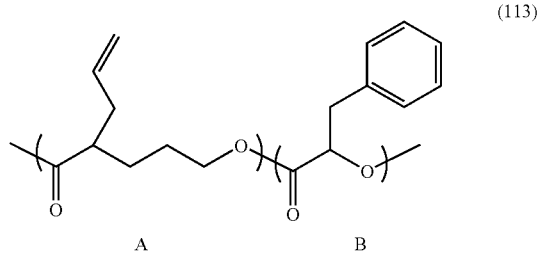

(113)

A    B 0.50 g of the polyhydroxyalkanoate copolymer composed of the unit represented by the chemical formula (113) synthesized in Example 71 (A: 13 mol %, B: 87 mol %) was placed in a round-bottomed flask, and 30 ml of acetone was added to dissolve this. The flask was placed in an ice bath, 5 ml of acetic acid and 0.35 g of 18-crown-6-ether were added, and the whole was stirred. Next, 0.28 g of potassium permanganate was gradually added to the flask in the ice bath, and the whole was stirred in the ice bath for 2 hours and stirred at room temperature for an additional 18 hours. After the completion of the reaction, 0.45 g of a polymer was prepared in the same manner as in Example 23. NMR analysis was performed under the same conditions as those of Example 1 to determine the structure of the resultant polymer. The analysis confirmed that the polymer was a polyhydroxyalkanoate containing a unit represented by the following chemical formula (114) as a monomer unit.

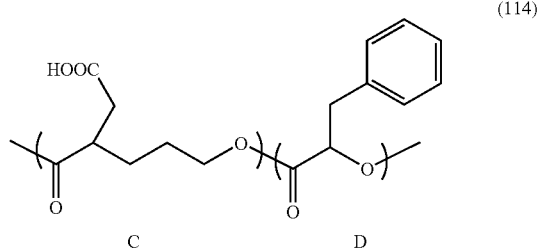

(114)

C    D

The resultant polyhydroxyalkanoate was evaluated for average molecular weight in the same manner as in Example 1. As a result, the resultant polyhydroxyalkanoate was found to have a number average molecular weight Mn of 30,100 and a weight average molecular weight Mw of 54,200.

Furthermore, in order to calculate the unit of the resultant polyhydroxyalkanoate, 29 mg of the polyhydroxyalkanoate prepared in the same manner as in Example 24 were subjected to NMR analysis in the same manner as in Example 1. The analysis confirmed that the polyhydroxyalkanoate was a copolymer in which a C unit accounted for 12 mol % of the unit of the polyhydroxyalkanoate represented by the chemical formula (114) and a D unit accounted for 88 mol % thereof.

Example 72

Condensation Reaction Between Polyhydroxyalkanoate Composed of Unit Represented by Chemical Formula (114) Synthesized in Example 71 and 4-methoxyaniline-2-sulfonic Acid

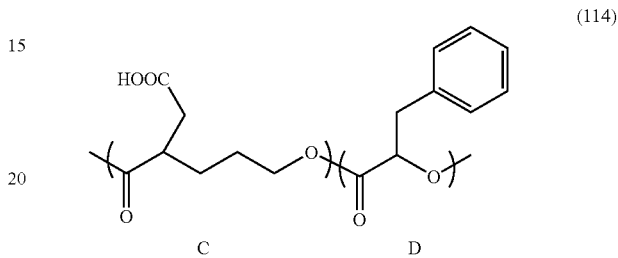

(114)

C    D

Under a nitrogen atmosphere, 0.40 g of the polymer synthesized by using the polyhydroxyalkanoate copolymer composed of the unit represented by the chemical formula (114) synthesized in Example 71 (C: 12 mol %, D: 88 mol %) and 0.33 g of 4-methoxyaniline-2-sulfonic acid were placed in a 100-ml three-necked flask. 15.0 ml of pyridine was added to the flask, and the mixture was stirred. After that, 0.84 ml of triphenyl phosphite was added, and the whole was heated at 120° C. for 6 hours. After the completion of the reaction, 0.33 g of a polymer was prepared in the same manner as in Example 45. The structure of the resultant polymer was determined through analysis in the same manner as in Example 45. As a result of IR measurement, a peak at 1,695 cm$^{-1}$ derived from a carboxylic acid reduced, and a peak derived from an amide group was newly observed at 1,658 cm$^{-1}$. $^1$H-NMR confirmed that the resultant polymer was a polyhydroxyalkanoate containing a unit represented by the following chemical formula (115) as a monomer unit because a peak derived from an aromatic ring of the 4-methoxyaniline-2-sulfonic acid structure shifted.

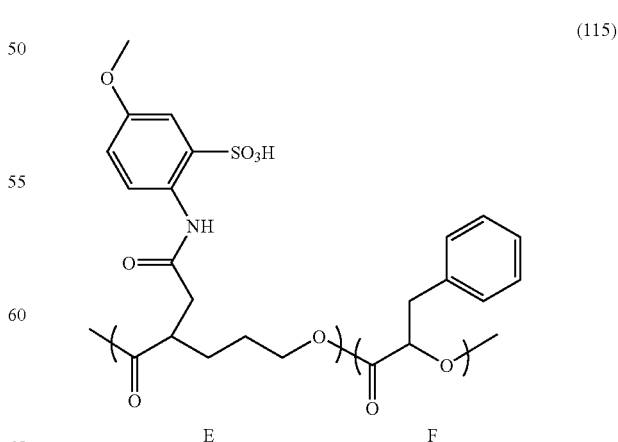

(115)

E    F

It was also confirmed that the polyhydroxyalkanoate was a copolymer in which an E unit accounted for 11 mol % of the unit of the polyhydroxyalkanoate represented by the chemical formula (115) and an F unit accounted for 89 mol % thereof. The resultant polymer was evaluated for average molecular weight in the same manner as in Example 45. As a result, the resultant polymer was found to have a number average molecular weight Mn of 29,500 and a weight average molecular weight Mw of 53,700.

INDUSTRIAL APPLICABILITY

According to the present invention, there can be provided: a novel polyhydroxyalkanoate containing, in a molecule, a vinyl group as a reaction active group at a side chain thereof; a novel polyhydroxyalkanoate containing a carboxyl group in a molecule; a novel polyhydroxyalkanoate containing, in a molecule, a unit having an amide group and a sulfonic group; and a method of producing such a polyhydroxyalkanoate. A novel polyhydroxyalkanoate having a vinyl group or a carboxyl group can find applications in functional materials because it can introduce a functional group which provides functionalities by using its reaction active group. Furthermore, a polyhydroxyalkanoate containing, in a molecule, a unit having a carboxyl group, an amide group, or a sulfonic group is expected to find use in applications including medical soft members because it is excellent in melt processability, and is excellent in biocompatibility by virtue of its hydrophilicity.

This application claims priority from Japanese Patent Application No. 2004-174783 filed Jun. 11, 2004, which is hereby incorporated by reference herein.

The invention claimed is:

1. A polyhydroxyalkanoate comprising one or more units represented by chemical formula (1) in a molecule:

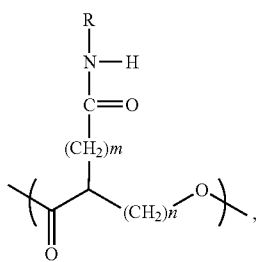
(1)

wherein R represents $-A_1-SO_2R_1$, $R_1$ represents OH, a halogen atom, ONa, OK, or $OR_{1a}$, $R_{1a}$ and $A_1$ each independently represent a substituted or unsubstituted aliphatic hydrocarbon structure, a substituted or unsubstituted aromatic ring structure, or a substituted or unsubstituted heterocyclic structure, n represents an integer selected from 1 to 4, m represents an integer selected from 1 to 8, and when the polyhydroxyalkanoate includes more than one unit of the chemical formula (1), R, $R_1$, $R_{1a}$, $A_1$, m, and n are independently selected for each unit.

2. A polyhydroxyalkanoate according to claim 1, comprising one or more units each represented by chemical formula (2), (3), (4A), or (4B) in a molecule as units of the chemical formula (1):

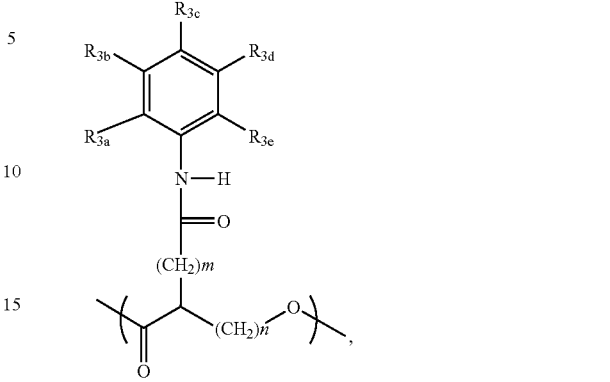
(3)

wherein $R_2$ represents OH, a halogen atom, ONa, OK, or $OR_{2a}$, $R_{2a}$ represents a linear or branched alkyl group having 1 to 8 carbon atoms, or a substituted or unsubstituted phenyl group, $A_2$ represents a linear or branched alkylene group having 1 to 8 carbon atoms, n represents an integer selected from 1 to 4, m represents an integer selected from 1 to 8, and when the polyhydroxyalkanoate includes more than one unit of the chemical formula (2), $A_2$, $R_2$, $R_{2a}$, m, and n are independently selected for each unit,

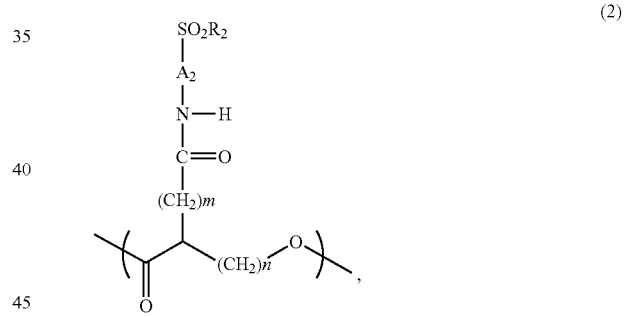
(2)

wherein $R_{3a}$, $R_{3b}$, $R_{3c}$, $R_{3d}$, and $R_{3e}$ each independently represent $SO_2R_{3f}$ ($R_{3f}$ represents OH, a halogen atom, ONa, OK, or $OR_{3f1}$ $R_{3f1}$ represents a linear or branched alkyl group having 1 to 8 carbon atoms, or a substituted or unsubstituted phenyl group)), a hydrogen atom, a halogen atom, an alkyl group having 1 to 20 carbon atoms, an alkoxy group having 1 to 20 carbon atoms, an OH group, an NH2 group, an NO2 group, COOR$_{3g}$ ($R_{3g}$ represents an H atom, an Na atom, or a K atom), an acetamide group, an OPh group, an NHPh group, a CF$_3$ group, a C$_2$F$_5$ group, or a C$_3$F$_7$ group (Ph represents a phenyl group), and at least one of these groups represents $SO_2R_{3f}$, n represents an integer selected from 1 to 4, m represents an integer selected from 1 to 8 and when the polyhydroxyalkanoate includes more than one unit of the chemical formula (3), $R_{3a}$, $R_{3b}$, $R_{3c}$, $R_{3d}$, $R_{3e}$, $R_{3f}$, $R_{3f1}$, $R_{3g}$, m, and n are independently selected for each unit,

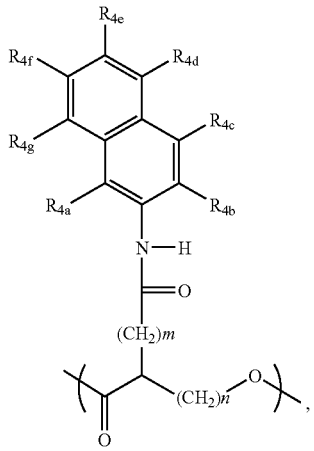

(4 A)

wherein $R_{4a}$, $R_{4b}$, $R_{4c}$, $R_{4d}$, $R_{4e}$, $R_{4f}$, and $R_{4g}$ each independently represent $SO2R_{4o}$ ($R_{4o}$ represents OH, a halogen atom, ONa, OK, or $OR_{4o1}$ ($R_{4o1}$ represents a linear or branched alkyl group having 1 to 8 carbon atoms, or a substituted or unsubstituted phenyl group)), a hydrogen atom, a halogen atom, an alkyl group having 1 to 20 carbon atoms, an alkoxy group having 1 to 20 carbon atoms, an OH group, an NH2 group, an NO2 group, $COOR_{4p}$ ($R_{4p}$ represents an H atom, an Na atom, or a K atom), an acetamide group, an OPh group, an NHPh group, a $CF_3$ group, a $C_2F_5$ group, or a $C_3F_7$ group (Ph represents a phenyl group), and at least one of these groups represents $SO2R_{4o}$, n represents an integer selected from 1 to 4 and m represents an integer selected from 1 to 8 and when the polyhydroxyalkanoate includes more than one unit of the chemical formula (4A), $R_{4a}$, $R_{4b}$, $R_{4c}$, $R_{4d}$, $R_{4e}$, $R_{4f}$, $R_{4g}$, $R_{4o}$, $R_{4o1}$, $R_{4p}$, m, and n are independently selected for each unit,

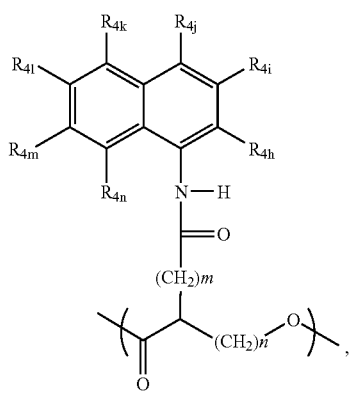

(4 B)

wherein $R_{4h}$, $R_{4i}$, $R_{4j}$, $R_{4k}$, $R_{4l}$, $R_{4m}$, and $R_{4n}$ each independently represent $SO2R_{4o}$ ($R_{4o}$ represents OH, a halogen atom, ONa, OK, or $OR_{4o1}$ ($R_{4o1}$ represents a linear or branched alkyl group having 1 to 8 carbon atoms, or a substituted or unsubstituted phenyl group)), a hydrogen atom, a halogen atom, an alkyl group having 1 to 20 carbon atoms, an alkoxy group having 1 to 20 carbon atoms, an OH group, an NH2 group, an NO2 group, $COOR_{4p}$ ($R_{4p}$ represents an H atom, an Na atom, or a K atom), an acetamide group, an OPh group, an NHPh group, a $CF_3$ group, a $C_2F_5$ group, or a $C_3F_7$ group (Ph represents a phenyl group), and at least one of these groups represents $SO2R_{4o}$, n represents an integer selected from 1 to 4, m represents an integer selected from 1 to 8 and when the polyhydroxyalkanoate includes more than one unit of the chemical formula (4B), $R_{4h}$, $R_{4i}$, $R_{4j}$, $R_{4k}$, $R_{4l}$, $R_{4m}$, $R_{4n}$, $R_{4o}$, $R_{4o}$, $R_{4p}$, m, and n are independently selected for each unit.

3. A polyhydroxyalkanoate comprising one or more units represented by chemical formula (5):

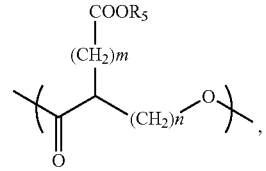

(5)

wherein $R_5$ represents a hydrogen atom, a group for forming a salt, or $R_{5a}$, $R_5a$ represents a linear or branched alkyl or aralkyl group having 1 to 12 carbon atoms, or a group having a saccharide, n represents an integer selected from 1 to 4, m represents an integer selected from 1 to 8, and when the polyhydroxyalkanoate includes more than one unit of the chemical formula (5), $R_5$, $R_{5a}$, m, and n are independently selected for each unit.

4. A polyhydroxyalkanoate comprising one or more units represented by chemical formula (6):

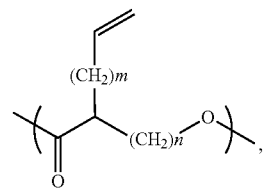

(6)

wherein n represents an integer selected from 1 to 4, when n represents an integer selected from 1, 2, and 4, m represents an integer selected from 1 to 8 when n=3, m represents an integer from 2 to 8, and when the polyhydroxyalkanoate includes more than one unit of the chemical formula (6), m and n are independently selected for each unit.

5. A polyhydroxyalkanoate according to any one of claims 1 to 4, further comprising a unit represented by chemical formula (7) in a molecule:

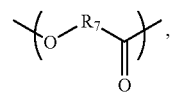

(7)

wherein $R_7$ represents a linear or branched alkylene group having 1 to 11 carbon atoms, an alkyleneoxyalkylene group each alkylene of which has 1 or 2 carbon atoms (alkylene groups each independently have 1 or 2 carbon atoms), or an alkylidene group having 1 to 5 carbon atoms, which may be substituted by an aryl group, and when the polyhydroxyalkanoate includes more than one unit of the chemical formula (7), $R_7$ is independently for each unit.

6. A method of producing a polyhydroxyalkanoate represented by chemical formula (6) comprising a step of polymerizing a compound represented by chemical formula (8) in a presence of a catalyst:

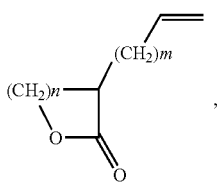

(8)

wherein n represents an integer selected from 1 to 4, when n represents an integer selected from 1, 2, and 4, m represents an integer selected from 1 to 8 and when n=3, m represents an integer selected from 2 to 8,

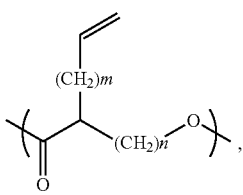

(6)

wherein n represents an integer selected from 1 to 4, when n represents an integer selected from 1, 2, and 4, m represents an integer selected from 1 to 8 when n=3, m represents an integer selected from 2 to 8, and when the polyhydroxyalkanoate includes more than one unit of the chemical formula (6), m and n are independently selected for each unit.

7. A method of producing a polyhydroxyalkanoate containing a unit represented by chemical formula (10) comprising a step of oxidizing a double bond portion of a polyhydroxyalkanoate containing a unit represented by chemical formula (9):

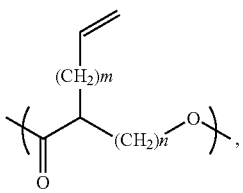

(9)

wherein n represents an integer selected from 1 to 4 and m represents an integer selected from 1 to 8 and when the oxidized polyhydroxyalkanoate includes more than one unit of the chemical formula (9), m and n are independently selected for each unit,

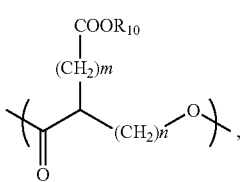

(10)

wherein $R_{10}$ represents a hydrogen atom or a group for forming a salt, n represents an integer selected from 1 to 4, m represents an integer selected from 1 to 8, and when the produced polyhydroxyalkanoate includes more than one unit of the chemical formula (10), m, n, and $R_{10}$ are independently selected for each unit.

8. A method of producing a polyhydroxyalkanoate containing a unit represented by chemical formula (1) comprising a step of subjecting a polyhydroxyalkanoate containing a unit represented by chemical formula (10) and at least one amine compound represented by chemical formula (11) to a condensation reaction:

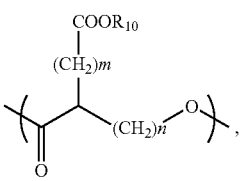

(10)

wherein $R_{10}$ represents hydrogen or a group for forming a salt, n represents an integer selected from 1 to 4, m represents an integer selected from 1 to 8 and when the polyhydroxyalkanoate subjected to the condensation reaction includes more than one unit of the chemical formula (10), m, n, and $R_{10}$ are independently selected for each unit:

(11)

$H_2N-A_3-SO_2R_{11}$, wherein $R_{11}$ represents OH, a halogen atom, ONa, OK, or $OR_{11a}$, $R_{11a}$ and $A_3$ are each independently selected from groups each having a substituted or unsubstituted aliphatic hydrocarbon structure, a substituted or unsubstituted aromatic ring structure, or a substituted or unsubstituted heterocyclic structure, and when more than one compound of the chemical formula (11) is used in the condensation reaction-multiple units exist, $R_{11}$, $R_{11a}$, and $A_3$ are independently selected for each compound of the chemical formula (11),

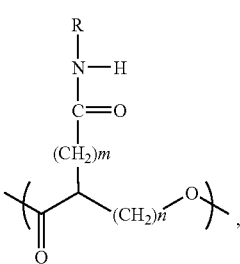

(1)

wherein R represents $-A_1-SO_2R_1$, $R_1$ represents OH, a halogen atom, ONa, OK, or $OR_{1a}$, $R_{1a}$ and $A_1$ each independently represent a group having a substituted or unsubstituted aliphatic hydrocarbon structure, a substituted or unsubstituted aromatic ring structure, or a substituted or unsubstituted heterocyclic structure, n represents an integer selected from 1 to 4, m represents an integer selected from 1 to 8 and when the produced polyhydroxyalkanoate includes more than one unit of the chemical formula (1), R, $R_1$, $R_{1a}$, $A_1$, m, and n are independently selected for each unit.

9. A method of producing a polyhydroxyalkanoate containing a unit represented by chemical formula (101) comprising the steps of:

allowing a polyhydroxyalkanoate containing a unit represented by chemical formula (99) to react with a base; and allowing a compound obtained in the foregoing step to react with a compound represented by chemical formula (100):

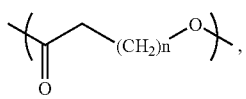
(99)

wherein n represents an integer selected from 1 to 4, and when the polyhydroxyalkanoate allowed to react with the base includes more than one unit of the chemical formula (99), n is independently selected for each unit, $$X(CH_2)_m COOR_{100},\quad (100)$$

wherein m represents an integer selected from 1 to 8, X represents a halogen atom, and $R_{100}$ represents a linear or branched alkyl or aralkyl group having 1 to 12 carbon atoms,

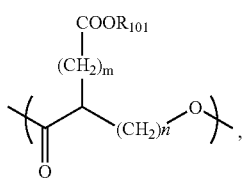
(101)

wherein n represents an integer selected from 1 to 4, when n represents an integer selected from 1 to 3, m represents an integer selected from 1 to 8, $R_{101}$ represents a linear or branched alkyl or aralkyl group having 1 to 12 carbon atoms, and when the produced polyhydroxyalkanoate includes more than one unit of the chemical formula (101), $R_{101}$, m, and n are independently selected for each unit.

10. A method of producing a polyhydroxyalkanoate containing a unit represented by chemical formula (102) comprising a step of hydrolyzing a polyhydroxyalkanoate containing a unit represented by chemical formula (101) in a presence of an acid or an alkali or a step of subjecting the polyhydroxyalkanoate to hydrogenolysis including a catalytic reduction:

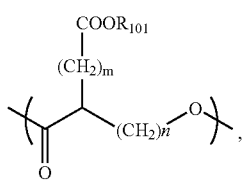
(101)

wherein n represents an integer selected from 1 to 4, when n represents an integer selected from 1 to 3, m represents an integer selected from 0 to 8, when n 4, m represents an integer selected from 1 to 8, $R_{101}$ represents a linear or branched alkyl or aralkyl group having 1 to 12 carbon atoms, and when the polyhydroxyalkanoate that is hydrolyzed or subjected to hydrogenolysis includes more than one unit of the chemical formula (101), $R_{101}$, m, and n are independently selected for each unit,

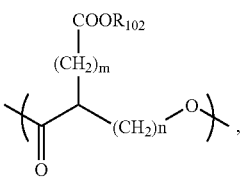
(102)

wherein $R_{102}$ represents hydrogen or a group for forming a salt, n represents an integer selected from 1 to 4, when n represents an integer selected from 1 to 3, m represents an integer selected from 1 to 8, and when the produced polyhydroxyalkanoate includes more the one unit of the chemical formula (102), $R_{102}$, m, and n are independently selected for each unit.

11. A method of producing a polyhydroxyalkanoate containing a unit represented by chemical formula (104) comprising the steps of:

allowing a polyhydroxyalkanoate containing a unit represented by chemical formula (99) to react with a base; and allowing a compound obtained in the foregoing step to react with a compound represented by chemical formula (103):

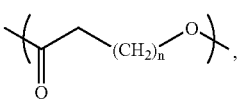
(99)

wherein n represents an integer selected from 1 to 4, and when the polyhydroxyalkanoate allowed to react with the base includes more than one unit of the chemical formula (99), n is independently selected for each unit,

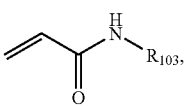
(103)

wherein $R_{103}$ represents —$A_{103}$—$SO_2R_{103a}$, $R_{103a}$ represents OH, a halogen atom, ONa, OK, or $OR_{103b}$, $R_{103b}$ and $A_{103}$ are each independently selected from groups each having a substituted or unsubstituted aliphatic hydrocarbon structure, a substituted or unsubstituted aromatic ring structure, or a substituted or unsubstituted heterocyclic structure, and when more than one compound of the chemical formula (103) is allowed to react, $R_{103}$, $R_{103a}$, $R_{103b}$, and $A_{103}$ are independently selected for each compound of the chemical formula $(_{103})$,

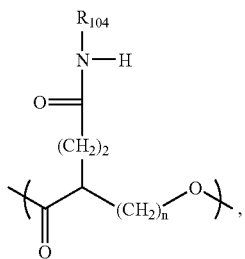

(104)

wherein n represents an integer selected from 1 to 4, $R_{104}$ represents $—A_{104}—SO_2R_{1104a}$, $R_{104a}$ represents OH, a halogen atom, ONa, OK, or $OR_{104b}$, $R_{104b}$ and $A_{104}$ each independently represent a group having a substituted or unsubstituted aliphatic hydrocarbon structure, a substituted or unsubstituted aromatic ring structure, or a substituted or unsubstituted heterocyclic structure, and when the produced polyhydroxyalkanoate includes more than one unit of the chemical formula (104), $R_{104}$, $R_{104a}$, $R_{104b}$, $A_{104}$, and n are independently selected for each unit.

* * * * *